(12) United States Patent
Chen et al.

(10) Patent No.: US 11,715,291 B2
(45) Date of Patent: Aug. 1, 2023

(54) ESTABLISHMENT OF GENERAL-PURPOSE ARTIFICIAL INTELLIGENCE SYSTEM

(71) Applicant: Yongcong Chen, Beijing (CN)

(72) Inventors: Yongcong Chen, Beijing (CN); Jun Zhang, Sichuan (CN); Ting Zeng, Beijing (CN); Xingyue Chen, Beijing (CN)

(73) Assignee: Yongcong Chen, Beijing (CN)

( * ) Notice: Subject to any disclaimer, the term of this patent is extended or adjusted under 35 U.S.C. 154(b) by 39 days.

(21) Appl. No.: 17/565,449

(22) Filed: Dec. 29, 2021

(65) Prior Publication Data
US 2022/0121961 A1    Apr. 21, 2022

Related U.S. Application Data

(63) Continuation of application No. PCT/CN2021/086573, filed on Apr. 12, 2021.

(30) Foreign Application Priority Data

Apr. 30, 2020  (CN) .......................... 202010370939.2
May 6, 2020  (CN) .......................... 202010379539.8
(Continued)

(51) Int. Cl.
*G06N 3/004*  (2023.01)
*G06N 5/022*  (2023.01)
(Continued)

(52) U.S. Cl.
CPC ............ *G06V 10/82* (2022.01); *G06F 18/217* (2023.01); *G06F 18/22* (2023.01); *G06N 3/004* (2013.01);
(Continued)

(58) Field of Classification Search
CPC .......... G06N 3/004; G06N 5/022; G06N 5/04; G06N 3/02
See application file for complete search history.

(56) References Cited

U.S. PATENT DOCUMENTS

| 2019/0130292 A1* | 5/2019 | N .......................... G06V 10/454 |
| 2021/0042620 A1* | 2/2021 | Chen ....................... G06N 3/04 |
| 2021/0191506 A1* | 6/2021 | Wang ....................... G06N 5/02 |

FOREIGN PATENT DOCUMENTS

| CN | 1312501 A | 9/2001 |
| CN | 106778043 A | 5/2017 |

(Continued)

OTHER PUBLICATIONS

Nicholson J, Takahashi K, Nakatsu R. Emotion recognition in speech using neural networks. Neural computing & applications. Dec. 2000;9(4):290-6. (Year: 2000).*

(Continued)

*Primary Examiner* — Oluwatosin O Alabi

(57) ABSTRACT

In establishment of a general-purpose artificial intelligence system, the machine simulates similarity, repeatability and adjacency of information, and stores the demand, award/penalty and emotion symbols together with related low-level features as a preset relation network. When the machine encounters input information, the machine iteratively identifies low-level features in the input information and stores them in a memory according to a simultaneous storage method. With the low-level features as nodes and the similarity, repeatability and adjacency relations between nodes as connection relations, the machine establish relations between the low-level features and the demand, award/penalty and emotion symbols to extend the relation network. The machine uses the low-level features and searches for related low-level features through a chain associative activation process, searches for imitable experiences through (Continued)

segmented simulation, reassembles the experiences according to a principle of benefit-seeking and harm-avoiding to form an optimal response path.

11 Claims, 5 Drawing Sheets

(30) Foreign Application Priority Data

| | | | |
|---|---|---|---|
| May 11, 2020 | (CN) | .......................... | 202010400739.7 |
| Jul. 20, 2020 | (CN) | .......................... | 202010695466.3 |
| Sep. 14, 2020 | (CN) | .......................... | 202010962864.7 |
| Oct. 20, 2020 | (CN) | .......................... | 202011121889.0 |

(51) Int. Cl.

| | |
|---|---|
| *G06N 5/04* | (2023.01) |
| *G06V 10/82* | (2022.01) |
| *G06N 20/20* | (2019.01) |
| *G06N 3/02* | (2006.01) |
| *G06N 3/063* | (2023.01) |
| *G06N 3/10* | (2006.01) |
| *G06N 7/00* | (2023.01) |
| *G06F 18/22* | (2023.01) |
| *G06F 18/21* | (2023.01) |

(52) U.S. Cl.
CPC ............... *G06N 3/02* (2013.01); *G06N 3/063* (2013.01); *G06N 3/10* (2013.01); *G06N 5/022* (2013.01); *G06N 5/04* (2013.01); *G06N 7/00* (2013.01); *G06N 20/20* (2019.01)

(56) References Cited

FOREIGN PATENT DOCUMENTS

| | | | |
|---|---|---|---|
| CN | 109202921 | A | 1/2019 |
| CN | 110909153 | A | 3/2020 |
| CN | 111050219 | A | 4/2020 |
| CN | 111553467 | A | 8/2020 |
| CN | 111582457 | A | 8/2020 |
| CN | 112016664 | A | 12/2020 |
| CN | 112215346 | A | 1/2021 |
| WO | 2016132569 | A1 | 8/2016 |

OTHER PUBLICATIONS

Han K, Yu D, Tashev I. Speech emotion recognition using deep neural network and extreme learning machine. InInterspeech 2014 Sep. 1, 2014. (Year: 2014).*

Huang X, Wu W, Qiao H, Ji Y. Brain-inspired motion learning in recurrent neural network with emotion modulation. IEEE Transactions on Cognitive and Developmental Systems. Jun. 4, 2018;10(4):1153-64. (Year: 2018).*

Kimura H, Yamamura M, Kobayashi S. Reinforcement learning by stochastic hill climbing on discounted reward. InMachine Learning Proceedings 1995 Jan. 1, 1995 (pp. 295-303). Morgan Kaufmann. (Year: 1995).*

Niv Y, Daniel R, Geana A, Gershman SJ, Leong YC, Radulescu A, Wilson RC. Reinforcement learning in multidimensional environments relies on attention mechanisms. Journal of Neuroscience. May 27, 2015;35(21):8145-57. (Year: 2015).*

\* cited by examiner

ESTABLISHMENT OF GENERAL-PURPOSE ARTIFICIAL INTELLIGENCE SYSTEM

CROSS-REFERENCE TO RELATED APPLICATION

The present application is a continuation of international application of PCT application No. PCT/CN2021/086573 filed on Apr. 12, 2021, which claims the priority benefit of the following China patent applications: No. 202010370939.2, entitled "METHOD FOR IMPLEMENTING GENERAL-PURPOSE ARTIFICIAL INTELLIGENCE" filed on Apr. 30, 2020; No. 202010379539.8, entitled "METHOD FOR IMPLEMENTING MACHINE INTELLIGENCE SIMILAR TO HUMAN INTELLIGENCE" filed on May 6, 2020; No. 202010400739.7, entitled "METHOD FOR SIMULATING HUMAN MEMORY TO REALIZE UNIVERSAL MACHINE INTELLIGENCE" filed on May 11, 2020; No. 202010695466.3, entitled "METHOD FOR ESTABLISHING STRONG ARTIFICIAL INTELLIGENCE" filed on Jul. 20, 2020; No. 202010962864.7, entitled "METHOD FOR IMPLEMENTING HUMANOID GENERAL-PURPOSE ARTIFICIAL INTELLIGENCE MACHINE" filed on Sep. 14, 2020; No. 202011121889.0, entitled "METHOD FOR IMPLEMENTING HUMANOID GENERAL-PURPOSE ARTIFICIAL INTELLIGENCE" filed on Oct. 20, 2020. The entirety of the above-mentioned patent applications are incorporated herein by reference and made a part of this specification.

TECHNICAL FIELD

The present application relates to the technical field of artificial intelligence, and in particular, to establishment of a general-purpose artificial intelligence system.

BACKGROUND ART

At present, artificial intelligence is still in the stage of special-purpose artificial intelligence, and such artificial intelligence can only be applied to a single field, which make it difficult to use learned skills in various scenarios, and cannot produce humanoid general-purpose intelligence. The training and response processes of artificial intelligence are greatly different from the learning, thinking and decision-making processes of human beings. For example, in depth learning, the coefficients are optimized to find multi-level mapping with the minimum error. The machine selects intermediate layer features randomly, and is constrained by an error function. In order to ensure that the machine can select reasonable intermediate layer features, it needs to train an extremely large amount of data, and the trained model is difficult to migrate out of the field of training. Although the currently popular deep convolution neural network can remove some details by filtering to help the machine select intermediate layer features more reasonably, it still needs a large amount of training data. The final judgment of the machine may be based on details that some human beings do not notice, so the trained model may be easily spoofed. The current knowledge graph engineering helps to link different things in machine searches by extracting associations between text or concepts in big data. However, these relations are not quantified, and there is a need for a method to help the machine use the relations to learn and summarize by itself, and apply the learned knowledge in everyday life to achieve their own targets. These methods are very different from human learning methods, and cannot produce humanoid general-purpose intelligence.

Thus, current artificial intelligence is generally designed for specific tasks, and there is no general-purpose artificial intelligence capable of performing multiple uncertain tasks. The biggest obstacle in implementing the general-purpose artificial intelligence lies in how to establish a knowledge network similar to human common sense among complex things, and how to use such a knowledge network to direct the behaviors of the machine.

SUMMARY

The present application aims to establish a knowledge network similar to human common sense by a machine, and to use such a knowledge network to direct the behaviors of the machine. An intelligent machine created using the method disclosed in the present application can implement humanoid general-purpose intelligence. At the same time, the machine can learn human knowledge autonomously, and further create new knowledge by discovering potential links between knowledge. This will bring huge economic and social benefits to the human society.

Studies have found that there are two major obstacles in implementing general-purpose artificial intelligence: Obstacle 1: the machine faces an open environment, and the range of information that the machine needs to search for has no boundaries. Obstacle 2: the award/penalty value of each possible step is not available for the machine, so that it cannot determine its optimal response path.

In an example of the present application, both of the above obstacles are addressed by establishing a relation network. A relation network is essentially established with the following rules: "Similarity: things with some same attributes may also have other same attributes". "Adjacency: an implicit connection relation may exist between information which occurs closely in time". "Repeatability: common features that may represent a type of information will repeatedly appear in such information". "Benefit-seeking and harm-avoiding property: the behavior of living things is to seek benefits and avoid harms, so an experience of living things refers to a relation between award/penalty information and other information."

An example of the present application provides a method for establishing general-purpose artificial intelligence, which processes various types of input information via a specific algorithm for general purposes, and gives proper response to all input information. The method includes:

S1, establishing a built-in demand system, a built-in award/penalty system, and a built-in emotion system;
S2, establishing preset instinct knowledge;
S3, identifying, by a machine, input information;
S4, establishing a relation network for representing knowledge;
S5, establishing, by the machine, a response path;
S6, executing, by the machine, the response path; and
S7, updating, by the machine, the relation network.

The step S1 of establishing various systems specifically includes:

S1.1, using different symbols to represent different demand types, award/penalty types and emotion types, and establishing a proper range for each demand type; and
S1.2, according to an actual value and the proper range of a demand, assigning an activation value to a corresponding demand symbol by a preset program; and according to the activation value of the demand symbol, assigning an activation value to an award/penalty symbol and an activation value to an emotion symbol by the preset program.

The step S2 of establishing preset instinct knowledge further includes:

S2.1, simulating similarity, adjacency and repeatability relations between information to establish instinct knowledge.

The step S3 of identifying, by a machine, input information specifically includes:

S3.1, upon input of information, if the machine establishes an attention range and expectation models and selects proper sensors and distinguishabilities in a previous decision-making process, then with regard to images, preferentially extracting, by the machine, features such as overall topology, contour, main lines and main texture within the attention range to serve as low-level features of the current extraction; the low-level features mainly including overall topology, contour, internal main lines, local curvature, texture, hue, vertexes, angle, curvature, parallelism, intersection, size, dynamic patterns and other local features commonly found in graphics; for example, with regard to sound, preferentially extracting, by the machine, overall features such as expected pitch and timbre, and their dynamic changes, and syllable segmentation within the attention range, which features serve as low-level features of the current extraction; and for other sensor data, preferentially extracting overall features within the attention range according to the attention mechanism via a similar method to serve as low-level features of the current extraction;

if the machine does not establish an explicit attention range, then extracting, by the machine, a low-distinguishability overall feature over the whole range of input data of a specific sensor, or randomly selecting an attention range, and extracting features with prioritizing overall features within the attention range to serve as low-level features of the current extraction;

S3.2, storing by the machine, the extracted low-level features according to a simultaneous storage method, an event-driven mechanism and a temporary memory mechanism;

S3.3, assigning, by the machine, initial activation values to the input low-level features through an initial value assignment program; wherein if the input information is demand symbols, award/penalty symbols and emotions symbols activated as a demand symbol deviates from the proper range, the activation values of the symbols are their initial activation values; and propagating, by the machine, the activation values in a relation network according to a chain associative activation process;

S3.4, selecting, by the machine, low-level features with high activation values, and grouping the low-level features according to activation value transfer relations therebetween; wherein the low-level features that propagate large activation values therebetween are grouped as a combination; the low-level features that propagate relatively small activation values therebetween are grouped as a different combination; and each combination is an expectation model.

The step S4 of establishing a relation network for representing knowledge, specifically includes:

in the step S3, propagating, by the machine, the activation values in the relation network according to the chain associative activation process. The associative activation process includes adjacency activation, similarity activation, and strong memory activation processes.

"Adjacency activation" means that when a specific low-level feature in the memory is activated, it will activate a low-level feature adjacent to it in storage location. The adjacency relation in storage location may be either physical adjacency of storage units or any other way of expressing adjacency in storage location (even if the storage units are not physically adjacent). In a simple activation value transfer relation, an activation value propagating coefficient is inversely correlated with the distance between storage locations of two low-level features.

"Similarity activation" means that a specific low-level feature in the memory, when receiving an activation signal sent by another low-level feature, has a receiving capability positively correlated with the similarity therebetween. Therefore, after a similar low-level feature is activated, it will send its own activation signal, and it may be prone to further activate other similar low-level features. This is because similar low-level features have a strong capability to receive activation signals from each other. A simple activation value transfer relation may be that a propagating coefficient is positively correlated with the similarity.

When a feature is input, various features at different distinguishability levels may activate features similar to themself in the memory, so "similar activation" does not refer to overall similarity, but refers to that low-level features at various specific distinguishabilities will activate low-level features similar to themself in the memory.

"Strong memory activation" refers to that the higher memory value a memory has, the greater capability it has to receive activation signals from other features. Therefore, information in deep memory is more easily activated.

The above three activation modes are collectively referred to as an associative activation method.

Chain activation refers to a process that the machine starts chain activation from an input low-level feature to activate multiple memory features on the basis of the principles of "adjacency activation", the "similarity activation" and the "strong memory activation".

When a low-level feature receives an activation value propagated to it and accumulates its current activation value, if the total activation value is greater than a preset activation threshold, then the low-level feature is also activated. Chain activation is also performed with the principles of "adjacency activation", the "similarity activation" and the "strong memory activation". This activation process conducts chain propagating until no new activation propagate process occurs, and the entire activation value propagating process stops, which is called a one-time of chain activation process. In order to prevent repeated activation between two low-level features, the machine needs to be restricted to not propagating a reverse activation value within a preset time period in one chain activation process after an activation value is transferred between two low-level features.

The step S4 includes: updating, by the machine, a memory library, in which the machine stores an input low-level feature into the memory library according to the simultaneous storage method; each low-level feature is stored with a memory value and an activation value; low-level features stored for the first time have initial memory values positively correlated with the activation values when they are stored; when the machine updates the memory value of the activated low-level feature in the original memory library, the increment of the memory value is positively correlated with the activation value when the update occurs. The memory values of all the low-level features in the memory library decrease over time; and the activation values of all low-level features in the memory library decrease over time.

A network composed of all the low-level features and activation value transfer relations between the low-level features is a relation network.

The low-level features serve as nodes of the relation network, and the links between the nodes are activation value transfer relations. As the activation value transfer relation is determined by similarity, adjacency and repeatability. If the size of the activation value propagating coefficient is compared to the thickness of the links, then a local network composed of multi-distinguishability low-level features connected by thick links is a concept. This is because low-level features that represent a class of things has:

(1) adjacency, as they usually appear simultaneously;

(2) repeatability, as they are common features of the class of things, so they may be repeatedly appear in this class of things;

(3) similarity, as theses low-level features are common features of a class of things, they may repeatedly appear in different memories, and connect different memories by similarity. Therefore, they constitute a concept in a general sense; they are closely connected local networks in a relation network. The local networks do not have clear boundaries, so in the examples of the present application, the contents of the concept are determined by the low-level features activated in the local network. The concept itself is open, and the contents of the concept are determined by the low-level features activated during a particular activation process.

The step S5 of establishing, by the machine, a response path, includes the following steps.

S5.1, the machine uses a collection of all the activated low-level feature as a workspace, wherein all operations of the machine on information are limited in the workspace; each time a new chain associative activation is performed, the machine needs to update its own workspace; as the activation values fade over time, the machine also needs to refresh its own workspace over time; and a low-level feature exits the workspace of the machine when the activation value of the low-level feature is lower than a preset threshold.

S5.2 is a process of establishing expectation model sequences after identifying, by the machine, input information; wherein the machine combines the expectation models of S3.4 into an expectation model sequence which includes a temporal order and a spatial order; the machine organizes the temporal and spatial orders of the expectation models according to two aspects of information; one aspect of information is input temporal and spatial orders of the expectation models, and the other aspect of information is that some of the expectation models contain information indicating temporal and spatial relations of other expectation models. After the machine establishes the expectation model sequence in S5.2, if the machine cannot establish a response path satisfying the requirement of the award/penalty information in a subsequent decision-making process, the response path established by the machine may be to further identify input information. In this case, the machine will simulate past experiences in segments according to the attention mechanism to select appropriate sensors and determine an area (space and time) for further extraction, and enter the process of S5.1 to further extract low-level features in the input information using an appropriate distinguishability according to the expected low-level features. These features are then added to the workspace of the machine to build an expectation model sequence again. Therefore, the process of establishing, by the machine, an expectation model sequence may be iterative.

S5.3, the machine determines a new workspace using the expectation model sequences through the chain associative activation process, and searches for a memory most related to the input information. The machine searches for memories associated with the expectation model sequence in the memory. The searching method is as follows: the low-level features with high activation values contained in the expectation model sequence are assigned with initial activation value again to perform the chain associative activation process. Memories with similar models and similar sequences to the expectation model sequence in the memory will get higher activation values. These memories with high activation values contain the causes that an information source previously sent out similar information, the expected purposes of the information source and the results brought by the sequence, as well as the possible award/penalty values brought by the similar expectation model sequence. This is because there are similar low-level features, temporal adjacency and repeatability relations between the expectation models and associated memories.

S5.4, the machine searches for award/penalty information in the new workspace. The machine searches for activated award/penalty symbols in the workspace. To save computation, the machine may only take award/penalty symbols with activation values exceeding a preset threshold into calculation.

S5.5, the machine sets a response target to achieve activated award information and avoid activated penalty information, and establishes a response path to achieve the response target by simulating past experiences in segments. The machine establishes a response path with a target of achieving award values and avoiding penalty values in the award/penalty symbols. The response path is an activation value propagating path between the input information of the machine and the activated award/penalty symbols. There may be multiple propagating paths, and the method for establishing the activation value propagating paths is segmented simulation.

S5.6, the machine optimizes the response path.

In a particular example, the method for segment simulation may be as follows:

Assume that a collection of input information is taken as a point A, and a collection of response targets is taken as a point B; the machine combines the point A and the point B to perform chain associative activation to search for low-level features with high activation values. These features are generally features having connection relations with the point A and the point B, and obtain activation values from both the point A and the point B, thus becoming the low-level features with high activation values. They form bridges connecting the point A and the point B. Then, each low-level feature with a high activation value is combined with other low-level features propagating activation values with it closely to establish one or more expectation models, which are intermediate nodes. In this way, the machine establishes one or more response paths from the point A through the intermediate nodes to the point B. As both the point A and the point B contain multiple elements, the machine may establish multiple response paths between different elements and different nodes from the collection of point A to the collection of point B.

It should be noted that, unlike a fully open information search range, in an example of the present application, the information search range of the machine may be limited to the workspace of the machine, that is, a collection of all the activated low-level features.

It should also be noted that in the present application, the basic operation object for establishing a response path is the low-level features, rather than a language or concepts. The relation between information is expressed by activation value transfer relations between low-level features, rather than by a semantic space, a vector space, or logical definitions.

Once the response path is established, the machine needs to assess the response path. The nature of assessing the response path is to calculate the possible award/penalty value brought by each response path. In the relation network, the machine first progressively expands the relation network according to simultaneous storage, similarity relations, adjacency relations and repeatability relations on the basis of the preset demand, award/penalty and emotion systems and the preset instinct knowledge, and establishes activation value transfer relations between external information and its own award/penalty symbols.

When external information is input, the machine extracts features, for example, common features, in the input external information, and searches for the similar processes in the memory, and then predicts the possible award/penalty value that a process may bring according to the award/penalty values obtained by such processes in the past.

In the process of assessing the response path or executing the response path, the machine may use a similar method again which takes a start point and an end point of any segment of the response path as a new point A and point B, and expands the path again, which is a method of segmented simulation. The experiences learned by the machine may be different in each time of expanding the response path. Thus, the response path established by the machine is formed by combination by learning different experiences in segments. This process is therefore called a segmented simulation process.

Each time the machine establishes a response path, there may be multiple states including, but not limited to:

State A: multiple different expectation models may be formed from the same low-level features with high activation values, and each model has a certain probability to be true; in this case, it is possible for each expectation model to establish an activation value propagating path from the input to the award/penalty information. Each path serves as a possible response path.

State B: there may be multiple different activation value propagating paths between the same input and the same award/penalty information.

State C: the machine cannot find a high activation value propagating path from the input low-level features to the activated award/penalty symbols.

The same response path may activate both award symbols and penalty symbols, so the machine needs to calculate the total award/penalty value for the same response path. Which path an award/penalty value of a particular award/penalty symbol belongs to may be determined by looking for which path contains an expectation model the activation value of this award/penalty symbol comes from. If the activation value of an award/penalty symbol comes from expectation models in multiple paths, then the award/penalty value of the award/penalty symbol should be taken into calculation when the award/penalty value of each path is calculated.

A method for calculating the award/penalty value of a particular response path is as follows:

$$\text{AR\_PU\_Total} = \sum_{k=1}^{n} AR_k - \sum_{k=1}^{n} PU_k,$$

where AR_PU_Total is a total award/penalty value obtained by calculation for a particular response path, $AR_k$ is an activation value propagates to a particular award symbol by an expectation model, and $PU_k$ is an activation value propagated to a particular penalty symbol by the expectation model. The activation value itself reflects the probability P of occurrence of the expectation model during the propagating process, because if the expectation model contains a relatively small number of low-level features with high activation values, the probability that the model is true is relatively low, and the total activation value propagated to the award/penalty symbols from the low-level features with high activation values contained in the model is also low; and on the contrary, if the expectation model contains a relatively large number of low-level features with high activation values, the probability that the model is true is relatively high, and the total activation value propagated to the award/penalty symbols from the low-level features with high activation values contained in the model is also high. The machine then may estimate the possible award/penalty value brought by a particular response path by only calculating the activation value propagated to the award/penalty symbols from the expectation model contained in the response path.

Another method for calculating the award/penalty value of a particular response path is as follows:

$$\text{AR\_PU\_Total} = \sum_{k=1}^{n} f1(AR_k, P_k) - \sum_{k=1}^{n} f2(PU_k * P_k),$$

where AR_PU_Total is the total award/penalty value obtained by calculation for a particular response path; f1 is a statistical function of award values; f2 is a statistical function of penalty values, which is an award assessment value of the expectation model, and is positively correlated with a memory value of a corresponding award symbol; $AR_k$ is a penalty assessment value of the expectation model, and is positively correlated with a memory value of a corresponding penalty symbol. $P_k$ is the probability of each expectation model to be true, i.e., the confidence of the expectation model; the calculation method of $P_k$ is as follows: assuming that there are N high-activation-value features (elements) in the expectation model, and M of them (existing in the input information) have occurred in the current determination, then P=fp (M, N), fp being a probability function, for example, fp=M/N, or $fp = \sum_{k=1}^{M} A_k / \sum_{k=1}^{N} A_k$, namely, to determine the ratio of the sum of the activation values of the M low-level features to the total activation value of the N low-level features. Of course, other functions may be used, which need to be preferably selected in practice.

If the total award/penalty value of a response path exceeds an award threshold for the machine when performing a response, and reaches a preset adoption standard of the machine, the machine takes a target of achieving this response path.

If the total award/penalty value of a response path is less than a penalty threshold for the machine when performing a response, and reaches a preset avoidance standard of the machine, the machine takes a target of avoiding this response path.

If the total award/penalty value is between the two, and the machine cannot make a decision, then the machine needs to further identify more input information, and the machine may also separately calculate the award values and the penalty values, and establish a two-dimensional space and an adoption range, an avoid range and a further identification range in the space.

Of course, the machine may also separately calculate different types of award values and penalty values, and establish a multi-dimensional space and an adoption range, an avoid range and a further identification range in the space.

If the machine cannot find a high-activation-value propagating path from the input low-level features to the activated award/penalty symbols, the machine also needs to further identify more input information to optimize the response path and to further calculate the award/penalty values.

The step S5.6 of optimizing, by the machine, the response path is achieved via a method including some or all of the following steps:

S5.6.1, establishing, by the machine an attention mechanism;

S5.6.2, continuously extracting, by the machine, additional input low-level features through the attention mechanism, and further identifying the input information with a concept open and iterative identification mechanism;

S5.6.3, establishing, by the machine, a self model;

S5.6.4, establishing, by the machine, models of other agents other than the self model;

S5.6.5, predicting, by the machine, feedback of the models of other agents to the response path of the machine;

S5.6.6, optimizing, by the machine, each response path again taking the feedback as a virtual input;

S5.6.7, selecting, by the machine, an optimal path for achieving of each response target according to a benefit-seeking and harm-avoiding method, and establishing an execution order of the optimal paths as an overall response path.

In S5.6, after each time that new information is input, the machine needs to perform the chain associative activation process, and also needs to search for paths to achieve the awards and avoid the penalties in an updated workspace again. The collection of these paths is the overall response path. The machine needs to make choices in the response paths to select optimal response paths, and expand these response paths into procedures that can be performed, which is the machine's optimization of response paths.

To implement an award symbol or to avoid a penalty symbol, the machine may find multiple response paths, and the machine needs to pick the optimal response path therefrom.

If the total award/penalty value of these paths is clear, the machine may select the path which brings the highest award value according to the benefit-seeking and harm-avoiding principle. If there is any path among these paths for which the machine cannot decide whether to choose or reject, the machine needs to further identify the input information to increase the confidence of the expectation model, thereby further calculating the total award/penalty value of the path, and deciding whether to choose this response path.

When further identifying the input information, the machine refers to a spatial or temporal relation between features which have appeared in the input and features which have not appeared in the input in the expectation model, and predicts the temporal or spatial locations where the features which have not appeared may appear based on the temporal and spatial locations of the features have appeared currently. The low-level features with high activation values, which have not appeared in the expectation model, are the expectation features. The machine allocates the temporal and spatial locations of searching to the sensors of the machine according to the time, space and size of the expectation features in the expectation model, and determines the types of sensors used according to the attributes (such as voice, image or touch sense) of the expectation features, as well as the distinguishabilities required according to the attributes (such as size) of the expectation features. The above-mentioned process itself is also a kind of response path of the machine, which needs to be completed by a response path execution process, and the response path is established and optimized, and executed by segmented simulation. The mechanism described above is the attention mechanism of the machine.

The attention mechanism is a means for extracting low-level features from the input information, and the machine extracts low-level features from the input information according to an identification range and distinguishability given by the attention mechanism. When extracting data in a specific range, the machine firstly extracts low-level features with prioritizing overall features, such as overall topology, contour, main lines and main texture in the selected range; the machine searches for memories related to the obtained low-level features in the relation network, combines these related memories into an expectation model, and obtains the award/penalty value information related to the expectation model; according to the obtained award/penalty information, the machine uses a decision-making system to decide whether to further identify the input information or to respond to the information according to award/penalty information currently predicted for the input information; if the machine decides to further identify the input information, the machine combines low-level features with high memory values in the related memories into an expectation model; the machine refers to a spatial or temporal relation between features which have appeared and features which have not appeared in the expectation model, and predicts the temporal or spatial locations where the features which have not appeared may appear based on the temporal and spatial locations of the features have appeared currently; and the machine then searches for corresponding temporal and spatial locations according to the time, space, and size of expectation features by simulating past experiences, and determines the sensors and distinguishabilities to be used based on the attributes of the expectation features, and iterates the above steps to further extract low-level features from the input information. Therefore, the machine iteratively extracts local features of the input information through the attention mechanism, and each extraction process may use different sensors, different identification ranges and different distinguishabilities. As a result, for the same input thing, the machine may extract low-level features of different types in different ranges with different distinguishabilities, and combine these low-level features to form a hierarchical representation of the same thing.

The machine, driven by the attention mechanism, after further extracting low-level features from the input information, needs to further optimize the response path according to the steps of S3, S4 and S5 until an optimal response path is determined for each selected award/penalty symbol. In an example of the present application, the machine only needs to take the award/penalty information having activation values exceeding a preset threshold into calculation.

In S5.6.2, with regard to specific implementation of the concept open and iterative identification mechanism, the process of iterative identification performed on the input information according to the attention mechanism is also a process of iterative classification for the input information. The common features of the same kind of things repeat frequently in the same kind of things, so their memory values are also high. Because they are common features of the same kind of things, they do not provide high discrimination when they are used to identify more specific things in the same kind of things. So they are low-distinguishability low-level features, such as topology, shape, contour, main texture, etc., that contain a wide range of things, but have a low distinguishability in determining a specific thing.

Therefore, in an example of the present application, high-activation-value low-level features are used to constitute expectation models, which theoretical basis is that the high-activation-value low-level features come from two sources. The first source is the common features of the same kind of things. Because the common features are widely present in the same kind of things, they are likely to appear in the input information, and similar low-level features may be activated by similarity. Because common features are widely present in the same kind of things, they often appear together, and the activation value may be propagated through adjacency activation, thereby increasing each other's activation value. Because common features are widely present in the same kind of things, their repeatability is very high, and they are usually high-memory-value low-level features, and they may obtain high activation values through strong memory activation. Therefore, in an example of the present application, the method for identifying information is to firstly identify a large class with the common features of the same kind of information, and then uses an iterative method to progressively add more low-level features to limit the range.

Another source for obtaining high activation values is: if there are some input low-level features similar to low-level features in a specific memory, then this specific memory would be directly activated due to the similarity activation, and other low-level features in adjacency and a strong memory relation with it would also be prone to obtain high activation values. Therefore, in a relation network, a model in this specific memory would be selected as an expectation model due to the high activation value. This is a way to quickly locate the expectation model through specific low-level features.

Hence, in an example of the present application, the process of identifying the input information is not to identify which class it belongs to with a certain unique feature, but to firstly identify which large class it belongs to with common features, and then determine which specific subclass it belongs to with the unique feature, and the machine continues to iteratively increase features for identification through the attention mechanism. In this process, the activation values of previously activated memories will fade over time, while for memories activated by new features, their activation values will continue to increase or maintain, and expectation models composed of low-level features with high activation values also change from one or more general concepts to more specific concepts. In this way, the machine limits the range of the expectation models by progressively increasing the low-level features, thereby transforming abstract concepts into more specific concepts. Therefore, if detail features in the input information conform to a particular expectation model Mx while overall features in the input information do not conform to the expectation model Mx, the machine will first reject the expectation model Mx with the overall features in the identification process.

It should be noted that the expectation model may be static or dynamic. One or more linguistic symbols and a combination of linguistic symbols can be included in the expectation model; since linguistic symbols are highly abstract and widely used, it is usually expected that the highest activation value feature in the model is language feature. This makes language the most commonly used activation entry for concepts.

In S5.6.3, with regard to specific implementation of establishing, by the machine, a self model, as a demand and a state that the demand is satisfied are closely related to the self model, for example, if processes, such as "charging" and "maintenance", occur on other machines, the demand and the state that the demand is satisfied of the machine itself do not change, and no corresponding award value is produced, and if the processes occur on the machine itself, a corresponding award value will be produced, so the self model of the machine is often closely connected with the award/penalty information of the machine itself.

The method of establishing, by the machine, a self model is as follows: the machine uses high-memory-value low-level features of things similar to itself in the memory to establish a common expectation model for similar things, where this model usually lacks details, but has a wide application range; and the machine adds high-memory-value low-level features of itself to the common expectation model for similar things to form the self model of the machine.

With the narrow concept of "self model", the machine learns on the basis of a preset relation network and progressively expands the relation network by memory accumulation, thereby progressively establishing activation value transfer relations between various award/penalty information and the "self model". Therefore, driven by a "benefit-seeking and harm-avoiding" decision-making system, the machine may have a behavior pattern of "implementing" things that bring awards to it, and "avoiding" things that bring penalties to it, so as to satisfy its own needs. The machine thus shows "self-awareness".

In S5.6.4, with regard to specific implementation of establishing, by the machine, models of other agents, a method similar to the method that the machine establishes the self model is used, and the machine establishes a specific expectation model with the common low-level features of other agents and specific features of an analysis object. The models of other agents of the machine are often used to assess the feedback of other agents to the behavior of the machine as a part of the decision system of the machine.

The process of establishing the models of other agents by the machine is to conjecture connection relations between the demand, award/penalty and emotion systems of other agents and other information. These relations are the basis of behavior patterns of other agents.

The machine needs to get parameter models of the demand system, the award/penalty system, the emotion system, and the decision-making and execution system of the analysis object from a common model of the analysis object. The common model is obtained as follows, the machine takes the high-memory-value features contained in the analysis object, assign initial activation values to them, searches for high-activation-value low-level features among them through the chain associative activation process, and combines these low-level features into the common model of the analysis object.

Then, the machine simulates the decision-making process of it, and adjusts related parameters in the demand system, the award/penalty system, the emotion system, the decision-making and execution system to establish a mapping from information input to behavior output of the analysis object. The information input and behavior output about the analysis object come from the memory or input information of the machine itself, so there may be deviations. The machine iterates the process described above, until the machine, by adjusting the parameters, produces an input-output mapping relation matching with a memory actually about a specific object. The machine then stores the adjusted parameter models together with other input information of simultaneity as a model for the specific analysis object, which may be directly used as a model when the analysis object is referred to later.

In S5.6.5, with regard to specific implementation of predicting, by the machine, feedback of other agents to the response path of the machine, after the machine establishes the response path, the machine still needs to further analyze the feedback of other agents to the response path of machine. Each response path established by the machine itself may bring different external feedbacks, and this may lead to different award/penalty values. Therefore, the machine needs to incorporate the feedback of other agents to its response path into the award/penalty value calculation process, so as to determine the optimal response path.

The first step in S5.6.5 is that the machine establishes a model of an analysis object according to the method in the step S5.6.4; and the second step in S5.6.5 is that the machine conjectures possible feedbacks of other agents to the response path of the machine.

After establishing the models of other agents, the machine takes the models of other agents as a single input information, and after chain associative activation, all the activated information is taken as a relation network X of other agents.

The machine takes the current input information, including its own response path, as a virtual output which is used as overall input information of other agents, performs chain associative activation in the relation network X to search for high-activation-value low-level features, and establishes an expectation model with these high-activation-value low-level features as the center. The machine searches for award/penalty information according to the same method as in the step S5.5, and establishes a response path by segmented simulation according to the same method in the step S5.5. In this process, the relation network used by the machine is the relation network X of other agents. The parameter models of the demand system, the award/penalty system, the emotion system, the decision-making and execution system used by the machine are derived from the models of other agents. Therefore, the machine conjectures the decision-making process of other agents in a manner of benefit-seeking and harm-avoiding on the basis of decision-making models of other agents and the possible relation network of other agents.

In S5.6.6, with regard to specific implementation of optimizing, by the machine, each response path of the machine, after analyzing the possible feedback of other agents, the machine needs to take the feedback of the analysis object as a virtual input information, add it to the overall input information, and perform the step S3, the step S4 and the step S5 to further optimize the response path.

The machine iterates the method described above to optimize each response path until either the award/penalty value brought by the response path is converged or the award/penalty value of the response path reaches a preset standard.

In S5.6.7, with regard to specific implementation of optimizing, by the machine, an overall response path of the machine, the award/penalty value brought by each response path of the machine may influence each other. For example, some response paths may share a sub-path, and the sub-path may bright different award/penalty information to the machine. For example, in path A, the sub-path brings an award value, while in path B, the sub-path brings a penalty value. For example, some sub-paths have contradictions between recent benefits and future benefits, then the machine needs to weigh the recent reward/penalty value against the future award/penalty value brought by this sub-path. For example, if the machine has an urgent recent demand, the award symbol representing the recent benefits may have a high activation value, then the machine will prefer to select this sub-path after calculating the overall award/penalty value; if the award/penalty symbol representing the future benefits has a high activation value, the machine may endure the current penalty and select the sub-path that brings the penalty. The method for calculation the award/penalty value by the machine involves only mathematical statistics, which can be achieved by known common knowledge, and will not be described in detail herein.

The step S6 of executing, by the machine, the response path, specifically includes:

S6.1, further expanding, by the machine, the response path into a low-level driver command sequence;

S6.2, establishing, by the machine, appropriate low-level driver command parameters through attribute experience generalization; and S6.3, executing, by the machine, the response path.

In S6.1, after the machine establishes the optimal response path, the machine needs to execute the optimal response path so as to achieve awards and avoid penalties. When the machine executes the response path, the response path needs to be further decomposed into low-level driver commands that can be directly executed by the machine, and then the machine implements the response path by executing a low-level driver command sequence. The method that the machine decomposes the optimal response path into the low-level driver command sequence is also a segmented simulation method.

In the step S5.5, the machine expands the response path through the segmented simulation method until the machine can determine the award/penalty value of the whole path, while in the step S6.1, the machine employs the same segmented simulation method to expand the response path into low-level driver commands that can be directly executed by the machine.

In an example of the present application, the segmented simulation process is also an experience generalization process, in which the machine reorganizes multiple pieces of past experiences to solve current problems. In an example of the present application, experience generalization is to use high-activation-value low-level features as a medium to generalize past experiences, and as the high-activation-value low-level features are either common features of the same kind of things or specific low-level features related to the current input information, their experiences are experiences that can be leaned currently, so that the method of segmented simulation for expanding the response path is also called process experience generalization.

The response target of the machine is to achieve awards and avoid penalties. The response path is the way to achieve the response target, and the precondition for implementing the response path is that each expectation model in the response path can be achieved, while the achievement of the expectation model requires that low-level features contained in the expectation model can be achieved. Therefore, the implementation process of the response path is to increase the probability of achieving high-activation-value low-level features in the response path brought awards and to reduce the probability of achieving high-activation-value low-level features in the response path brought penalties.

In the expanded sub-response paths, an expectation model contains temporal and spatial information. Therefore, the machine can learn from past experiences and take the time and space of the current input into account during expanding, so as to expand the execution path under the current temporal and spatial limitations. In this way, the execution sequence of the machine is automatically completed during expanding of the response path, and as there are temporal and spatial information in the past experiences and the current input also contains temporal and spatial information, the experiences matched in time and space will have higher activation values and therefore will be selected by the machine to compose the expanded response path.

In the step S5, the machine further identifies the input information through the attention mechanism, which is also a process of executing, by the machine, the response path. In this process, the optimal response path established by the machine is to call the appropriate sensor type and distinguishability, as well as the temporal and spatial locations that need to be identified to further identify the input information. The execution process of the machine also employs segmented simulation, and the response path is expanded to a low-level driver command sequence. During expanding, the order of execution of each sub-path can also be established automatically.

In the step S6.2, with regard to specific implementation of establishing, by the machine, appropriate low-level driver command parameters through attribute experience generalization, in the process of executing a response, the machine may encounter that an operation object of a low-level driver command is a new object, and there is no suitable related command parameter. At this time, the machine needs to search for high-activation-value low-level features (namely, attributes) contained in the new object, and search in driver command experiences for experiences in which the operation object contains similar low-level features, and use command parameters of these experiences as command parameters of current operation on the new object. The search method is to take the attributes of the new object and the driver command as input information, perform chain associative activation in the relation network, and obtain a driver command memory with the highest activation value, which is an experience that can be learned. This method of using an experience closely related to the attributes with common attributes is the attribute experience generalization method.

For example, when the machine is to carry a crystal cup, the machine may have no experience for carrying a crystal cup. However, by segmented simulation, the machine may find high-activation-value low-level driver commands, which may include: experiences for carrying objects of similar weight to cups, experiences for carrying objects of similar size to cups, experiences for carrying valuable objects, experiences for carrying fragile objects, etc. However, the response path established by the machine may contain a path in which a high penalty value may be brought if the cup breaks. One of the response paths of the machine is to avoid the implementation of this path. Therefore, after expanded by segmented simulation, this path will contain sub-paths to avoid the cup being touched, and to avoid the cup dropping accidentally, etc. When the sub-paths are further expanded, it needs to careful plan a path of the cup in space, appropriate force to hold the cup, etc. These sub-paths are further expanded into a series of low-level driver commands. Thus, even if the machine has no experience related to carrying a crystal cup, experiences related to corresponding attributes can be found. For example, the machine determines command parameters of driving muscles using the low-level driver command parameters of carrying an object of similar weight, plans a path in the air using the experience of carrying a valuable object, and determines force parameters of a grasping command using the experience of carrying a fragile object, etc. What has been described above is an exemplary illustration of the attribute experience generalization process, which is also a segmented simulation process automatically completed using high-activation-value low-level driver commands without any special steps. The method for the machine to obtain these attributes is to use the attention mechanism and the chain associative activation process. For example, when the machine identifies the input information, a low-level feature related to the location where the cup is placed may activate a memory hidden low-level feature related to "valuable" (for example, being placed in a high-grade shop window, which is a result of previous identification and response of the machine), for example, an appearance feature similar to glass may activate a memory hidden low-level feature "fragile". These memories will further activate the award/penalty symbols stored in the memories. These activated award/penalty symbols may further affect the decision-making and execution behavior of the machine.

In S6.3, with regard to specific implementation of executing, by the machine, the response path, the machine plans the response path and executes the response path by means of segmented simulation. The segmented simulation method is essentially an activated experience generalization process. The machine expands the response path through process experience generalization to achieve the response target, and learns from command parameters of operations on similar attributes through attribute experience generalization to implement the response path by executing the low-level driver command sequence.

The path decomposition, path assessment and simulation execution of the machine are interleaved. During the execution of the machine, new information may be continuously input. Every time new information is input, the machine changes the distribution of activation values through the chain associative activation process, which is equivalent to the machine updating its own workspace. All the subsequent activities of the machine, including updating the response target and the response path, and executing the updated response path, are based on the current latest workspace.

The step S7 of updating, by the machine, the relation network, specifically includes:

In the execution from the step S1 to step S6, the machine needs to store input low-level features into a memory library according to a simultaneous storage method. The input low-level features also include demand information, award/penalty information and emotion information activated because the demand deviates from a proper range. The stored low-level features also need to maintain their memory values in accordance with a memory and forgetting mechanism, and need to maintain their activation values in accordance with the chain associative activation method.

In an example of the present application, an activation value achieving method is to store activation values along with low-level features. The input low-level features are assigned with initial activation values by an initial activation value assignment program, and the activation values of demand symbols, award/penalty symbols and emotion symbols activated because the demand deviates from the proper range are determined by a mapping relation between the built-in demand, award/penalty and emotion systems. As the memory values and activation values stored along with the low-level features will face over time, the machine needs to periodically refresh the memory values and activation values in the memory library, either through a dedicated refresh hardware module or through software.

In an example of the present application, the updating the memory library goes through all the steps, which is not a single step. The step S7 of updating, by the machine, the relation network include storing new low-level features and their memory values, also includes updating original memory values of the low-level features, and also includes updating the activation values of all the features.

In summary, the example of the present application have at least one of the following technical effects:

(1) in S3.1, the machine extracts low-level features from the input information using the attention mechanism, and progressively establishes a relation network for expressing experiences of S4 using the low-level features together with the command, award/penalty and emotion symbols of the machine to through the simultaneous storage method of S3.2 and the chain associative activation method of S3.3;

(2) in addition, in S5.1, the machine uses the low-level features input in S3, and searches in S5.2 and S5.3 in the relation network of S4 for experiences related to the current input low-level features; in S5.4, the machine calculates award/penalty information contained in the related experiences, and selects a response target of achieving awards and avoiding penalties in a manner of benefit-seeking and harm-avoiding; in S5.5, the machine reorganizes past experiences capable of achieving the response target to establish a new response path; and S5.6 includes that the machine assesses whether the established response path is optimal: taking the response path as a virtual output, and searching for experiences related to both the current input information and the current virtual output in the relation network again;

(3) the machine can iterate the methods of S5.2 to S5.6.6, until in the established response path, the award is maximized and the penalty is minimized; when the machine establishes an optimal response path, S5.6.7 successively takes each sub-target to be achieved in the finally established response path as a new response target, and uses the methods in S5.2 to S5.6.6 again to establish a low-level optimal response path for achieving the sub-target;

(4) the machine can iterate the method described above to decompose an optimal response path layer by layer into low-level driver commands that can be directly executed; each decomposition is performed according to the methods in S5.5 to S5.6.7;

(5) in S6, the machine can implement the overall response path by executing the low-level driver commands layer by layer; the layer-by-layer decomposition process and layer-by-layer execution process of the machine can be interleaved; during the layer-by-layer decomposition process and layer-by-layer execution process, if there is new information input, the machine needs to jointly process all the information according to the steps of S3.1 to S5.6.7;

(6) two or more same core devices of general-purpose artificial intelligence obtained according to the establishment method of an example of the present application can accumulate individual memories with award/penalty experiences after the artificial intelligence runs for a period of time under different environments, and may generate different behavior responses corresponding to environment specialization even when receiving the same instruction; and (7) two or more same core devices of general-purpose artificial intelligence obtained according to the establishment method of an example of the present application, can combine individual memories with award/penalty experiences obtained after running for a period of time under different environments, and re-perform artificial intelligence on the accumulated massive combined memories to find an optimal response path, so that the artificial intelligence is more intelligent; the way of integration can be pairwise short-distance information communication exchange or back-end communication via the Internet.

DETAILED DESCRIPTION

The following will clearly and completely describe the technical solutions in the embodiments of the present application in conjunction with the drawings of the embodiments of the application. Obviously, the described embodiments are only a part of the embodiments for understanding the inventive concept of the application, and cannot represent all the embodiments, and are not to be interpreted as the only possible embodiments. Based on the embodiments in the examples of the present application, all other embodiments obtained by a person of ordinary skill in the art on understanding the inventive concept of the present application fall within the scope of protection of the present application.

Figure 1:
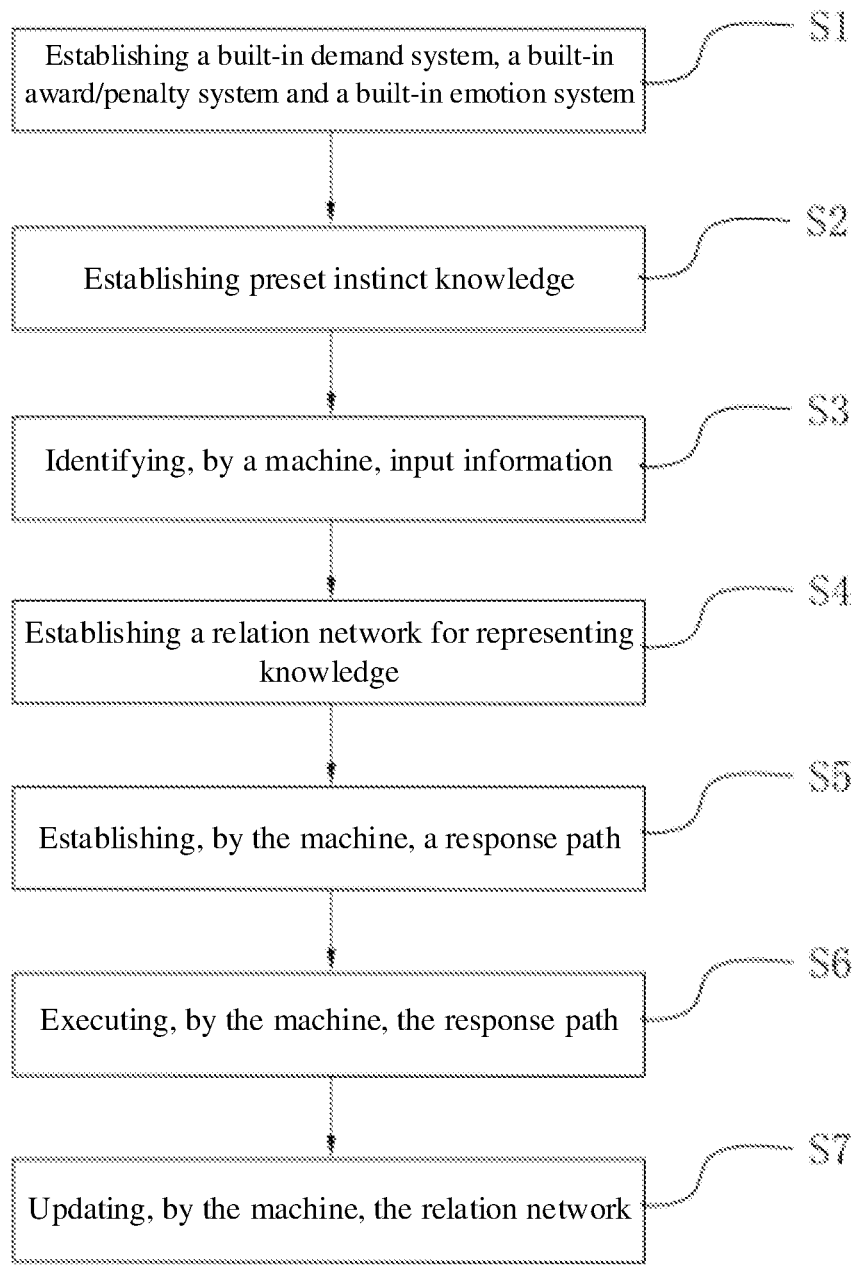
FIG. 1 is an exemplary diagram showing a method for establishing general-purpose artificial intelligence according to an example of the present application.
Figure 2:
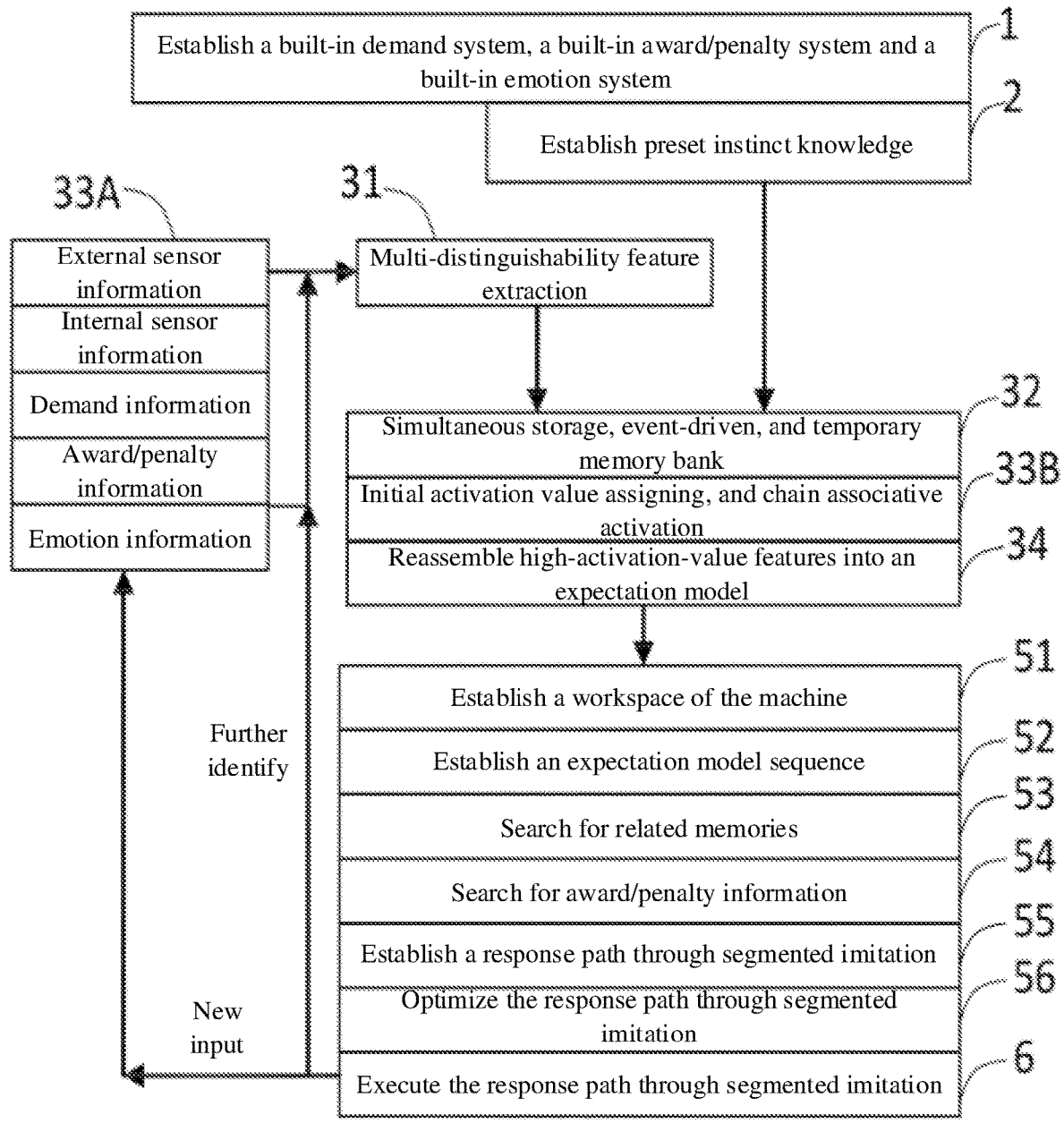
FIG. 2 is an exemplary functional diagram showing implementation of general-purpose artificial intelligence according to an example of the present application.

FIG. 1 is an exemplary diagram of a method for establishing general-purpose artificial intelligence, and FIG. 2 is an exemplary functional block diagram. It is important to be noted that in the method disclosed in the present application, emphasis is placed on establishing a relation network and how to establish, optimize and execute a response path by means of segmented simulation, as shown in FIG. 2. Therefore, a person skilled in the art would also have been able to create a functional block diagram different from FIG. 2 by using the method for establishing a relation network disclosed in the present application, or the method for segmented simulation.

In FIG. 1, the front process of a method for establishing general-purpose artificial intelligence includes:

S1 represents that a built-in demand system, a built-in award/penalty system, and a built-in emotion system are established, which is implemented with preset data and programs;

S2 represents that instinct knowledge is established, which is implemented with preset data and programs; and S3 represents that a machine identifies input information.

Figure 3:
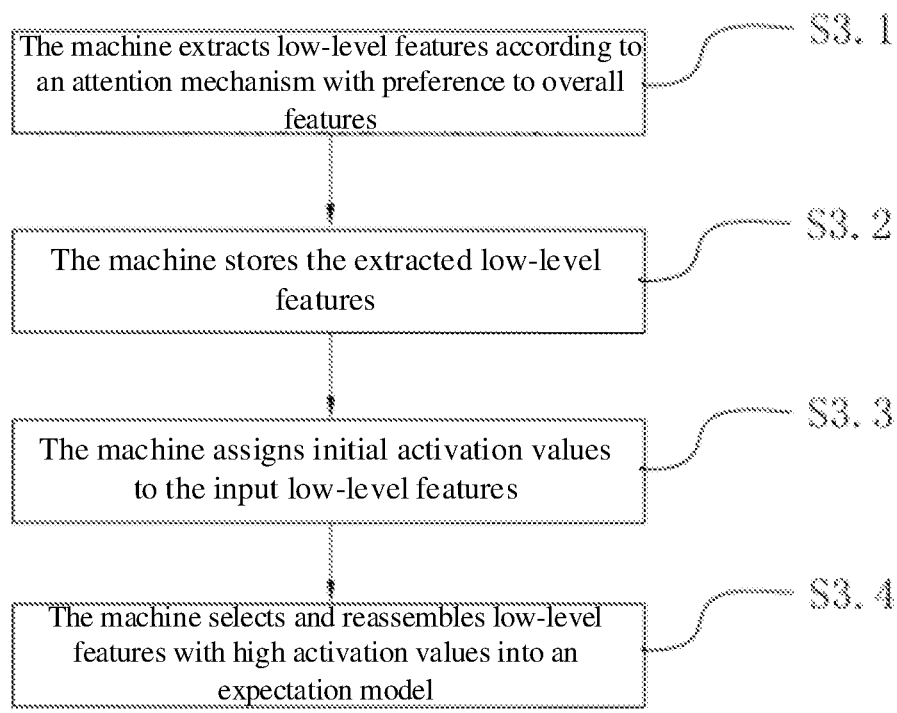
FIG. 3 is an exemplary diagram of a method for implementing a step S3 of identifying input information by the machine according to an example of the present application.

As shown in FIG. 2, the front process is used for establishing a preset model composed of low-level features. As shown in FIG. 3, a method of implementing step S3 of identifying, by the machine, input information specifically includes steps S3.1 to 3.4 described above. A device for implementing the step S3.1 described above includes a module 31, which is a low-level feature extraction module of the machine. The machine extracts features from the input information according to a principle with prioritizing overall features within an attention range. The low-level features iteratively extracted by the machine through the attention mechanism constitute a multi-distinguishability low-level feature combination. The algorithm of the low-level feature extraction module can be implemented with separate hardware to improve the execution efficiency.

With regard to the low-level features, the primary function of the low-level features is for the machine to determine an information search range in the relation network using the input low-level features. The input low-level features of the machine may include low-level features extracted from sensor data, and their activation values are assigned to them by an initial value assignment program, and the initial value assignment program may carry out the assignment according to a low-level feature storage method as described later in (2.2). The input low-level features of the machine may contain demand symbols, award/penalty symbols and emotion symbols activated by the demand system, which are also a part of the input of the machine, and their activation values may also be propagated in the relation network. Through a chain associative activation process, the machine propagate activation values in the relation network, and a collection of all the activated low-level features is the information search range determined by the machine, namely, a workspace of the machine.

A device for implementing the step S3.2 includes a module 32, which is a memory storage module. A memory library of the module 32 contains preset data and programs for implementing step S1 and step S2; corresponding to a device 1 and a device 2 as shown in FIG. 2, which implement step S1 of establishing a built-in demand system, a built-in award/penalty system and a built-in emotion system and step S2 of establishing preset instinct knowledge, respectively. The module 32 also stores input data according to a simultaneous storage and event-driven mechanism and a temporary memory mechanism.

With regard to simultaneous storage, a particular embodiment include:

(2.1) the machine saves relative temporal locations that low-level features appear in the input information; one method to do this is: the machine uses a distance of the low-level features in a storage space to reflect a time distance between the moments when the low-level features are stored, for example, the machine stores the low-level features in sequence according to an input time order; another storage method for saving the relative temporal locations is that each feature has three-dimensional coordinates in a memory space; the three-dimensional coordinates in the memory space mainly include storage time information of the low-level feature;

the machine saves relative spatial locations that low-level features appear in the input information; one method to do this is: the machine places low-level features extracted each time overlapping with original data according to locations, angles and sizes of the highest similarity with the original data, and saves relative spatial locations of the low-level features during storing;

the machine uses the activated demand symbols, award/penalty symbols and emotion symbols as an input low-level feature, and store them as an input low-level feature according to the same method as other types of low-level features;

(2.2) when storing each extracted low-level feature, the machine simultaneously stores an initial memory value and an initial activation value of the low-level feature;

for an external input low-level feature, its initial activation value is a function of expected award/penalty information, demand information of the machine and emotion information of the machine: $AINT=fa(V, R, E)$, where AINT is the initial activation value assigned to the low-level feature, V is expected award/penalty information, R is current demand information of the machine, and E is current emotion information of the machine; the machine may assign same initial activation values to low-level features extracted for a single time through the attention mechanism according to the above-mentioned method;

however, the activation values of the demand symbols, award/penalty symbols and emotion symbols activated by the demand system of the machine directly come from mapping relations from the activation values of the demand symbols to the activation values of the award/penalty symbols and activation values of the emotion symbols;

an initial memory value stored along with a low-level feature is $MINT=fm(A)$, wherein MINT is an initial memory value, A is the activation value of the stored low-level feature, and fm is a function providing a positive correlation between MINT and A;

(2.3) the low-level features stored in the memory library decrease over time and increase as the number of activations increases; after the original low-level feature is activated, the increment of the memory value thereof is $M1=fm1(A)$, where M1 is an increment of the memory value, A is the activation value of the low-level feature at the time when the storage occurs, and fm1 is a function providing a positive correlation between M1 and A;

(2.4) the machine compares the low-level feature currently extracted with a low-level feature previously extracted, and by comparing the similarity and the activation values, if there is a change exceeding a preset threshold, this is called that an event has occurred; after an event occurs, the machine uses the methods in steps (2.1), (2.2) and (2.3) again to store the input low-level features; the machine first stores the extracted low-level features into temporary memory, which uses a faster forgetting mechanism.

A device for implementing the step S3.3 includes a sensor module 33A and a value-assigning activation module 33B, and the machine also needs to maintain memory values and activation values in the memory library of the module 32. One implementation is to use a separate memory value and activation value refresh module. The refresh module periodically refreshes the memory values and the activation values according to a preset forgetting mechanism and a preset activation value fading mechanism. At the same time, the machine also updates, via the refresh module, the low-level features extracted by the sensor group module 33A for implementing step S3.3 via the module 31 and the activation values propagated from the activation module 33B, in the memory library of the module 32, and assigns initial memory values to the low-level features or adds corresponding memory values according to the activation values. After the demand value of the machine deviates from a proper range, the sensor group module 33A assigns activation values to corresponding demand, award/penalty and emotion symbols through a preset program. The value-assigning activation module 33B assigns initial activation values to the low-level features extracted by the machine in step S3.3 via an initial activation value assignment program of the machine The activation values of the sensor group module 33A serving as an external source of information and the value-assigning activation module 33B serving as an internal source of information, are propagated in a chained in a relation network according to adjacency activation, strong memory activation and similarity activation. The initial relation network for chain propagating in step S3.3 is a preset relation network, and initially a preset base network uses the built-in demand system, award/penalty system and emotion system as well we the instinct knowledge as starting general knowledge. The instinctive knowledge is used for helping the machine to establish the initial relation network by simulating a human relation network, including: methods such as instinct identification and response, a set of symbols to propagate human award/penalty information, and preset multi-segment memory. On this basis, the relation network is continuously expanded by continuously storage, continuously forgetting, and continuously use (activation). In the lifelong learning, the general-purpose artificial intelligence is progressively transformed into a special-purpose artificial intelligence in the core operation practice of artificial intelligence, in which the initial general behavior shows like an ordinary person, while the special-purpose implementation after operation shows like an expert.

With regard to chain associative activation, a particular embodiment includes:

When the machine propagates the activation values in the relation network, it proceeds according to the principles of "adjacency activation", "similarity activation" and "strong memory activation";

under the principle of "adjacency activation", after a specific low-level feature in the relation network is activated, it will propagate the activation value to low-level features adjacent to it in the storage space;

under the principle of "similarity activation", after a specific low-level feature in the relation network is activated, it will propagate the activation value to low-level features similar to it in the storage space; and under the principle of "strong memory activation", the higher memory value a low-level feature has, the greater capability it has to receive activation signals from other low-level features.

With regard to propagating of activation values, a particular embodiment includes:

in "adjacency activation", the activation value obtained by an adjacent low-level feature is $A_{tn}=f_{tn}(A, L, M_r)$; where $A_{tn}$ is the activation value obtained by the adjacent low-level feature, A is the activation value possessed by a low-level feature initiating adjacency activation, L is a distance between the two in a memory space, and $M_r$ is a memory value of the low-level feature receiving the activation value; where $f_{tn}$ is a propagating function, $f_{tn}$ is a monotone increasing function of A, $f_{tn}$ is also a monotone decreasing function of L, and $f_{tn}$ is a monotone increasing function of $M_r$;

in "similarity activation", the activation value obtained by a similar low-level feature is $A_{ts}=f_{ts}(A, S, M_r)$; where $A_{ts}$ is the activation value obtained by a similar low-level feature, A is the activation value possessed by a low-level feature initiating similarity activation, S is a similarity obtained by similarity comparison between the two, and $M_r$ is the memory value of the low-level feature receiving the activation value; where $f_{ts}$ is a propagating function, $f_{ts}$ is a monotone increasing function of A, $f_{ts}$ is a monotone increasing function of S, and $f_{ts}$ is a monotone increasing function of $M_r$; and in "strong memory activation", the activation value obtained by the low-level feature receiving the activation value in "adjacency activation" and "similarity activation" is positively correlated with the memory value.

The activation value of the low-level feature would decrease over time, and the activation value would decrease over time in a manner of $A_N=f(A_0, delta\_t)$; where $A_N$ is an activation value at the current moment, $A_0$ is an activation value at the previous activation value update moment, delta_t is a time interval between the two activation value update moments, and f is a negative correlation function of delta_t. When a low-level feature receives an activation value propagated by another low-level feature and accumulates its current activation value, if the total activation value is greater than a preset activation threshold of its own node, then the low-level feature itself is also activated. The principles of "adjacency activation", "similarity activation" and "strong memory activation" are also used to propagate the activation value to other low-level features; this activation process is performed in a chain until no new activation occurs, and the entire activation value propagating process stops.

A device for implementing the step S3.4 includes a reassembly module 34, the machine uses a combination of high-activation-value low-level features as an expectation model, and the criteria for the combination is activation value transfer relations.

The step S4 is to establish a relation network for representing knowledge, which is a separable and integrable non-sequential step, and is arranged between the steps S3 and S5 without any necessary sequence relations. Specifically, the step S4 is an accompanying step implemented simultaneously with the step S3, step S5 or other steps, and may be preset and updated at any time, or may not be preset but self-learned and updated during the operation of artificial intelligence.

The step S5 is that the machine establishes a response path, specifically including: the steps S5.1 to S5.6 described above.

The step S5.1 is to use an establishment module 51 to enable the machine to take all the activated low-level features as its own workspace, i.e., to accept an reassembled expectation model given by the reassembly module 34. The information processing range of the machine is limited within the workspace of the machine. The workspace of the machine is dynamic, and after each time of chain associative activation, new information may be added, and the activation value of some information in the workspace will fade over time. When the activation value of a low-level feature is below a preset threshold, the low-level feature exits the workspace of the machine.

The step S5.2 is a process that uses the establishment module 52 to enable the machine identify the input information to build an expectation model sequence. After the machine establishes the expectation models, if the machine cannot establish a response path satisfying the requirement of the award/penalty information in a subsequent decision-making process, the response path established by the machine may be to further identify input information. In this case, the machine will simulate past experiences in segments according to the attention mechanism to select appropriate sensors and determine an area (space and time) for further extraction, and enter the process of the step S5.1 to further extract low-level features in the input information using an appropriate distinguishability according to the expected low-level features. These features are then added to the workspace of the machine to build an expectation model sequence again. Therefore, the process of establishing an expectation model sequence by the machine may be iterative. Among others, the expectation model of S3.4 refers to identify, for example, eat as "CHI FAN" but not "CI FAN" or others, which is an ambiguous identification of the input. However, the expectation model sequence of S5.2 is the information for searching for related experiences, and is a meaningful assembled sequence. The expectation model sequence contains low-level features that are consistent with a high-activation-value feature sequence in the expectation model as experiences to search for. That is, a common feature sequence in the expectation model of the input information is used to search for related experiences. Instead of using an input sequence or all the features of the expectation model, high-activation-value features, from which details are removed, are used to search for experiences. In this way, the expectation model sequence can contain information omitted in the input and take its common part to search for related experiences.

The step S5.3 is to use a searching module 53 to enable the machine to determine a new workspace using the expectation model sequences through the chain associative activation process, and search for a memory most related to the input information.

The step S5.4 is to use a searching module 54 to enable the machine to search for award/penalty information in the new workspace.

The step S5.5 is to use the establishment module 55 to enable the machine to achieve a response target of achieving the activated award information and avoiding the activated penalty information through segmented simulation, and establishes a path to achieve the response target by simulating past experiences in segments. The purpose of the paths is to increase the probability of achieving expectation models in award paths and to decrease the probability of achieving the expectation models in penalty paths. These probabilities are in turn determined by the probability of achieving high-activation-value low-level features that they contain. So the machine establishes a response path from the input information to the award/penalty symbols by tracing back a causal-effect chain of achievement probabilities.

The step S5.6 is to use an optimization module 56 enable the machine to optimize the response path through segmented simulation.

In the step S5.5, the machine may establish a plurality of response paths. These response paths include both paths formed by different expectation models, and multiple possible response paths formed by multiple possible expectation models (each with a certain probability to be true) created with same low-level features. The machine needs to calculate the award/penalty value brought by each response path, so as to select the optimal response path.

If the machine cannot establish an optimal response path, the machine needs to further expand the response paths to obtain more award/penalty information and then make a decision. Further expanding the response paths includes decomposing each sub-path into more specific path combinations through segmented simulation, and analyzing the award/penalty information after the paths are combined.

If the machine still cannot establish a response path, the machine needs to establish a response path to "further extract input information", and proceed to execution. This is the attention mechanism of the machine.

In the step S5.6, in the process of optimizing the response path, the machine also needs to include the possible external feedback to a response path into a response path assessment process, which is empathy analysis of the machine.

The step S6 is implemented by a response path execution module 6 of the machine. The machine also expands the response path layer-by-layer by segmented simulation into low-level driver commands, find appropriate driver command parameter experiences by segmented simulation, and execute the expanded low-level driver command sequence, so as to complete the execution of the response path.

In this process, every time the machine performs a response path, it may encounter with new input information, and then the machine needs to perform the steps S3.1 to S6 again to rebuild the whole identification and decision-making process.

Each step is further described below:

S3.1, the machine extracts low-level features from the input information, includes:

Step S3.1.1, the machine extracts low-level features from the input information according to an identification range and distinguishability given by the attention mechanism. The attention mechanism comes from a previous decision-making process. If the previous decision-making process did not give an attention range, the machine may randomly select an attention range.

The low-level features are local features that widely exist in things. In graphics, the low-level features mainly include overall topology, contour, internal main lines, local curvature, texture, hue, vertexes, angle, curvature, parallelism, intersection, size, dynamic patterns and other local features commonly found in graphics. For speeches, the low-level features are basic syllable features that widely exist in similar speeches. For other sensor inputs, similar processing may be performed. Extracting local features from data is a technique currently known in the industry, for example, SHIF, SURF and other algorithms for graphics. For non-graphical data, for example, speeches, there are MFCC, LPC, LPCC and other extraction algorithms. They are widely used in face recognition, speech recognition, image classification and other fields.

Figure 4:
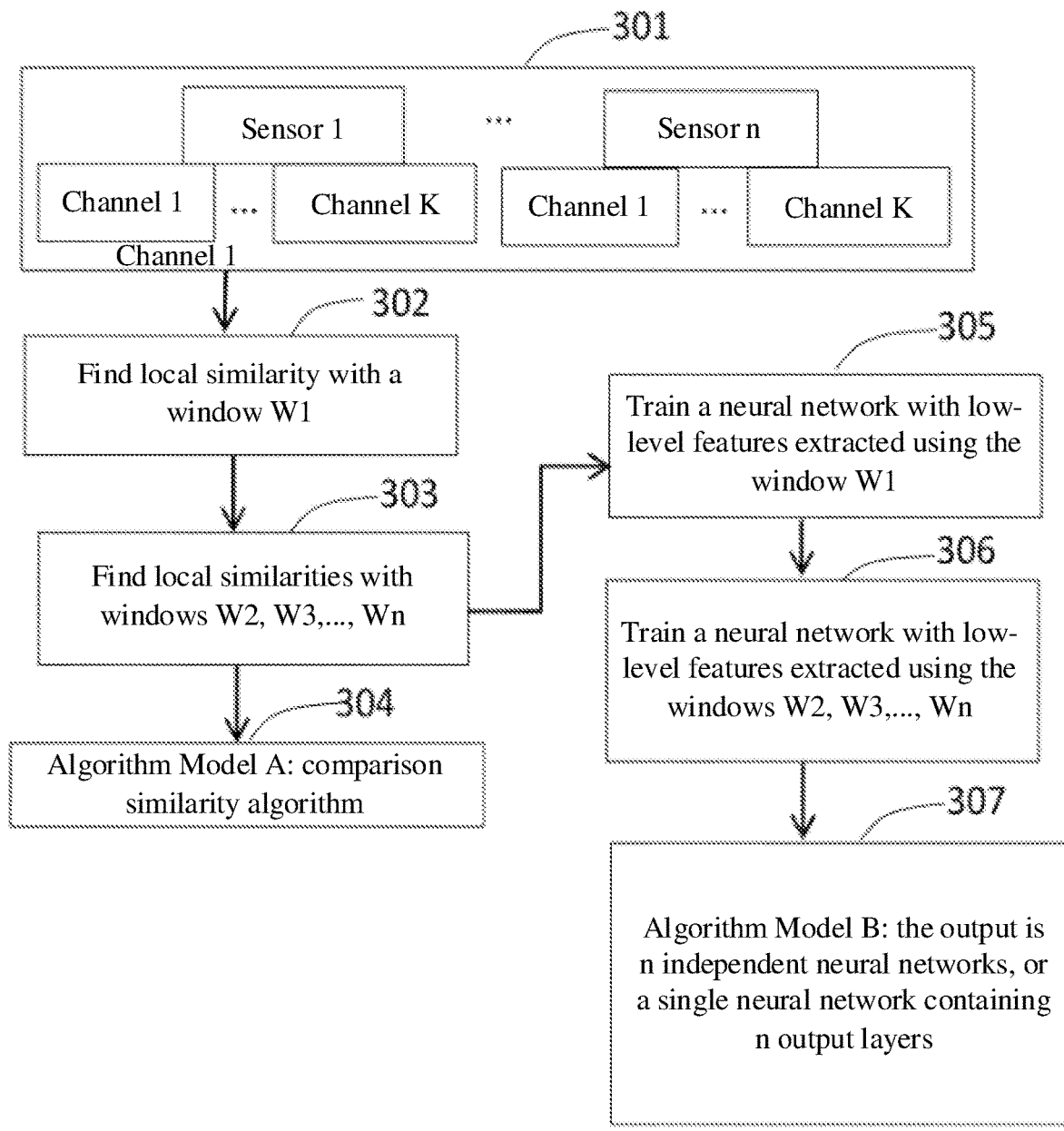
FIG. 4 is an exemplary diagram of a system module for implementing the extraction of low-level features of steps S3.1 and S5.1 according to an example of the present application.

In the present application, a further possible embodiment implementing the step S3.1 is as follows:

First, the machine builds a library of common low-level features. A method for selecting a low-level feature is to provide a device for selecting a low-level feature, as shown in FIG. 4. A sensor group 301 divides training data into a plurality of input channels through filters. For graphics, the channels include specific filtering for contours, textures, hues, dynamic patterns, etc., of the graphics. For speeches, the channels include filtering in aspects of speech recognition, such as voice frequency composition, inflections (dynamic patterns), etc. For other data, a similar method may be used. The preprocessing may adopt image, voice and other data preprocessing methods currently existing in the industry, such as convolution neural networks, base coordinate transformation and filtering, which are not within the scope of the claims of the present application and are not described in detail herein.

A finding window 302 uses a specific distinguishability for data of each channel to find a local similarity. This step is to find locally similar data by similarity comparison for data under different windows in each channel, ignoring the overall information. For example, similarity comparison may be performed, for example, by convolution or the like. It should be noted that the windows 302 of different distinguishabilities may be temporal windows or spatial windows, or a mixture of both. In comparing the similarity of the data within the window, a similarity comparison algorithm is used. In similarity comparison, similarity comparison after rotation or scaling also needs to be considered. While these algorithms need to be selected by practice, they are already well established algorithms that can be implemented by those skilled in the art based on well-known knowledge.

The machine adds locally similar features found by the similarity finding window 302 into a temporary memory library. Every time a new local feature is added, and it is assigned with an initial memory value. Every time an existing local feature is found, the memory value of the local feature in the temporary memory library increases according to a memory curve. All the information in the temporary memory library follows the memory and forgetting mechanism of the temporary memory library. Those low-level features that survive in the temporary memory library, when reaching a threshold for entering a long-term memory library, can be added into a low-level feature bank as selected local common low-level features. In the similarity finding window 302, the machine first uses a local window W1 to find local features that widely exist in the data within the window by moving W1. A low-level feature finding window 303 is to successively use local windows W2, W3, . . . , Wn, where W1<W2<W3< . . . <Wn (n is a natural number), to repeat the step of the similarity finding window 302, so as to obtain local low-level features. In a calculation module 304, the machine builds a low-level feature extraction algorithm model A. This algorithm model is an algorithm for finding local similarity: comparison similarity algorithm. In a first training module 305, the machine may build another algorithm model B to extract low-level features to train a neural network using the low-level features extracted by the window W1. It is an algorithmic model based on a multi-layer neural network. This model is more efficient than the similarity algorithm after training. In the first training module 305, the machine uses selected information features as possible outputs to train a multi-layer neural network. As lowest-level information features extracted by the window W1 are not many, for example, in graphics, they are mainly most basic features, such as points, lines, surfaces, gradient, curvature, etc., then are the graphic features formed by assembling these features. So a layer-by-layer training method can be used. In the first training module 305, the machine first selects a data ranged using the local window W1, and trains the neural network using the data within the range. The output of the neural network selects information features with a distinguishability similar to that of the window W1. In a second training module 306, the machine successively uses the local windows W2, W3, . . . , Wn, where W1<W2<W3< . . . <Wn (n is a natural number) again to train an algorithm model. In optimization, one method is to add zero to L (L is a natural number) neural network layers on a corresponding previous network model every time the size of the window is increased. To optimize the neural network with additional layers, there are two options: 1, only the added zero to L (L is a natural number) neural network layers are optimized every time; in this way, the machine can stacking all network models to form an overall network with intermediate outputs. This may achieve the highest computation efficiency. Every time the current network is copied to a new network, then the new network added with zero to L layers is optimized. Thus the machine finally gets n neural networks. Each neural network model corresponds to one distinguishability. When extracting features from information, the machine needs to select one or more neural networks according to the purpose of extracting information this time. Therefore, in a calculation module 307, the machine may obtain two neural networks that extract information features. One is a single algorithmic network with multiple output layers, which has the advantage that the computational resource requirement is small, but the capability to extract features is inferior to the latter. Another is a plurality of single output neural networks. This approach requires heavy computation, but is has better performance in feature extraction.

It should be noted that the above-mentioned method is to help the machine to establish preset knowledge and improve the ability of the machine to identify local features. The machine is trained only once to establish local features in the memory. This step is not necessary to achieve general-purpose artificial intelligence, and the machine may also skip this step, and progressively establish common local features in a subsequent information identification and decision-making process.

In addition to graphics and speeches, the machine may process information from any other sensor in a similar manner. It should also be noted that selecting different distinguishabilities is to select different windows, so the sizes of extracted features are also different. For example, low-level features of some graphics may be as large as the entire graphic (e.g. a low-resolution overview of an image).

Extraction of dynamic features is to take things in windows of different spatial or temporal distinguishabilities as a whole, and extract the local similarity of their motion trajectories. When the motion trajectories are determined, the trajectories may be compared as static data. Therefore, the selection of motion features and the extraction algorithms of motion features are also similarity comparison. A rate of change is a motion feature extracted by a temporal distinguishability (time window), which is determined by sampling the entire process in time segments, and comparing similarity differences between the motion trajectories of different samples. Therefore, the motion feature has two distinguishabilities, one is spatial distinguishability, and a spatial sampling window is used to enable data within the window to serve as a static whole. The other is temporal distinguishability, and a temporal window is used for sampling, and the rate of change of motion is determined based on the change of motion trajectories of these samples.

Similarly, for the extraction of motion features, it is also necessary to use multi-distinguishability windows to extract the same data repeatedly. It should also be noted that the distinguishability of dynamic features does not refer to the distinguishability of implementing the motion object itself, but to temporal and spatial distinguishabilities that distinguishes motion states. For example, for a speech, the part of basic phonics and speech rate may be taken as a static feature, while the change in voice frequency, tune, and speech rate is a dynamic feature. The machine slides temporal windows of different lengths to sample a speech, which is equivalent to different time distinguishabilities.

Therefore, with the method described above, the machine uses training data, or progressively builds up a long-term memory containing low-level features in life.

Another method for selecting local features is: when the machine extracts local features, for a graphic, local features refer to locally similar graphics commonly existing in the graphics, including but not limited to, low-level features such as points, lines, planes, gradients and curvatures, and then local features commonly existing in the graphics formed by combinations of the low-level features, such as local edges, local curvatures, textures, hues, ridges, vertices, angles, parallelism, intersection, size, dynamic change patterns and so on. For speeches, local features refer to similar syllables, timbre, tones and their dynamic change patterns. Other sensor data may also be processed in a similar manner by pre-selecting low-level features manually, and then selecting combinations of low-level features that widely exist from the data. Therefore, the machine can directly use these selected low-level features as an identification class, and use any existing feature extraction methods (for example convolution, linear transformation and filtering, data down-sampling, etc.) to extract low-level features from the input data. The way of extraction is still as follows: the same data needs to be extracted with different distinguishabilities and ranges, and this is achieved through the attention mechanism, which in turn is a response process established by the machine for the input information. The identification on the input information by the machine is therefore iterative, and the obtained low-level feature combinations of the input information are hierarchical. They consist of a combination of low-distinguishability overall features and high-distinguishability local features. These established low-level features compete in the memory library through chain associative activation and the memory and forgetting mechanism, so that the common local features will survive.

The multi-distinguishability low-level features are the basis for experience generalization. Because there are common low-distinguishability low-level features in the same kind of things, scenes and processes. These low-distinguishability low-level features are a bridge for experience generalization. In particular, low-distinguishability dynamic features and low-distinguishability features for expressing relations can be applied to different objects for experience generalization because of their wide range of specific operation objects.

The step S3.1 that the machine extracts low-level features from the input information further includes: a step S3.1.2, the machine firstly extracts low-level features, such as overall topology, contour, main lines and main textures, about the input information with prioritizing overall features. This information is a part of the input information, so they are also local features, but belong to local features about overall information, and they are also a kind of low-level feature.

The machine then analyzes the extracted low-level features using a decision-making system. If a response path given by the decision-making system of the machine is to further identify the input information, then the machine responds to simulate past experiences in segments, that is to further identify the expected low-level features within an expectation space and time according to the attention mechanism, and select appropriate sensors and distinguishabilities based on the expected low-level features.

Therefore, the machine does not extract all the low-level features from the input information at once, but progressively extracts the local features from the input information iteratively through the attention mechanism according to information needed in its own decision-making.

For each extraction process, different sensors, different identification ranges and different distinguishabilities may be used. As a result, for a same input thing, the machine may extract low-level features of different types, different ranges and different distinguishabilities. These hierarchical features are sequentially stored in the memory library with adjacency relations and repeatability relations therebetween. Therefore, they may be activated simultaneously through adjacency relations, propagate a large activation value between each other through repeatability relations, and propagate activation values in different memories through similarity relations, so that they may constitute a locally compact activation value transfer relation network.

With regard to the step S3.2, the machine stores the low-level features extracted in the step S3.1, including:

Step S3.2.1 of simultaneous storage.

Using the rule that "there is an implicit connection relation between information inputs to the machine simultaneously", an information storage method for storing the implicit connection relation is proposed: "information adjacent in input time" is expressed as "also adjacent in storage space". That is, in the present application, a temporal distance between moments at which the low-level features are stored is reflected by a distance in storage space of the low-level features. That is, the machine stores the low-level features sequentially according to a time order of input.

The information being adjacent in storage space may be storage units being adjacent in physical locations, or a data mapping mechanism may be used to express an adjacent relation between storage units. For example, a spatial location is stored concomitantly with each storage unit. Or each low-level feature may be represented by a code, and the location relation between two low-level features may be represented by storage locations (e.g. adjacent) of the codes.

The machine places low-level features extracted each time in step S3.1 overlapping with original data according to locations, angles and sizes of the highest similarity with the original data, and the relative spatial positions of the low-level features may be saved in this way. The machine may store only these low-level features, or may store original data stacked with the low-level features. In the present application, the extracted low-level features are mainly used for operation, and the corresponding original data can be used as backup data for temporary storage, which may be forgotten because it is rarely used. Therefore, there is no essential difference in the machine implementation of general-purpose artificial intelligence between the two storage methods.

In addition to storing the extracted low-level features in step S3.2, the machine also performs: step S3.3, assigning initial memory values and initial activation values to the low-level features. Step S3.3 may include initial assignment and update assignment.

According to the method of S3.2, when storing each low-level feature extracted in step S3.1, the machine concomitantly stores an initial memory value and an initial activation value of the low-level feature; that is, step S3.3 may be performed before step S3.2, the initial phase may be performed simultaneously with step S3.1, and the update phase may be performed after step S3.2.

A low-level feature stored in the memory library, in addition to the low-level feature itself, also contain data representing a length of time that low-level feature will reside in the memory library, which data is referred to as a memory value. The initial memory values of the stored low-level features are positively correlated with corresponding activation values when the storage occurs.

A low-level feature stored in the memory library, in addition to the low-level features itself, also contain data representing its current degree of activation, which data is referred to as an activation value.

For an external input low-level feature, its initial activation value is a function of expected award/penalty information, demand information of the machine and emotion information of the machine: AINT=fa (V, R, E), where AINT is the initial activation value assigned to the low-level feature, V is expected award/penalty information coming from an award/penalty value related to an expectation model. R is current demand information of the machine, coming from the demand system of the machine; and E is current emotion information of the machine, coming from the emotion system of the machine. fa is an initial activation value generation function, which needs to be selected in practice. This function is the initial activation value assignment program of the machine.

The activation values of the demand symbols, award/penalty symbols and emotion symbols activated because a self demand deviates from a proper range directly come from mapping relations from the activation values of the demand symbols to the activation values of the award/penalty symbols and activation values of the emotion symbols. They are a preset mapping relation. As input information, the initial activation values are their own activation values.

The step S3.2 that the machine stores the extracted low-level features includes: step S3.2.2 that a memory and forgetting mechanism is applied to all the low-level features in the memory library.

The memory values stored in the memory library increase with a memory function and decreases with a forgetting function. The memory function refers to that the memory value increases as the number of activations increases. The specific increase method may be represented by a function, and this function is the memory function. The forgetting function refers to that the memory value decreases as time (including training time) increases. The specific reduction method may be represented by a function, and this function is the forgetting function. A memory function may be such that an initial memory value assigned to a newly stored low-level feature is positively correlated with an activation value at a corresponding moment, for example, M0=fm0 (AINT), where M0 is the initial memory value, fm0 is an initial memory value assigning function, and AINT is the initial activation value. However, after the original low-level feature is activated, the increment of the memory value thereof is M1=fm1(A), where M1 is an increment of the memory value, fm1 is a memory value increasing function, and A is the activation value of the low-level feature at the time when the storage occurs. A forgetting function may be such that the memory value decreases over time, for example, the Ebbinghaus forgetting curve. Both memory and forgetting curves need to be selected according to practice.

After the step S3.2 that the machine stores the extracted low-level features, it performs: step S3.4, the stored data is screened.

In step S3.4, the machine employs an event-driven mechanism for storage of the low-level features.

The machine performs similarity comparison on the low-level feature extracted currently with the low-level feature extracted previously, and if there is a change exceeding a preset threshold, it is called that an event has occurred. Here, a change, including a change of two extracted low-level features exceeding a preset threshold (for example, a new low-level feature appears), or a change of the activation value assigned to the low-level features exceeding a preset threshold (for example, the activation values of symbols representing demand information, award/penalty information and emotion information make a great change), can be considered as that an event has occurred. After an event has occurred, the machine again uses the methods of steps S3.1 and S3.2 to store the input low-level features.

In step S3.2.2, the machine firstly stores the extracted low-level features into a temporary memory, which employs a faster forgetting mechanism.

A method for implementing the temporary memory and long-term memory is to use specific labels. If the memory value of a low-level feature reaches or exceeds a preset threshold, then the low-level feature may be labeled as long-term memory, otherwise temporary memory. The long-term memory uses a forgetting curve that forgets more slowly. This is achieved by storing a long-term memory label concomitantly with each low-level feature, and the label is activated when the corresponding memory value exceeds a preset threshold of the long-term memory, by which the low-level feature in the memory is switched into the long-term memory.

Another method for implementing the temporary memory and long-term memory is to use a specific forgetting function. The forgetting curve slowly decreases over time when the memory value exceeds a preset threshold of long-term memory. When the memory value is below the preset threshold of long-term memory, the rate of decrease is faster. In this case, the temporary memory and long-term memory are automatically implemented. Similarly, the temporary memory and long-term memory may also be implemented by connecting multiple forgetting curves in series for combination. A particular forgetting function may also be an S-type forgetting curve. In the case of high memory value and low memory value, the forgetting curve is in an interval where the S-type curve changes slowly with time, while in a middle interval, the rate of change is faster. The step S3.2 that the machine stores the extracted low-level features includes: step S3.2.3, demand information, award/penalty information and emotion information are stored.

In the present application, the machine needs to establish a demand system, an award/penalty system and an emotion system, and stores demand information, award/penalty information and emotion information generated by these systems as an input information into memory according to the steps of S3.2.1 and S3.2.2.

The specific implementation method is as follows: the machine uses symbols to represent different types of demands and uses an activation value of the demand symbol to represent a degree to which the demand symbol is activated; the machine uses symbols to represent different types of award/penalty information, and uses an activation value of the award/penalty symbol to represent a degree to which the award/penalty symbol is activated; and the machine uses symbols to represent different types of emotion information and uses an activation value of the emotion symbol to represent a degree to which the emotion symbol is activated.

The machine takes each of the demand symbols, award/penalty symbols and emotion symbols as a low-level feature and the activation value of each of the demand symbols, award/penalty symbols and emotion symbols as its initial activation value.

The machine processes the demand symbols, award/penalty symbols and emotion symbols in the same manner as other types of low-level features. That is: these symbols are assigned with initial memory values according to the initial activation values using simultaneous storage.

The step S3.2 that the machine stores the extracted low-level features includes: step S3.2.4, the organizational form of the memory library.

In the present application, a memory library containing a relation network may be stored in a distributed manner or in a hierarchical manner, for example, a small memory library with fast response is used at the front end and corresponds to temporary memory information, and a large memory library is used at the back end and corresponds to long-term memory information, and the two are connected via a communication network. Each memory library may itself employ centralized or distributed storage.

With regard to step S4, a relation network is established based on the low-level features stored in step S3.2.

The step S4 includes: S4.1, an associative activation method.

In order to establish a knowledge representation system in the memory (referred to as a relation network in the present application), three setting are proposed for optimization of the relation network: the setting of "adjacency relation", the setting of "similarity relation" and the setting of "memory strength relation".

The setting of "adjacency relation": in the memory, temporally adjacent low-level features are also adjacent in storage location. Low-level features adjacent in storage location have a connection relation therebetween. The setting of "similarity relation": in the memory, similar low-level features also have a connection relation therebetween. The setting of "memory strength relation": in the memory, low-level features with high memory values are more easily activated.

When a low-level feature in a relation network is activated, it will use the principles of "adjacency activation", "similar activation" and "strong memory activation" to activate other low-level features.

"Adjacency activation" means that when a specific low-level feature in memory is activated, it will activate low-level features adjacent to it in storage location. The adjacency relation in storage location may be either physical adjacency of storage units or any other way of expressing adjacency in storage location (even if the storage units are not physically adjacent).

"Similarity activation" means that a specific low-level feature in the memory, when receiving an activation signal sent by another low-level feature, has a receiving capability positively correlated with the similarity therebetween. Therefore, after a similar low-level feature is activated, it will send its own activation signal, and it may be prone to further activate other similar low-level features. This is because similar low-level features have a strong capability to receive activation signals from each other. In the present application, in a simple activation value transfer relation, a propagating coefficient is positively correlated with the similarity. Of course, other propagating functions may be used, but a positive correlation between the propagating coefficient and the similarity needs to be expressed.

When a feature is input, various low-level features at different distinguishability levels may activate features similar to themself in the memory, so "similar activation" does not refer to overall similarity, but refers to that specific low-level features (local features) at various specific distinguishabilities will activate low-level features similar to themself in the memory.

"Strong memory activation" means that the higher memory value a low-level feature has, the greater capability it has to receive activation signals from other low-level features. Therefore, information in deep memory is more easily activated.

In "adjacency activation", the activation value obtained by an adjacent low-level feature is $Atn=ftn(A, L, Mr)$; where Atn is the activation value obtained by the adjacent low-level feature, A is the activation value possessed by a low-level feature initiating adjacency activation, and L is a distance between the two in a memory space. Mr is a memory value of the low-level feature receiving the activation value; where ftn is a propagating function, ftn is a monotone increasing function of A, ftn is also a monotone decreasing function of L, and ftn is a monotone increasing function of Mr;

in "similarity activation", the activation value obtained by a similar low-level feature is $Ats=fts(A, S, Mr)$; where Ats is the activation value obtained by a similar low-level feature, A is the activation value possessed by a low-level feature initiating adjacency activation, S is a similarity obtained by similarity comparison between the two, and Mr is the memory value of the low-level feature receiving the activation value; where fts is a propagating function, fts is a monotone increasing function of A, fts is a monotone increasing function of S, and fts is a monotone increasing function of Mr; and in "adjacency activation" and "similarity activation", the activation value obtained by the low-level feature receiving the activation value is positively correlated with the memory value, so that the activation value propagating process shows "strong memory activation".

In the present application, the activation values in chain activations decrease over time. The activation value would decrease over time in a manner of $AN=f(A0, delta\_t)$; where AN is an activation value at the current moment, A0 is an activation value at the previous activation value update moment, and delta_t is a time interval between the two activation value update moments.

The above three activation modes are collectively referred to as an associative activation method.

The step S4 further includes: S4.2, a chain associative activation method.

The chain associative activation refers to a process that the machine starts from one low-level feature and activates multiple low-level features in a chain on the basis of associative activation (adjacency activation, similar activation and strong memory activation).

When a low-level feature receives an activation value propagated by another low-level feature and accumulates its current activation value, if the total activation value is greater than a preset activation threshold, then the low-level feature itself is also activated. The principles of "adjacency activation", "similarity activation" and "strong memory activation" are also used to propagate the activation value to other low-level features. This activation process is performed in a chain until no new activation propagating process occurs, and the entire activation value propagating process stops. This process is called a one-time chain activation process. In order to prevent repeated activation between two low-level features, the machine needs to be restricted to not propagating a reverse activation value within a preset time period in one chain activation process after an activation value is transferred between two low-level features.

The step S4 further includes: S4.3, memory values are optimized.

In step S3.2, the machine stores the current input low-level features (including the low-level features extracted from the input information according to the attention mechanism, or demand symbols, award/penalty symbols or emotion symbols of the machine) into a temporary memory library according to a simultaneous storage principle, and assigns an initial activation value thereto. These activation values propagate throughout the memory through the chain associative activation process.

After a chain activation process is completed, the machine updates the memory values of the activated information. An implementation method of S4.3 includes: a minimum activation threshold for updating a memory value is preset. The machine updates the memory value for a low-level feature only if the activation value of the low-level feature in memory exceeds the threshold. The updating method may be to increase the memory value of the low-level feature in positive correlation with its activation value, or to update the memory value according to a memory curve according to the number of times the low-level feature is activated. The specific method may be selected in practice.

At the same time, all the memory values in the memory decrease over time according to the forgetting mechanism.

The step S4 further includes: S4.4, a local close connection network is formed in the memory.

A memory space is a spatial network organized by a large number of low-level features. The low-level features serve as nodes of the network, and links in the network are activation value transfer relations.

After the machine stores the low-level features in the temporary memory library through steps S3.1 and S3.2, and assigns initial activation values to the low-level features stored in the temporary memory library in step S3.3, in step S4.3, the machine updates the activation values and activates similar low-level features throughout the space and activates low-level features adjacent thereto. In step S4.4, under the principle of similarity activation, the activation value propagating coefficient is positively correlated with the similarity between each other. Under the principle of adjacency activation, the activation value propagating coefficient is inversely correlated with the storage distance between each other. At the same time, under the principle of strong memory activation, the activation value propagating coefficient is also positively correlated with the memory value of the receiving feature. Similarly, these low-level features may activate other low-level features in a chain. The final step S4.4 forms a plurality of local close connection networks in the memory.

In step S4.4, after each chain activation process is completed, the machine also updates the memory values according to the method in step S3.3.

Due to the existence of low-level features in close connection relations, low-level features which often simultaneously appear in the input information, for example, the speech and text about "apple", the overall topology, contour and special local curves of apples, the texture and color of an apples, images of apples or even apple orchards and apple trees, as well as low-level features regarding the taste of apples, the shape of a cut apple, the color of pulp, etc., may have a probability that they appear together in the input features much higher than other features unrelated to the apple, so that there is a high probability that they have adjacency activation therebetween. Assuming that "Apple" contains M closely related low-level features, among which low-level features appear simultaneously in the input low-level features each time is a subset of M, and the low-level features included in each subset may be different. However, the low-level features that appear most frequently in these subsets must be the common low-level features that best represent the concept of Apple, such as the "contour" of apples, or linguistic symbols of apples, or the "texture" of apples. They are common features of such things as apples. Common features of the same kind of things are usually overall features at low distinguishability, for example the "contour" of Apple, and linguistic symbols of Apple. They generally cannot be used to distinguish particular apples because they are common low-level features of such things. Because they are common features, whenever a low-level feature related to apples is activated, they may be activated through the chain associative activation process, so that the number of times they are activated will be much higher than non-common low-level features, making their memory values to be generally higher than non-common features. For another example, in a process of running, a particle is moving on a low-distinguishability overall feature, so that moving of a particle is one of the common features of running. In a conceptual network of running, this common feature is one of high-memory value low-level feature. During activation, it may become one of high-activation-value low-level features.

The demand symbols, award/penalty symbols and emotion symbols of the machine are taken as input features, and they are stored in the memory according to the method of step S3.2 and step S3.3 together with adjacent input information according to simultaneity, and their activation value transfer relations with other low-level features are maintained according to the chain associative activation, and the memory and forgetting mechanism. Other low-level features that are adjacent to demand information, award/penalty information, award/penalty and emotion information are also typically related to demands, awards/penalties and emotions. Through continuous learning, the machine can extract common features from the adjacent information related to demands, awards/penalties and emotions. When the features are activated, their activation values may be propagated to adjacent demand, award/penalty and emotion symbols. Conversely, when the demand symbols, the award/penalty symbols and the emotion symbols are activated, their activation values are also propagated to common features adjacent thereto. The activation value propagating paths are the basis for the machine to select different response paths.

The step S4 includes: S4.5, a relation network is established.

A network formed by all low-level features in the memory and their activation value transfer relations between them is called a relation network. A local close connection network in the relation network forms a concept.

Since language is used very frequently by humans, generally in one concept the number of activations of language is likely to be the highest, and the memory value of language is also the highest. At the same time, since language is usually connected with all the attributes of a concept, it is the most frequently used combination of common low-level features, so that it is a bridge between various attributes. Therefore, language becomes the most frequent entry for this concept, i.e., the most commonly used representative information feature for this concept. As a result, it behaves as if language is the center of our conceptual thinking. However, in the present application, language features are the same as other features without any special status.

Therefore, in the present application, it is not necessary to predetermine a scope to which a concept applies. With activation of different input low-level features, the low-level features activated in the same concept may also be different, and their activation values may also be different. The low-level features with high activation values are the low-level features closely related to the current input low-level features, and they are the applicable scope of the concept under the current input conditions. The low-level features with the highest activation values in the concept are set as the representative symbols of the concept.

In the present application, it needs not to establish a reasoning relation between concepts in advance, or to calculate the distance between two concepts in advance through semantics, or to calculate the distance between two concepts using a vector space. The relation between concepts is embodied by activation value transfer relation between low-level features; a network composed of all the low-level features and activation value transfer relations between the low-level features is used as a relation network; the low-level features serve as nodes of the relation network, and connection relations between the nodes are the activation value transfer relations; and the activation value transfer relations are determined with a chain associative activation process. If the size of the activation value propagating coefficient is compared to the thickness of the links, then a local network composed of multi-distinguishability low-level features connected by thick links is a concept.

In the present application, the object of all operations is the low-level features, neither language nor concepts. All operations are performed based on the memory values, activation values, and activation value transfer relations.

The built-in demand system, the built-in award/penalty system and the built-in emotion system established by the machine in step S1 are described later.

In the steps S3.1, S3.2 and S3.3 of the present application described above, the machine needs to use the demand system, the award/penalty system and emotion system. A method for establishing a demand system, an award/penalty system and an emotion system is further described herein. The demand system, the award/penalty system and the emotion system of the machine include two parts. They are formed by the built-in demand system, the built-in award/penalty system and the built-in emotion system of the machine, as well as an extended demand system, an extended award/penalty system and an extended emotion system of the machine, so that the built-in systems can be extended during the operation of artificial intelligence.

Firstly, the built-in demand system, the built-in award/penalty system and the built-in emotion system are established by using a preset program. These built-in systems use different symbols to represent different types of demands, awards/penalties and emotions, and obtain activation values through a preset program. In the present application, we refer to this mechanism to assign activation values to demand symbols, award/penalty symbols and emotion symbols through a preset program as a built-in demand system, a built-in award/penalty and a built-in emotion system.

Secondly, through step S3.1, step S3.2 and step S3.3, in the relation network, the demand symbols, award/penalty symbols and emotion symbols of the machine and other low-level features form a chain associative activation relation. This relation is a close connection relation established by the machine in the process of increasing the memory. When other low-level features are activated, they may propagate activation values along this close relation to the demand symbols, award/penalty symbols, and emotion symbols so that the demand symbols, award/penalty symbols, and emotion symbols are activated. Conversely, when the demand symbols, award/penalty symbols, and emotion symbols are activated, they also propagate activation values to the closely related low-level features. In the present application, we refer to this mechanism of propagating activation values to demand symbols, award/penalty symbols and emotion symbols through a relation network as an extended demand system, an extended award/penalty system and an extended emotion system.

The step S1 includes: S1.1, demand symbols, emotion symbols and award/penalty symbols are established.

Demand symbol: in the present application, the machine employs demand symbols to represent various demands. Each type of demand may be represented by a symbol, and the symbols may be assigned to represent a state, for example, the power, operating temperature, skin pressure, part lifecycle and other demands related to normal operation of the machine. It is also possible to establish abstract demand symbols representing a sense of security, being respected, and achievement, etc. These symbols belong to the extended demand system, needs to build close relations with other low-level features through learning. The difference and the number of types of demands do not affect the claims of the present application. In the present application, all demands are processed in similarly.

Emotion symbol: in the present application, the machine uses emotion symbols to represent various emotions. The machine may have various emotions, and each type of emotion may be represented using symbols, and the symbol may be assigned with a value by the machine to indicate its state. The difference and the number of types of emotions do not affect the claims of the present application. In the present application, all emotions are processed similarly.

Award/penalty symbol: in the present application, the machine uses an award/penalty symbol to represent award/penalty information. These symbols may be assigned by the machine to represent the obtained award/penalty information. The number of the award/penalty symbols does not affect the claims of the present application. In the present application, all award/penalty symbols are processed similarly.

The step S1 further includes: S1.2, a built-in demand system of the machine is established.

First, a built-in demand system of the machine is built through a preset program. The built-in demands are primarily requirements for the machine to maintain its own operation.

Firstly, a proper range of operating parameters of the machine is preset. The machine monitors these parameters through the preset program, and once some parameters deviate from the proper range, the preset program assigns an initial activation value to a demand symbol of that parameter.

For example, the machine monitors power. When the power is lower than a preset value (for example lower than 100%), the machine assigns an activation value to a demand symbol of "low charge" by means of a preset program, which is equivalent to that the machine issues a demand for charging. The lower the power is, the higher the activation value is, which reflects a stronger demand of charging of the machine.

For example, the machine monitors its own temperature. When the temperature is too high, the machine activates a demand symbol of "over temperature". This is equivalent to the machine sending out the information that the machine needs to cool down. The higher the activation value, the stronger the demand of the machine. When the temperature is too low, the machine activates the demand symbol "low temperature". Similarly, the higher the activation value, the stronger the demand of the machine.

Similarly, the machine may establish proper ranges for all other parameters, such as pressure, torque, touch, smell and taste, etc. related to its state. For example, a machine may establish a demand for avoiding odors, or may establish a demand for avoiding pressure or torque that may cause damages to itself, and may establish demand symbols such as excessive pressure and excessive torque. It is also possible to establish a demand for avoiding strongly acidic or strongly basic odors or tastes, which are all represented by symbols. When the parameters corresponding to these symbols deviate from a proper range, the machine assign initial activation values to the symbols in positive correlation with the degree of deviation.

A change in the demand state of the machine is set as one of the input information. The machine assigns an initial activation value to the activated demand information through an initial activation value assignment program, in a manner that An=f1(Ty, Ug), where An is an activation value obtained by a demand symbol, Ty is a type of demand, Ug is the distance from a proper range of the demand, and f1 is a value assigning function.

The built-in demand system of the machine is similar to the human innate physiological demand system. Their purpose is to maintain good operation of the machine. These demands are of limited number, and their proper ranges are preset by humans. Therefore, they can adopt the enumeration method, adopt the preset program method, use a symbol to represent each kind of demand, and after deviating from the reasonable value, give the activation value corresponding to this symbol to represent the demand intensity degree.

The step S1 further includes: S1.3, a built-in award/penalty system of the machine is established.

The built-in award/penalty system of the machine mainly maps various demand activation values of the machine into corresponding award/penalty symbol activation values.

In the present application, in an embodiment, the established award/penalty symbols mainly include benefit symbols and loss symbols. The gain symbols represent gaining awards and the loss symbol represents gaining losses. Of course, we can also use a single award/penalty symbol to represent gains and losses, mapping benefits to positive award/penalty values and losses to negative penalty values. Of course, we can also use multiple symbols to respectively represent different types of award/penalty information. In the present application, we uniformly use the activation value of the award/penalty symbol to represent the numerical size of the corresponding award/penalty type.

The internal award/penalty system of the machine mainly maps an activation value of a demand symbol to an award/penalty value of an award/penalty symbol. One embodiment may be as follows:

Implementation 1 of S1.3: a preset program is used to directly map the activation values of demand symbols to benefit and loss values. For example, an activation value of a low-power symbol is mapped to a loss value of a corresponding degree; an activation value of an over temperature symbol is mapped to a loss value of a corresponding degree; an activation value of the overpressure symbol is mapped to a loss value of a corresponding degree; and symbols of maintenance demands of system are mapped to loss values of corresponding degree.

Implementation 2 of S1.3: the machine maps a satisfaction state of each demand symbol to an emotion symbol and an activation value of the emotion symbol through the emotion system, and then maps various emotions and corresponding activation values to corresponding benefit and loss values through the award/penalty system. For example, a lack of power is mapped to a corresponding degree of "worry", over-temperature is mapped to a corresponding degree of "uncomfortable", and then "worry" or "uncomfortable" is mapped to a loss value of a corresponding degree.

There is no essential difference between these two methods. Implementation 1 is to directly and simultaneously map demands onto emotion and award/penalty information. Implementation 2 is to map the demand to an emotion symbol first, and then map to award/penalty information through the emotion symbol. Through such an intermediate mapping process, the machine's pursuit of benefit-seeking and harm-avoiding of the award/penalty information also manifests as the pursuit of emotions that brings benefits.

The built-in award/penalty system of the machine is an award/penalty system established by the machine according to the demands of its own operating state. However, the information about the operation state of the machine is limited in monitoring information of the operation state of the machine, so it is a mapping relation in a limited range, and this relation can be easily implemented with common knowledge.

The mapping relations between the activation value of the demand symbol, the activation value of the award/penalty symbol and the activation value of the emotion symbol of maintenance operation of the machine may adopt different specific mapping methods, but the three may be converted to each other.

It should be noted that in the present application, the machine-generated built-in award/penalty information is determined jointly based on the activation value of the demand symbol and a change value of the activation value of the demand symbol, rather than only on the activation value of the demand symbol. So one possible mapping function from the activation value of the demand symbol to the activation value of the award/penalty symbol is: (R, P)=frp(Ty, S1, delta), where R, P is an award/penalty value (R is an award value or a benefit value, P is a penalty value or a loss value), frp is a mapping function of the award/penalty system, Ty is a demand type, S1 is the current activation value of the demand symbol, and delta is the change value of the current activation value and the previous activation value of the demand symbol.

The step S1 further includes: S1.4, a built-in emotion system of the machine is established.

In the present application, each category of emotions is represented by a symbol that can be assigned an activation value by the machine to indicate the emotion, such as excitement, anger, sadness, stress, anxiety, embarrassment, boredom, calm, confusion, aversion, pain, jealousy, fear, happiness, romance, sadness, sympathy, and satisfaction.

The built-in emotions of the machine may be generated by a preset program. The activation values of the motion symbols are based on the activation values of the demand symbols of the machine. The method is (Em1, Em2, . . . , Emn)=fem(Ty1, V1, delta1, Ty2, V2, delta2, . . . , Tym, Vm, deltam), where fem is an emotion generating function, Em1, Em2, . . . , Emn are the activation values of different emotion symbols, Ty1 to Tym are activated demand symbols, V1 to Vm are the activation values of the demand symbols, and delta1 to deltam are change values of the activation values of the demand symbols compared with a previous time moment. Obviously, the emotion generating function is a multi-input, multi-output mapping function, which needs to be selected in practice.

Examples: when a danger symbol of the machine is not activated (in a safe state), the corresponding emotion symbol of the machine assigned with the activation value may be "satisfied", "pleasant" or "quiet", etc. When the danger symbol of the machine is activated, the corresponding emotion symbol of the machine assigned with the activation value may be "anxious", "impatience", "absent-minded", etc. The activation values obtained by the activated emotion symbols are directly positively correlated with the activation value of the danger symbol.

In addition, the demand of the machine for the overall award/penalty value may be a preset demand. For example, the machine establishes a proper range of award/penalty values in the current award/penalty system, and when the current actual award/penalty value deviates from this range, the machine also generates preset demands and emotions.

In the present application, the demand symbols, the award/penalty symbols and the emotion symbols, and their activation values are a kind of continuous input information. When the activation value of the demand symbol is changed, it is equivalent to that an event has occurred.

The step S1 further includes: S1.5, an extended demand system of the machine is established.

The expanded demands of the machine are similar to the demands of human beings above the level of physiological needs, such as sense of security, being respected, sense of achievement, communication needs, self-realization, etc. In the present application, all the extended demands are processed similarly, so the category and number of the demands do not affect the implementation of the methods disclosed in the present application.

First, we also use a symbol to represent each extended demand, but there is no direct mapping between the activation values of the extended symbols and the current operating parameters of the machine. Their activation values come from the extended relation network. Because the extended relation network is obtained by learning, the extended demands of the machine are also obtained by learning.

In the present application, an embodiment of S1.5 for achieving an extended demand of the machine is as follows:

The step S1.5 includes: S1.5.1, in the extended demand system of the machine, symbols are used to represent various extended demands, and proper ranges of the activation values of the extended demands are established.

The step S1.5 further includes: S1.5.2, a mapping relation between the activation values of the built-in demand symbols and the activation values of the award/penalty symbols is simulated to establish a mapping relation between the activation values of the extended demand symbols and the award/penalty symbols. For example, when a security symbol or a danger symbol is activated, they activate a corresponding award/penalty value symbol according to a preset mapping relation.

The step S1.5 further includes: S1.5.3, an activation value propagating network is established by learning between various specific events to the extended demand symbols, which is a part of the relation network. Thus, when a specific event occurs, the extended demand symbol is activated and then the award/penalty symbol is activated through the relation network. These award/penalty symbols are also input information that is stored in the memory along with the input information of the machine according to a simultaneous storage method.

By calculating the activation values of the award/penalty symbols, and in a decision-making system, selecting expectation models which are expected to bring awards in a benefit-seeking and harm-avoiding manner, and further improving the probability of their achievement, expectation models which are expected to bring penalties, further reducing the probability of their achievement. The machine thereby shows a pursuit for these extended demands.

The extended demands of the machine are therefore obtained through the relation network, which is a process of obtaining by learning. The machine therefore needs to have a learning capability. This requires to present instinct knowledge for the machine. With the support of the preset instinct knowledge, the machine can learn further. How to build instinct knowledge is explained later, and with the instinct knowledge of S2 as a bridge, more knowledge can be learned.

The step S1 further includes: S1.6, an extended award/penalty system of the machine is established.

The extended award/penalty system of the machine simulates a mapping relation between the activation values of the built-in demand symbols and the activation values of the award/penalty symbols to establish a mapping relation between the activation values of the extended demand symbols and the award/penalty symbols.

In the present application, in an embodiment, the award/penalty symbols mainly include benefit symbols and loss symbols. For example, an activation value of an approval symbol is mapped to an activation value of a benefit symbol, and an activation value of a danger symbol is mapped to an activation value of a loss symbol. The specific mapping form is the same as the built-in award/penalty system of the machine, and the specific parameters need to be selected in practice.

The step S1 further includes: 1.7, an extended emotion system of the machine is established.

In the method proposed in the present application, a mapping relation may be established by a preset program between the activation values of the demand symbols of the machine (including built-in demand symbols and extended demand symbols) and the activation values of the emotion symbols of the machine.

Of course, the activation values of the demand symbols of the machine, the activation values of the emotion symbols of the machine and the activation values of the award/penalty symbols of the machine have mapping relations with each other. But their sources are all the activation values of the demand symbols of the machine.

The activation value of a demand symbol of the machine may be directly and synchronously mapped to an emotion symbol of the machine and an award/penalty symbol of the machine; or may be mapped to an award/penalty symbol firstly, and then mapped to an emotion symbol; or may be mapped to an emotion symbol firstly, and then mapped to an award/penalty symbol. Since the purpose of S1.7 is to establish a mapping relation between activation values of the demand symbols, emotion symbols and award/penalty symbols, there is no essential difference in this mapping order.

The step S1 further includes: 1.8. an activation value propagating network is established by learning between various specific events to the extended demand symbols.

In S1.8, an activation value propagating network may be established by learning between specific events to extended demand symbols. In the present application, there are three sources of learning for the machine:

(A) instinct knowledge preset to the machine by human in S2;

(B) knowledge obtained by the machine learning through self award/penalty experiences and accumulating the memory updated in S7; and (C) knowledge obtained by the machine performing language learning of S3 to S4, establishing a virtual experience, and accumulating the memory.

In the step S2 that preset instinct knowledge is established, according to the methods in S1.5.1 and S1.5.2 and according to human knowledge, preset demand, award/penalty and emotion symbols and representative low-level features corresponding thereto are stored in the memory according to a simultaneous storage method.

First, the machine needs to be preset with a set of instinct knowledge for learning. For example, the approval demand may be represented by two symbols, namely, an approval-obtaining symbol and an approval-losing symbol. Representative events that represent obtaining approval, such as smiling, praising, hugging, etc. and others ways that humans express approval, may be stored in the same memory according to the adjacency relations. As another example, frowning, cold eyes, berating and others ways that humans express disapproval and an approval-losing symbol, are stored in the memory according to the simultaneous storage method. The method described above is that the machine establishes one or more preset relation networks for each kind of instinctive knowledge directly with the help of human beings. The method described above require that humans help the machine to extract low-level features from instinct knowledge.

However, it is difficult for a human to help a machine extract low-level features that represent approvals or disapprovals. Thus, the machine may also store many different specific forms of memory in different memory spaces, and their common features are related to the approval or disapproval. These memories are extracted from human life and contain approval or disapproval symbols. In this way, the machine itself automatically extracts related low-level features from the memories in subsequent learning through a chain activation process, and a memory and forgetting mechanism. The above method requires that humans help the machine to preset typical scenes, while the low-level features are extracted by the machine itself.

The method described above is applicable to the instinctive response of a machine. For example, in the case where the machine does not already have a learning capability, it may be necessary to establish the learning capability in a preset manner. For example, if there are many dangerous knowledge, and the machine cannot establish through its own experience, a directly preset relation network may be used, or the memory may be directly preset. The preset relation network is established by the machine by simulating a relation network with the help of humans.

For example, the machine may use a method similar to that described above to store a low-level feature such as a high altitude drop (e.g. a visual height difference, a location of its center of gravity, etc.) and a danger symbol in adjacency. When the visual height difference and the location of its own center of gravity appear in the input information of the machine, the low-level features are assigned initial activation values, and the initial activation values are propagated through the chain associative activation process in the relation network. If a combination of the input height difference and the location of its own center of gravity is similar to a combination of preset danger features in the relation network (the combination itself is also an overall low-distinguishability feature), the danger symbol may obtain a high activation value by similarity activation, adjacency activation and strong memory activation, and become an input information, and activate the relation network again. In a subsequent decision-making process, the machine will establish a response path in a benefit-seeking and harm-avoiding manner This is process to build knowledge that the machine cannot get through the actual experience by presetting the virtual memory.

Another application of instinctive responses is the relation between machine emotions and response paths expressing emotions. The humans may, in a preset manner, preset the machine with some long-term memorized specific emotion symbols and their associated low-level driver command sequences, and corresponding preset award/penalty values. When these specific emotion symbols are activated, the response path generated by the machine may contain these associated low-level driver command sequences. When emotions such as happiness and sadness are activated, they directly activate low-level driver command sequences such as related muscles, expressions and actions through the preset instinct relation network. In executing response paths, the machine may include these paths in its own collection of established response paths due to the fact that the paths formed by these low-level driver command sequences are high-activation-value paths and may also bring an award value. However, whether the final machine will execute these paths is determined by the machine determining the actually displayed emotion expression mode (the process of executing a response path) through an optimal response path optimization process according to input conditions and expected award/penalty value calculation, and the actually displayed emotion expression mode is possibly different from a preset instinctive emotion expression mode.

Therefore, in the demand system, the award/penalty system and the emotion system established by the machine, the machine uses different symbols to represent various demands, uses different symbols to represent various emotions, and also uses different symbols to represent various award/penalty information, and these symbols are also used as a low-level feature which can be assigned a memory value and an activation value, and can be stored according to the method of S3.2 described above; an activation value of a demand symbol representing operation maintenance of the machine itself comes from the monitoring of the operation state of the machine through a preset program; the activation values of other demand symbols come from the chain associative activation value propagating process of the relation network; and people can give instinct knowledge to the machine by simulating the organization form of relation networks.

In a specific implementation method for a demand symbol to obtain an activation value, the activation value of the demand symbol for maintaining the operation of the machine comes from: the machine presets a proper range of various parameters for maintaining a good operating state of the machine; the machine monitors the state of these parameters, and once the activation values of some demand symbols deviate from the proper range, the preset program assigns initial activation values to the demand parameters; the method is that An=fi(Ty, Ug), where An is an activation value obtained by a demand symbol, Ty is a demand type, and Ug is the distance of a demand from the proper range; where fi is a value assigning function, which is a positive correlation function of Ug.

The activation values of the extended demand symbols of the machine come from an activation value propagate process of the relation network and a relation network related to activation value propagating of the extended demand symbols, and may be instinctive knowledge preset to the machine in the form of relation network, or may be a relation network established by the machine through self-summarization or by learning the existing knowledge of human beings.

A specific implementation method for an award/penalty symbol and an emotion symbol to obtain an activation value, including:

The machine uses a mapping function from the activation values of the demand symbols to the activation values of the award/penalty symbols, which is: (R, P)=frp(Ty, S1, delta), where R, P is an award/penalty value (R is an award value or a benefit value, P is a penalty value or a loss value), frp is a mapping function of the award/penalty system, Ty is a demand type, S1 is the current activation value of the demand symbol, and delta is the change value of the current activation value and the previous activation value of the demand symbol.

The machine uses a mapping function from the activation values of the demand symbols to the activation values of the award/penalty symbols, which is: (Em1, Em2, ..., Emn) =fem(Ty1, V1, delta1, Ty2, V2, delta2, ..., Tym, Vm, deltam), where fem is an emotion generating function, Em1, Em2, ..., Emn are the activation values of different emotion symbols, Ty1 to Tym are activated demand symbols, V1 to Vm are the activation values of the demand symbols, and delta1 to deltam are change values of the activation values of the demand symbols compared with a previous time moment.

Therefore, when the demand symbol of the machine obtains the activation value, the award/penalty symbol and the emotion symbol of the machine obtain the corresponding activation values through a preset mapping function.

S2 further includes: S2.1, similarity, adjacency and repeatability relations between information are simulated to establish instinct knowledge, including knowledge obtained by the machine through self-summarization.

First, the machine builds built-in demand, award/penalty and emotion systems, and builds preset knowledge.

Secondly, the machine builds an extended demand system, and uses the preset knowledge to identify the basic feedback from the outside world to its own behavior, such as smiling, praising, hugging, etc. and others ways that humans express approval and frowning, cold eyes, berating and others ways that humans express disapproval, to propagate the activation value to the extended demand symbol.

Then, the machine continues to accumulate memories, and continues to extend its relation network based on the preset relation network according to simultaneous storage, a memory and forgetting mechanism and the chain associative activation process. These extended relation networks include many instinct responses, memories related to built-in demands, awards/penalties and emotions, and memories related to extended demand systems. For example, the processes of charging in different situations, the processes of being encouraged in different emotions, and the processes of completing specified tasks in different emotions. There may be much information in these processes. They are stored simultaneously with the activated demand, award/penalty and emotion symbols (also an input information), and establish adjacency, repeatability and similarity relations. This information establishes an activation value propagating path to demand, award/penalty and emotion symbols. This is common knowledge similar to humans.

For example, when the power of the machine is insufficient, the power data deviates from a proper range, thereby activating a demand symbol requiring charging, and is given an activation value of a corresponding magnitude according to the degree of urgency of requiring charging. The demand symbol assigned with a value is an input information and may propagate the activation value in a chain in the relation network. The current workspace of the machine is thus established. The machine then enters a decision process: the input information is first identified. In this example, one of the input information is the demand symbol. The machine uses the demand symbols and other environment input low-level features to make chain activation in a relation network, and then assembles the activated low-level features into an expectation model according to a local close high activation value transfer relation. The expectation models are combinations of common features in the course of charging in the past. They are common features of the machine to be charged in different scenarios, and are then usually sockets or places where the machine is often used for charging, and the emotions of the machine before and after charging.

The knowledge obtained by the machine through self-summarization is to accumulate memories through own experiences, expand the relation network and obtain knowledge from it.

S2.1 further includes: the machine acquire knowledge by learning human experiences.

In the preset operation of S2, the machine is preset with instinct knowledge. In S2.1, the machine obtains knowledge through its own experience; and the machine can also learn knowledge directly from others' experience. The manifestation is learning through language. The machine creates a virtual information input process (not just language input) through a linguistic symbol sequence as a virtual experience, and accumulates the experience into the memory, extends the relation network, and obtains knowledge from it. That is, the language input must be transformed into a virtual experience similar to a daily experience, which the machine treats as a real experience and acquires knowledge according to the same processing method.

Step 1 of establishing a virtual experience: learn the language itself.

Language is a set of symbols that convey experience to humans. The set of symbols and the contents represented by the symbols are also obtained by learning. Linguistic symbols themselves are a relation network established by the machine from linguistic symbols and the contents represented by the symbols through increasing memories according to the adjacency relation, similarity relation and repeatability relation.

For example, the machine stores different memories about apple linguistic symbols, for example stores a speech about an apple, and adjacently stores a picture of the apple; for example, stores characters of an apple, and adjacently stores a real object image of the apples; stores an image of an apple fruit, and adjacently stores an image of an apple tree; and stores speech about an apple, and adjacently stores an image of an Apple mobile phone. In these memories, when a speech about an apple is input, different images of apples will be activated, and different linguistic memories of apples will be activated, they will further activate apple trees through adjacency storage and similarity, activate children's faces, activate fruit-like common features, activate the plate on which apples are placed, activate the shape of mobile phones, etc.

When a combination of low-level features of apple speech (such as basic syllables, tone, intonation, accent, volume, etc. contained in the pronunciation) is input, these low-level features obtain initial activation values, and each of them propagates the activation value in the relation network through the chain associative activation process. Finally, those common features about apples will obtain higher activation values, because different activation pathways will propagate activation values to these common features during chain associative activation (because of the high reproducibility of occurrences). The common features will therefore obtain higher memory values. On the other hand, because the memory values are high, they may get higher activation values through strong memory activation. So the selection of common features is a positive feedback process. Once a particular common feature in a memory obtains a higher activation value, it is more likely to obtain an even higher activation value in subsequent processes. Other low-level features may be forgotten. The features left after elimination of the forgetting mechanism in different memories are mainly the common features. This is why we choose a high-activation-value feature combination as the expectation model. This is because the common features left in different memories are representative features of this kind of things.

A machine may obtain basic linguistic symbols (such as specific names, verbs, etc.) and their corresponding common feature combinations by repeating in various scenarios. It is also possible to directly modify the relation network by humans to allow the machine to directly obtain the final relationship network.

After having the basic linguistic symbols, the machine can store various correct combinations of linguistic symbols in the memory of the machine, so that the machine can master the combination methods of linguistic symbols (such as common language, common sentence pattern, grammar, etc.). By only using the chain associative activation and the memory and forgetting mechanism, the machine can identify the common low-level features in various correct linguistic symbol combinations, such as "because", "at the same time", "both . . . and . . . ", and other common sentence patterns or common languages, because their combinations have higher activation values and are easier to form a language expectation model. These expectation models have various associated memories concomitantly stored with them. These memories, although very different, must have a common pattern in low distinguishability features. This common pattern is the contents of the common sentences and common words.

Based on linguistic ability, the machine may use a virtual experience composed of language to interpret more abstract linguistic symbols. This is the method of interpretation used in language learning. By combining a more basic language into a virtual experience, and then storing the virtual experience with the abstract language, the abstract language can activate the virtual experience stored next to it to represent the content of the language.

After having mastered the language ability, the machine can directly learn the experience of humans expressed with linguistic symbols through language, so as to obtain all the knowledge accumulated by human.

Step 2 of establishing a virtual experience: establishing an association of linguistic symbols to low-level features to establish a virtual experience.

A virtual experience obtained by language input is a virtual experience created by activating a low-level feature stream through the language input and reassembling the low-level feature stream. Therefore, this virtual experience has a direct relation with the relation network of the machine. The same language input and different relation networks will produce different virtual experiences and form different connection relations.

For example, in order that the machine can build knowledge about "danger", the machine cannot experience every danger situation, and cannot do self-summarization for experience. However, it is possible to tell the machine by language which behaviors and environments are safe and which behaviors and environments are dangerous. The machine may be further informed of different danger levels. Like training a child, telling it "very dangerous", "generally dangerous", and "a little dangerous". This process is the process by which humans transmit their experiences to the machine through language.

In this example, when these languages are input, the machine combines its own relation network to generate a corresponding activation information stream. The activation information stream include low-level features related to the current environment (the environment may also be a virtual environment established by a language), low-level features activated by "dangerous" linguistic symbols, and low-level features activated by languages such as "very", "general" and "a little".

The machine first extracts the input low-level features. The method of extraction prioritizes overall features. The overall features of language include accent changes, tone changes, mood changes, etc. The machine first extracts the overall features in the language input. These features are treated as a whole with a piece of input text or speech, obtaining a static or dynamic overall low-distinguishability feature of the language.

The machine then stores the obtained low-level features according to simultaneous storage, and assigns them initial activation values. These activation values are propagated in the relation network, and a collection of all the low-level features whose current activation values exceed a preset threshold is the workspace of the machine (these activated low-level features may be activated by previous inputs).

The machine first builds an expectation model in the workspace. For example, in this example, the machine may have activated some memories because of the overall features of the input language. These memories are related to the overall features of the input accent changes, tone changes, mood changes, etc. The high-activation-value low-level features in these memories may be some low-level features about others' emotions and self emotions.

The machine then enters a process of reassembling the expectation model, establishing a response path, optimizing the response path, and executing the response path, and responds to the input information.

One possible response is that the machine, based on the reassembled expectation models (self emotions or others' emotions) and the award/penalty values that these emotions may bring to it, establishes a response path, which if to reduce the probability of achieving the expectation models, then through segmented simulation, the expanded response may be to avoid a dangerous environment.

One possible response is that the machine needs to further identify the input information in order to establish a response path in which the award/penalty information meets its preset standard. Through segmented simulation, the expanded response may then be to continue analyzing the input, so the machine further identifies the input through the attention mechanism.

Another form of prioritizing overall features in the process of further recognition of the machine is block identification of language information. The machine divides the input language into a plurality of local language assembly blocks. These blocks are common words, common sentence patterns and words of language. They are often present together, with strong connection between each other in the memory. The contents they activate are also in strong connection with each other. Therefore, they will propagate activation values to each other, and the common words, common sentence patterns and words in the memory will obtain higher activation values. The machine only needs to search for low-level low activation value features with high activation values in the memory, and divides them into block by grouping them according to the activation values that they propagate to each other. The blocks are the expectation models. It contains both linguistic and non-linguistic symbols. They are typically a collection of one or more concepts. However, the low-activation-value features, as they are neither common features nor features closely related to the current input, will be ignored in the initial iterative identification process because the selected activation value threshold is high.

For example, in this example, there may be many high-activation-value features that are activated by "danger", including past experiences of the machine related to "danger", the experiences may be instinctive low-level features combinations preset to the machine or learned by the machine's own experience. It may be an emotion symbol, or some blurred contour image, both and these low-level features and danger symbols have high activation value propagating paths. These emotions or the low-level features in the contour image both have high activation values, and also related to other input information. Other input information will also propagate activation values to specific low-level features. Therefore, the combination of low-level features that are most related to all input information and have a high activation value propagating path with "danger" is what the current concept of "danger" contains. The high-activation-value emotion symbol or contour image activated by "danger" must be in a specific environment (including language-created environment) to determine the range.

In terms of "very", "general", "a little", etc. among the activated low-level features, the high-activation-value low-level features are most likely to be low-distinguishability images expressing a number, for example, some contour images expressing different numbers, and some sensory features (emotion symbols caused by number). Also, among all the low-level features activated by them, the low-level feature having the highest correlation with all the input information is possible to obtain a higher activation value, and becomes a currently applicable part of the concept.

Assume that the machine hears the language "a little danger" for the first time. The expectation model activated by "a little" is "some fuzzy contours", and the expectation model activated by "danger" also includes some "fuzzy contours", and the machine replaces the same low-level features, as in the expectation model activated by danger, in the expectation model activated by "a little" (attribute experience generalization) according to a common language block combination such as "a little XX", so as to establish a combination order of the low-level features activated under a language input such as "a little". This combination is a virtual experience.

The machine stores this virtual experience and other information simultaneously in the memory as a part of a relation network. If the machine establishes a large number of similar memories in subsequent learning, then through the chain associative activation, and the memory and forgetting mechanism, the machine can progressively extract the common parts in these memories, thereby establishing a close activation value transfer relation between "a little danger" and the combination of common features related thereto, thereby forming new knowledge.

An experience created by the machine with language may contain only those common features, or features closely related to the input information, this is because only the high-activation-value low-level features are used when the machine creates the language-expressed experience. In subsequent information processing, if the machine activates these virtual memories, it is possible to simultaneously activate language input memories stored concomitantly therewith, so that both real and virtual experiences can be identified. If the machine itself forgets the language input process stored concomitantly with it, the machine cannot distinguish whether a piece of memory is real or virtual.

Creating virtual experiences through language is an important form of human learning. In the present application, it is also an important form of machine learning. The machine can directly modify the relation network to achieve fast learning, or directly extend the relation network through memory transplantation and memory sharing to obtain new knowledge, and can also use distributed multi-terminal learning, and then through memory sharing to achieve fast learning.

A specific implementation method for presetting instinct knowledge to the machine, includes:

instinct knowledge is preset by simulating the form of the relation network, and they are a part of the relation network; their preset forms include:

low-level features, which humans believe that there are closely relations therebetween, including demand symbols, award/penalty symbols and emotion symbols, are stored at a smaller distance in the memory space; low-level features, which humans believe that there are no close relations therebetween, including demand symbols, award/penalty symbols and emotion symbols, are stored at a greater distance in the memory space;

low-level features, which humans regard as common for the same kind of instinct knowledge, including demand symbols, award/penalty symbols and emotion symbols, are assigned with higher memory values; and low-level features, which humans regard as not common for the same kind of instinct knowledge, including demand symbols, award/penalty symbols and emotion symbols, are assigned with smaller memory values;

among these preset instinct knowledge, the memory values of the low-level features may be fixed or may be maintained according to the memory and forgetting mechanism.

Description on the relation network in S4:

a relation network is a network in which numerous low-level features are connected to each other, the low-level features serve as nodes, and links are activation value transfer relations. In the present application, the chain associative activation process is the primary form of using a relation network.

One form of activation is adjacency activation, which reflects the connection relation of low-level features in time of appearance, for example, classrooms and teachers, bathrooms and soaps, water and fish, etc. They are often activated simultaneously. This is an application of the adjacency principle.

The second form of activation is similarity activation, for example, red apples and children's faces, which have similar color; and an Apple mobile phone and red apples, which have similar pronunciation. Similarity activation therefore means that things activate each other through similar low-level features. This is an application of the similarity principle.

The third form of activation is strong memory activation, as the memory value comes from the activation value. The repeatedly activated low-level features may increase the memory value. It is these common features in the same kind of things that they have the opportunity to be repeated. At the same time, the common features are usually low-distinguishability features, and as they cannot be used to distinguish specific individuals in the same kind of things, they will become low-distinguishability high-memory-value features as a bridge of experience generalization. This is an application of the repeatability principle.

In the present application, we store demand, award/penalty and emotion information and other information of the machine together in the relation network, and establish an activation value transfer relation therebetween, with the purpose of enabling the machine to learn award/penalty information related to each step autonomously. On the basis of preset award/penalty knowledge (including the demand system, award/penalty system and emotion system), the machine establishes activation value transfer relations between various information and award/penalty information through learning. In the subsequent decision-making, the machine can use these relations to choose its own response path in a benefit-seeking and harm-avoiding manner. This is an application of the benefit-seeking and harm-avoiding manner principle.

In the present application, the basic elements for establishing the relation network are the low-level features. The relation networks express relations between low-level features. Therefore, we do not need to establish knowledge rules, information classification, and knowledge map, semantic distance, and we do not need establish concepts or logical relations between concepts. The machine only needs to establish the basic demand system, and the mapping relation between the basic demand and the award/penalty and emotion, the basic instinct knowledge, the basic initial activation value assigning program, and the machine can extend the relation network by accumulating memories continuously. The machine can even express the relation between things that human beings have not mastered by simulating the process of human beings expressing knowledge, which is the process of creating new knowledge.

The process of steps S1 to S4, which are part of the present application, is an understanding of the input information, and the disclosed method shows how to establish a relation network.

Regarding S5, the response of the machine to the input information is described as follows:

the response of the machine to the input information is a part of how the machine utilizes the relation network and is the second part of the present application. The time of establishing the relation network is taken as a technical boundary between the first part and the second part.

The response of the machine to the input information is completed by a decision-making system and an execution system of the machine. The process that the machine establishes a response path is divided into three major phases. The first phase: S5.1, the machine identifies input information, belonging to a pre-step, and S5.2, an expectation model sequence is established; the second phase: S5.3 to S5.6, the machine establishes an optimal response path; the third phase: the machine implements the response path in S6.

Figure 5:
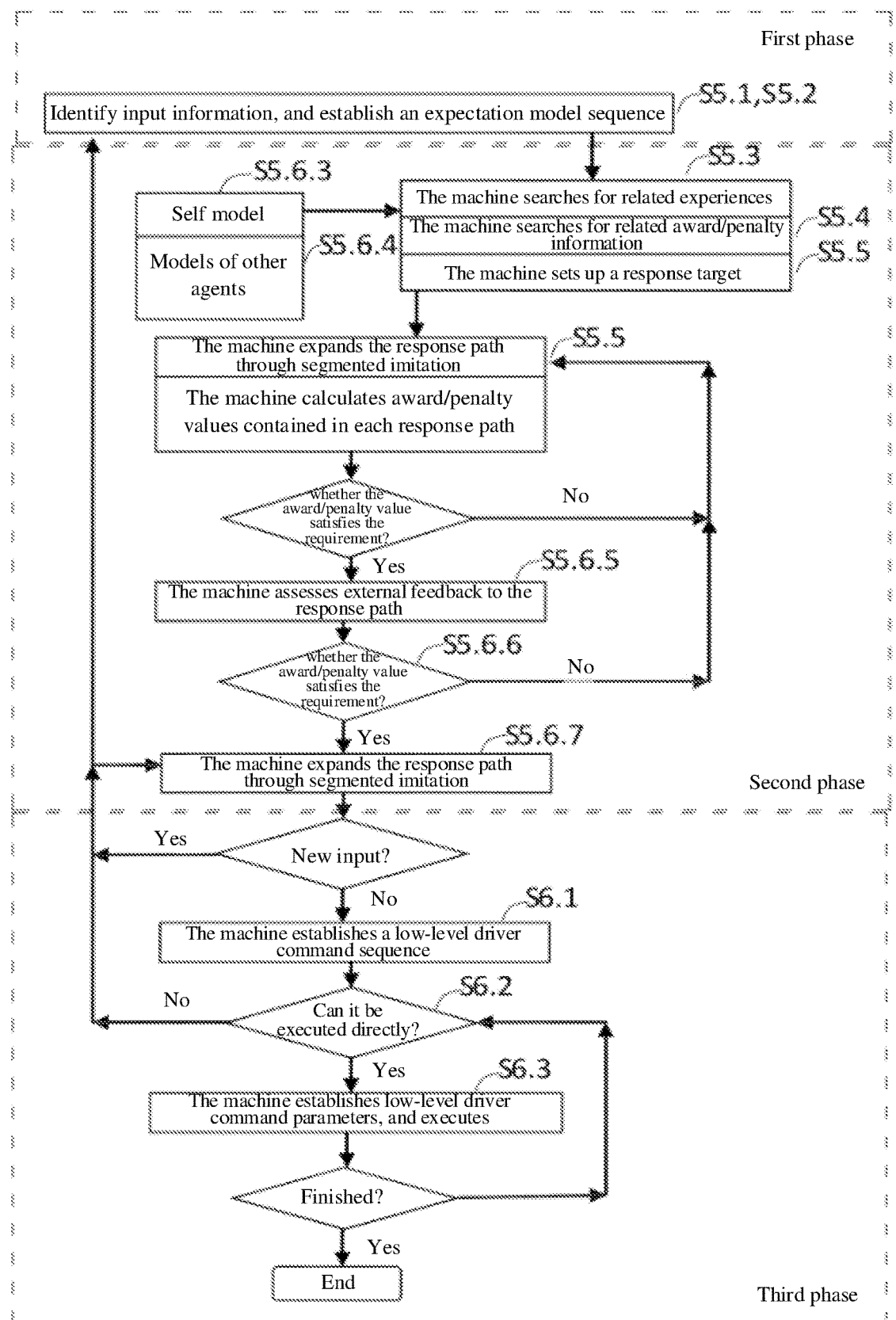
FIG. 5 is an exemplary diagram of the steps of a machine decision process according to an example of the present application.

FIG. 5 shows an exemplary diagram of the decision-making and execution process of the machine, further described below in conjunction with FIG. 5.

S5.2 in FIG. 5, belonging to the first phase: the machine identifies the input information and establishes an expectation model sequence.

S5.1 is a pre-set step of S5.2, in which the machine extracts low-level features from the input information and searches the relation network obtained in S4 for related low-level features, i.e., hidden low-level features may be added to the expectation model sequence in addition to the low-level features extracted from the input information, for example, information that is omitted in the input or information that is referred to using pronouns in the input. Since these hidden features must be strongly connected with the previous input features or the current input features of the machine, they may be omitted or substituted in the information exchange. Through the chain associative activation process, the machine can use the relation between them to propagate high activation values to the information which is omitted or replaced, so as to incorporate the low-level features related to the information which is omitted or replaced into the expectation model establishment process, thereby supplementing the information which is omitted or replaced in the input information.

The low-level features extracted in S5.1 of the present step are to establish a response and execute a response path on the basis of the iterative relation network; however, the above-mentioned process S3.1 of extracting low-level features is a separate description of this step S5.1, which is to describe the establishment process of the relation network and separately describe the process of extracting low-level features. The feature extraction of S5.1 and the feature extraction of S3.1 are two descriptions of the same process. The feature extraction process of S3.1 is described separately to illustrate the process of establishing an iterated relation network; the feature extraction process of S5.1 is to illustrate as an instruction or demand driven iterative periodic process of information identification, optimal response path establishment, and execution of response paths.

Firstly, in S5.1, the machine summarizes multi-sensor input into total input information according to an input time order.

Secondly, in S5.1, the machine extracts low-level features from the input information with prioritizing overall features, and then according to the attention mechanism, extracts within an attention range by using appropriate sensors and appropriate distinguishability.

Third, in S5.1, the machine uses the extracted low-level features to perform a chain associative activation process in the relation network. The machine assigns initial activation values to the extracted low-level features through an initial activation value assigning program, and performs the chain associative activation process. The order of initiating the chain associative activation process may be according to an order of the extracted low-level features, may also be according to an order with prioritizing overall features, and may also be according to an order with prioritizing low-level features with high initial activation values, which needs to be selected in practice.

Again, the machine reassembles low-level features with high activation values exceeding a preset threshold into expectation models according to closeness of activation value transfer relations therebetween. The method that the machine establishes the expectation model is as follows:

One method is: each low-level feature with a high activation value (e.g., exceeding a preset threshold VTA) is taken as the center, and other low-level features propagating the high activation value (exceeding a preset threshold) with the low-level feature are selected as a combination of local close relations, which are the expectation models. In this method, a single low-level feature may be used for multiple expectation models.

Another method is: firstly, a high preset activation value threshold is set, and low-level features of which the activation value exceeds the preset activation threshold are combined into one or more combinations of local close relation according to a criterion of propagating a high activation value between each other, which are expectation models. The machine then decreases the preset activation value threshold (e.g., VTB, VTA>VTB) and again assembles the low-level features exceeding the preset activation threshold into one or more expectation models. In this method, the low-level features are hierarchically assembled into a multi-distinguishability expectation model according to the activation values.

Another method is: among the activated low-level features, the machine first selects N low-level features with the highest activation values as the center, and selects the other low-level features propagating high activation values (exceeding a preset threshold) with the low-level features. The machine then groups these selected low-level features into N combinations, which is an the expectation model with the N low-level features with the highest activation values as the center. The machine then uses the same process for the remaining high-activation-value low-level features to build other expectation models. The machine iterates the above process until expectation models of all low-level features with high activation values are established.

In the above combination method, the theoretical basis is that the common features of the same kind things are low-distinguishability features and high-activation-value features. Therefore, the models composed of these low-distinguishability, high-memory-value features are common models that can represent a kind of things, and they are framework models that compose the same kind of things. In addition, the low-level features that appear directly in this input, even if they are not common features, may achieve high activation values in the relation network. Therefore, the machine uses the high-activation-value low-level features to compose the expectation models, namely, using common features of the same kind of things, and adds the unique features of the input thing to compose the expectation model. When needed, the machine needs to narrow the scope of the expectation model again through the attention mechanism to further extract more input low-level features. It is through such an iterative process that the machine identifies the input information.

Since the expectation models are assembled by activation value transfer relations, there is a first-in-first phenomenon in the above process. For example, two machines with the same relation network, facing the same input feature combination, where one machine suddenly processes an extra piece of information about the input feature combination, then this machine will update the related part of the relation network after processing the extra piece of information. One relation line may be added according to a memory curve. This increased memory value does not face in a short time. Therefore, when facing the same feature map and the same initial activation values, the machine that has processed additional information will propagate more activation values along the just enhanced relation line, thus leading to the first-in-first phenomenon.

This phenomenon also occurs in the processing of similar input features. For example, after a machine identifies a local feature and builds an expectation model, other local features that are similar to the local feature are easily considered to be the same expectation model, and even if there is a small difference between them, the machine ignores the difference and considers them to be the same expectation model.

In this case, the machine does not need to iteratively identify other similar local features and consumes very little energy (small penalty value), so the machine, when building the response path, would prefer to move along the expectation models composed of similar local features (the expectation models are previously created when the low-level features are extracted with prioritizing overall features). Because the overall model is further identified in this manner to result in a high award value, it becomes the preferred response path for the machine. This phenomenon makes it easy for the machine to ignore local feature differences, and move attention ranges with overall features composed of similar local features, and preferentially identify overall features composed of existing local features through repeatability.

In S5.2, the machine uses the high-activation-value low-level features to build an expectation model sequence. That is, the machine needs to build the temporal and spatial orders of the expectation models and use the expectation model sequence to search for related experiences. These experiences are: in memory similar to the expectation model sequence, common features of this kind of processes include common causes of occurrence, common main steps and common consequences. These common features are established in a subsequent step by using high-activation-value low-level features by segmented simulation (a method for reassembling activation information, i.e., an experience generalization method).

In S5.2, the machine assembles the expectation model sequence based on two pieces of information: one is the order of input information related to expectation models. That is, the order of the language input, the order of the environment input, and the order of input of the machine's own state information, as well as the order in which the demand, award/penalty and emotion symbols of the machine are activated. The second is that some expectation models will specify the temporal or spatial order of other expectation models.

Examples: similar to language input, there is information specifying the organization of language, for example, grammar, conjunctions, and common sentence patterns. Human understanding of language is not only based on the order of language vocabulary input, but also based on grammatical structure and common structure to understand the order of information organization represented by language. Likewise, in the low-level features extracted from the aggregate information of the machine, there is also information specifying the organization of the expectation models. For example, the grammar, conjunctions and common sentence patterns in the input of linguistic symbols, for example, the overall low-level features in image input, are all information for the organization of the expectation model sequence.

It is to be noted that the expectation model established with linguistic symbols, does not only contain linguistic symbols, but is a closely connected local relation network organized by all types of features activated by the linguistic symbols, usually a combination of one or more concepts. They may contain both linguistic symbols and, more particularly, combinations of low-level features other than linguistic symbols, such as action sequences, scene combinations, etc. Similarly, the expectation model created by the image input includes not only images, but also language. For example, for typical hotel image input, the expectation model established by the machine may include a "hotel" linguistic symbol and typical hotel images. A typical hotel image is created by using low-level features which survive in various memories about hotels and obtain high activation values during the current chain activation to enter the workspace of the machine, and simulating high-activation value combinations from past combinations. They are common features established by the machine with respect to the concept of hotels. When the machine organizes other input related expectation models, for example, the machine hears the language of "hotel foreground", "bed", "internal bar", etc. these features are assembled using the combination of expectation models in the past memories in the relation network (i.e., the common combination features identified in various combinations in the memory). Thus, the machine organizes the spatial order of the expectation models according to the organization of models in the memory. For example, even if the machine does not already see the "bed", the machine can give low-level features of "bed" at an expected location in the currently established spatial environment based on the spatial expectation model activated by the "hotel". In the subsequent steps, the space environment established at present will obtain more low-level features along with the iterative identification of the machine. As they continue to perform the chain associative activation process, high-activation-value features in the memory are continuously transferred, and as more high-activation-value low-level features are added, the organization order of the expectation models is progressively specified to include more detailed features, which is the iterative identification process of the machine.

Therefore, in S5.2, the machine first builds the expectation model sequence blocks using the information in the input information specifying the assembly order of other information. This is a manifestation that the machine preferentially identifies the overall information. The expectation model blocks generally represent a relatively independent kind of processes. The decision-making system of the machine may select to preferentially identify a particular expectation model block due to fast identification of an award value brought by the award/penalty information, thereby quickly establishing an analysis of the award/penalty information. The machine then organizes the preferentially identified expectation model blocks in the input temporal or spatial order to form an expectation model sequence.

S5.1 further includes: the workspace of the machine is determined. In the present application, the machine's workspace is a collection of all the activated low-level features. With such range limitation, the range of information that the general-purpose artificial intelligence needs to search can be converted into a limited range.

The expectation model built by the machine in S5.1 is just a block combination of the low-level features. The purpose of the combination is to identify the input information, i.e., to exclude ambiguities through common combination methods and context of the input features, thereby identifying the input information. In 5.2, the machine organizes the established expectation models into an information stream composed of expectation models, namely, an expectation model sequence.

All the contents contained in S5.3, S5.4, S5.5 and S5.6 in FIG. 5 belong to the second phase: the machine optimizes the response path.

The machine searches in S5.3 for experiences related to the expectation model sequence, and searches for similar information streams in the memory according to the information stream. In S5.4, the award/penalty information possibly brought by the input information stream is predicted according to the award/penalty information generated by similar information streams in the memory.

For example, if the machine sees a partially obscured face, the information of the obscured part will activate related features of the face in the memory, including overall features and local overall features, for example, the contour of the face is an overall feature, and the eyes, nose and mouth are local overall features. The contour of the face is a low-distinguishability overall feature that specifies the organization of the rest information. Therefore, even if there is only one eye in the input information, in the memory, the expectation model consisting of the high-activation-value feature is an expectation model with two eyes. This is because both eyes are the common feature of this kind of information, and their activation values are high. In this way, the expectation model information organized by the machine using the high-activation-value low-level features is a face with two eyes and a shelter in the front.

The machine then analyzes the causes, main processes and consequences of the input process by searching for similar processes in the memory, and calculates the award/penalty value brought by this information.

When searching for similar processes in the memory as described above, there is a problem: that is, the expectation model of the machine may differ from the expectation model contained in the similar process in the memory, resulting in the machine not being able to find a similar process. For example, in the previous example, the machine may have a lot of experiences with a shelter blocking a part of an object, but have no memory about a shelter blocking one eye, or one eye of a child. That is, there is a mismatch between input and experience. The machine therefore needs to find a way to search for a similar process that can be used for reference.

The implementation method of S5.3 specifically includes, but not limited to:

Method 1:

(1) The machine uses low-level features of a high-activation-value low-level feature collection A (exceeding a preset activation threshold AT, AT being a relatively high threshold) in the expectation model to perform chain associative activation in the relation network, and searches for similar features and similar arrangements in a new workspace, namely, a process of finding similarity.

This step is that the machine first removes details from the expectation model, and then searches for similar processes in the memory. For example, in the previous example, the details of the shelter are removed, and only the overall features are retained. For example, the details of the eye are removed, leaving only a contour. The machine can then find many processes that can be referenced. Since only expectation models composed of the high-activation-value low-level feature collection A are selected, which are usually common features in the same kind of things, the probability of finding similar processes is high and the number of similar processes that can be found is more.

(2) The machine uses low-level features in a high-activation-value set low-level feature collection B (exceeding a preset activation threshold BT, BT<AT) in the expectation model, and searches for similar features and similar arrangements in the new workspace, i.e., a process of finding similarity. As the number of low-level features used increases, similar processes found may contain a smaller range.

This step is that the machine adds more details in the process of finding similarity, so as to limit the range and obtain a more matching experience.

(3) The machine iterates the method in (2), each time using a lower activation threshold, thereby progressively finding a more specific, experience process for reference, until one or more related processes are found that can cover all expectation models.

This step is that the machine iterates until the best matching reference process is found.

Method 2:

(1) The machine performs chain associative activation in the relation network directly according to the expectation models and an input order of the expectation models, and searches for similar processes in a new workspace.

This step is that the machine first directly searches for the best matching experience.

(2) If the machine does not find a matching arrangement at (1), the machine progressively removes some low-level features from low to high according to the activation values to reduce limit conditions, so as to search for related memories in a wider range in the memory.

This step is when the machine cannot find an experience with the best match, and the machine removes some details and finds a suboptimal match.

(3) The machine then iterates the method in (2), every time removes part of low-activation-value features, until one or more related processes are found that can cover all expectation models.

This step is that the machine reduces the matching requirements step by step until a matched reference process is found.

Method 1 and Method 2 are essentially the same. The difference is that Method 1 is to find a more matching process by progressively increasing the low-level features, while Method 2 is to find a more matching process by progressively reducing the low-level features.

Through the above-mentioned method, after the machine finds the optimal reference process, the machine simulates the organization of the expectation models in the reference process, and organizes the low-level features in the input expectation models first in a manner of overlapping (replacing) the similar low-level features in the input expectation models with the expectation models in the reference process. The expectation models are then organized according to the organization of the low-level features. This establishes an organization order of the input expectation models.

The above method is a method for activation information reorganization. If the machine does not find a similar process, the machine needs to decompose the input process into multiple segments and perform the method for activation information reorganization on each segment to find a similar process. This process is the method of segmented simulation. The machine uses the past experiences to organize an information stream in the process of organizing the expectation models through the method of segmented simulation and activation information reorganization. In the process of establishing a response path, in the process of optimizing the response path, the award/penalty information brought by a similar process in the past is used to predict the award/penalty information brought by the response path, so that an optimal response path is searched according to the award/penalty information of each segment of the path.

It is important to note that the input expectation models refer to the expectation models organized from high-activation-value low-level features in the workspace, and not only refers to the models organized from the input features. As in the previous example, the input expectation model is an expectation model having two eyes, rather than a model having only one eye. There are some omissions and repetitions in the language, and the machine automatically complements or automatically ignores the omissions and repetitions according to the expectation models organized from high-activation-value low-level features in the workspace. The machine organizes the expectation models based on its own experience, not just on input information.

The method that the machine establishes expectation model sequences is as follows: the machine organizes the temporal and spatial orders of the expectation models according to two aspects of information; one aspect of information is input temporal and spatial orders of the expectation models, and the other aspect of information is that some of the expectation models contain information indicating temporal and spatial relations of other expectation models.

Therefore, when the machine finds a memory similar to the input expectation model sequence, the method is to use only a part of the low-level features (high-activation-value low-level features) in the expectation model, and their combinations, to find a similar memory. When there is no memory that matches all of the high-activation-value low-level features, the machine finds a memory that is similar to the segmented expectation model sequence. The expectation model sequence is also segmented in accordance with activation value propagating close relations between the expectation models, and each segment may be a combination of one or more concepts. Moreover, the segmentation process may be iterative.

For S5.4, the machine searches for award/penalty information.

During the process of building an information stream of the input expectation models, the machine needs to search for a similar process. When the similar process is activated, the award/penalty symbols included in the similar process is also activated. These award/penalty symbols are stored by the machine concomitantly with past and similar processes. Their activation value is a predicted value of the machine for the award/penalty information. The machine needs to calculate the award/penalty values brought by different paths so as to select the optimal path.

Which path each award/penalty symbol belongs to is determined according to which path its activation value comes from. If the activation value of an award/penalty symbol comes from multiple paths, the machine, when calculating the award/penalty value of each path, only needs to take an activation value propagated from its own path to the award/penalty symbol AP as the award/penalty value that the award/penalty symbol AP brings to its own path.

For the first part of S5.5, the machine establishes a response target:

the response target of the machine is to increase the probability of achieving a path that brings awards and to reduce the probability of achieving a path that brings losses.

For the second part of S5.5, the machine establishes a response path:

in step 1 of establishing a response path, the response path a path through which the response target can be achieved. It is one or more implementation steps established by the machine from the input information to the response target using the relation network. Each step is a sub-target on the response path.

The machine may put each response path into the relation network to activate award/penalty information related to the path through the chain associative activation process. The award/penalty information is then used to accept or reject a corresponding response path.

There are many ways for the machine to find a path between the input information and the response target. Since in the present application we define the workspace of the machine (all the activated low-level features) and also establish the award/penalty information for each path, the machine can employ the best path search methods known at present. For example, the random search method: the machine randomly establishes a response path based on the connections in the relation network, and then uses the response path to assess the award/penalty value. For example, the preset rule search method: some selection rules are established artificially, and the machine establishes response paths under the guidance of these rules, and uses these response paths to assess the award/penalty value. To find an optimal response path in a limited search space with a definite award/penalty value is a problem that has been solved by the industry at present. This is the case for example with artificial intelligence applied to chess or games.

In the present application, we disclose another more efficient method for finding an optimal response path, which we refer to as a segmented simulation method:

a collection of input information is taken as point A, and a collection of response targets is taken as point B. The machine combines the point A and the point B to perform chain associative activation to search for high-activation-value low-level features, which are high-activation-value low-level features in an activation value propagating process from point A to point B. They are intermediate bridges connecting points A and B. Then, each high-activation-value low-level feature is combined with other low-level features propagating activation values with it closely to establish one or more expectation models, which are intermediate nodes. In this way, the machine establishes one or more response paths from the point A through the intermediate nodes to the point B. Once the response path is established, the machine needs to assess the response path. In the process of assessing the response path or executing the response path, the machine may use a similar method again which takes a start point and an end point of any segment of the response path as a new point A and point B, and expands the path again, which is a method of segmented simulation. This is because the experiences learned by the machine may be different in each time of expanding the response path. The machine prefers high-activation-value points, because they are a common part of past memories of the same kind and they are common features of a kind of things, scenes or processes, which makes them high-activation-value points. For each expansion, the experience learned by the machine may be different. Therefore, the response path established by the machine is formed by combination by learning different experiences in segments. So we call this process a segmented simulation process.

The machine may also do not separately perform the process of combining the point A and pint B to perform chain associative activation, but directly search in the existing workspace for intermediate nodes that have activation value propagating processes with both point A and point B, and the machine establishes one or more response paths from point A through these intermediate nodes to point B. These paths may include a path from point A directly to point B; or possibility include a path from point A to an intermediate point and then to point B; or possibility include a path from point A to a plurality of intermediate points and then to point B; or possibility include a path from point A to an intermediate point 1, then to an intermediate point 2, etc. through a plurality of intermediate points and then to point B.

In the above method, the machine simulates the multiple segments of past experiences in the path from point A to point B and divides it into multiple segments of the path through intermediate points. When the machine executes the response path, the machine may also implement the entire path from point A to point B by way of simulation, segmented simulation.

In step 2 of S5.5 that the machine establishes a response path:

the machine takes each path as a virtual input process, and then re-determines a workspace of the machine through the chain associative activation process. Then the activated award/penalty information is calculated in the workspace.

One calculation method is to directly add award values (e.g., benefit values), and add penalty values (e.g., loss values), and then compare the two.

Another calculation method is to establish a reasonable space of award/penalty information by taking various types of award/penalty symbols as dimensions. Then, according to the actual value of each dimension, the actual spatial location of the current award/penalty information is determined. Then, the distance between the actual spatial location and the reasonable spatial location is compared, and a preset rule is adopted to determine the total award/penalty value according to the distance.

Another calculation method is: the activation value of the award/penalty symbol is activated by the demand symbol, so the award/penalty symbol is often stored with the demand symbol. Therefore, the machine compares demand symbols in close activation value transfer relations with specific award/penalty symbols, and takes the activation values of demand symbols in the demand system of the current machine as weights to weight the award/penalty symbols.

Then, the machine selects path segments that maximizes the award and minimizes the penalty as its own response path according to the principle of benefit-seeking and harm-avoiding.

In step 3 of S5.5 that the machine establishes a response path:

there is a correspondence between the award/penalty information and the response path of the machine. However, the award/penalty value of the machine comes from activation value propagating of the expectation models, while the expectation models have a confidence problem.

An expectation model contains many low-level features called elements of the expectation model. Under the attention mechanism, each time the input low-level features are extracted, the machine needs to re-establish the workspace and re-enter the decision-making and execution system. However, under the attention mechanism of the machine, the expectation model created by the machine changes after each time that new features are input. It may go from abstract to more concrete, or because the previous expectation model is formed with ambiguities, when more low-level features are input, the expectation model jumps from one model to another. Therefore, the confidence of the expectation model itself affects the calculation of the overall award/penalty value. The confidence of the expectation model is the probability P of occurrence of the expectation model. The calculation method is as follows: assuming that there are N high-activation-value features (elements) in the expectation model, and M of them (existing in the input information) have occurred in the current determination, then $P=fp(M, N)$, fp being a probability function, for example, $fp=M/N$, although other functions may be used, which needs to be selected in practice.

The machine needs the award/penalty information of each path when making decisions. The award/penalty information of each path is determined by the expectation models on the path and their combination. When the same high-activation-value features may be assembled into several expectation models, in which case the machine, when calculating the award/penalty value for the current path, needs to decompose the current response path into multiple response paths. Each path contains a possible expectation model. For example:

Assume that there are three expectation models A1, A2 and A3 on the response path, i.e., three sub-targets. A2 has two possible expectation models: A2a and A2b. The probability of occurrence of A2a is P_A2a, and the probability of occurrence of A2b is P_A2b. In should be noted that the sum of A2a and A2b does not necessarily equal 100%. This is because it is also possible that both are low. The machine then needs to decompose the original response path into two paths, one containing A2a and the other containing A2b. The machine separately calculates the award/penalty values for the two paths.

One possible implementation method for the machine to calculate the award/penalty value of each response path is as follows:

$$AR\_PU\_Total = \sum_{k=1}^{n} AR_k - \sum_{k=1}^{n} PU_k,$$

where AR_PU_Total is the total award/penalty value obtained after calculation, $AR_k$ is an activation value which is propagated to an award symbol by the expectation model, $PU_k$ is an activation value which is propagated to a penalty symbol by the expectation model, N represents that there are N expectation models in the path, and the calculation method adopted by the machine is a simple addition.

The activation value from the expectation model itself already reflects the probability P of occurrence of the model. This is because, if the expectation model contains a relatively small number of low-level features with high activation values, the probability that the model is true is relatively low, and the total activation value propagated to the award/penalty symbols from the low-level features with high activation values contained in the model is also low. On the contrary, if the model contains a relatively large number of low-level features with high activation values, the probability that the model is true is relatively high, and the total activation value propagated to the award/penalty symbols from the low-level features with high activation values contained in the model is also low.

If the total award/penalty value exceeds an award threshold when the machine performs a response, the machine may take the current response path and further expands the response path, proceeding to the step S5.6.7.

If the total award/penalty value is less than a penalty threshold when the machine performs a response, the machine may reject this response path and searches for other response paths, including new paths created by further expanding the response path by segmented simulation. The machine then returns to step S5.5.

If the total award/penalty value is between the two, the machine cannot make a decision, and the response path selected by the machine may further determine the confidence of the expectation model through the attention mechanism. This step is also the step of the machine entering the execution environment, i.e., entering S5.6.7. In this case, the machine may go directly back to the step of S5.1 to re-identify the input information, and perform the step of S5.2 to establish an expectation model sequence according to the attention mechanism by segmented simulation of past experiences.

The assessment process of the award/penalty value described above is similar to that of human beings. If the benefit is high and the probability is low, as long as the loss is small in all cases, it is also willing to try. Because the sum of the benefit and loss then still reaches the award/penalty threshold for the machine executing the corresponding response path. If the benefit is low and the potential loss is large, it is avoided. Because the sum of the benefit and loss then still reaches the award/penalty threshold for the machine to avoid the corresponding response path. If it is between the award/penalty values, analysis is further carried for determination. Obviously, whether the machine further determines the confidence of the expectation model does not mean that the machine determines the credibility of a certain expectation model, but that the machine predicts whether the award/penalty value of the expectation model meets the criteria for making decisions. If the criterion for making decisions is met, the expectation model meets confidence, and the machine may no longer identify the expectation model, even if the model itself has low confidence.

When calculating the overall award/penalty value of a specific path, the machine makes an order according to the activation values of the award/penalty symbols. For example, for those expectation models that are not closely related to the award/penalty values (for example, the environment expectation models that are not important), their corresponding activation values of award/penalty symbol are also low, so that they have little effect on the overall award/penalty value. These expectation models, which are less related to the award/penalty value, will be ignored by the machine because the overall award/penalty value has met the threshold and will not be further identified.

In step 4 of S5.5 that the machine establishes a response path:

the response path established in S5.5 is not necessarily the optimal path. The machine also needs to further assess the established response path in S5.6.

S5.6 includes: (1) the machine conjectures the external feedback to its response path.

The machine uses empathy analysis to conjecture external feedback to its response path. The so called empathy analysis is that, the machine predicts the response of external agents to its own behaviors.

The feedback step of the response path comprises: (a) first, the machine use the common low-level features of external agents (such as other machines, humans, or animals) to build their common model. The machine then builds a model for the analysis object by adding specific high-memory-value low-level features for the analysis object to the common model. This process is the same as the process that the machine creates a self model, which does not require may specific step, but uses the low-level features of external agents to perform chain associative activation in the relation network and then assemble the expectation models. These expectation models are models of external agents.

The feedback step of the response path comprises: (b) secondly, the machine needs to conjecture the decision parameters of other machines (or similar things like humans and animals).

The machine needs to extract the parameters of the demand system, award/penalty system, emotion system, decision-making and execution system of the analysis object from the expectation models of the analysis object.

The machine first inputs the expectation models of the analysis object into the relation network, and searches for related memories about the input object through the chain associative activation process. These memories include low-level features that have similarity relations, adjacency relations, and strong memory relations with the input object. They are memories related with common features and unique features of the analysis object. Memories related to the common features of the analysis object include: relevant social cognition, knowledge scope speculation, decision parameter speculation activated by common attributes like gender, social status, knowledge, age, physical status, etc. Memories related to the unique features of the analysis object include: memories relate to a particular analysis object.

Therefore, by using the common features and unique features of the analysis object to do chain associative activation, the established space is the analysis object's workspace. Therefore, when the machine conjectures the feedback of the analysis object, the workspace B is used, namely, the new space established through the chain associative activation process of the analysis object, rather than the workspace A originally established by the machine itself.

The machine simulates the parameters of its own relation network, demand system, award/penalty system, emotion system, and decision-making and execution system, and establishes initial parameters of the relation network, the demand system, the award/penalty system, the emotion system, and the decision-making and execution system of the analysis object. The machine activates the information input into the analysis object from the memory in a chain in the workspace B, and then follows the same decision-making and execution process to determine the possible response of the analysis object. If the response generated by the analysis object does not match the actual response of the analysis object in the memory, the machine matches the predicted response to the actual response in the memory by adjusting the parameters of the relation network, demand system, award/penalty system, emotion system, and decision and execution system. This is a process of calibrating the intermediate transform parameters by means of inputs and outputs, which is non-linear, by means of successive iterations, determining the direction to adjust the parameters according to the gradient, and progressively reducing the error.

The machine iterates the process described above, until the machine, by adjusting the parameters, produces an input-output mapping relation matching with a memory actually about a specific object. The machine then stores the adjusted parameter models together with other input information of simultaneity as an expectation model for the specific analysis object, including the relation network, the demand system, the award/penalty system, the emotion system, and the decision-making and execution system. It can be used directly as an expectation model without reconstruction when the analysis object is referred to later.

After the machine processes a number of similar analysis objects, repeated low-level features in the established model may obtain high memory values due to repeatability. They are common models of this class of analysis objects. When this kind of objects are later processed, their corresponding common models are called directly. On this basis, the parameters in the individual model are then quickly calibrated through inputs and outputs in the memory associated with the individual.

The feedback step of the response path includes: (c) in the workspace B, the machine takes as input the information that has been obtained of the current analysis object, and then determines a new workspace (workspace C) through the chain associative activation process. The workspace C is a workspace in which the machine performs prediction and analysis on objects to establish decisions and behaviors.

The feedback step of the response path includes: (d) after predicting the parameters of the relation network, the demand system, the award/penalty system, the emotion system, the decision-making system and the execution system of the analysis object, after determining the workspace C, the machine simulates the analysis object to establish an expectation model sequence, searches for award/penalty information, and predicts the possible response path of the analysis object according to the steps of 6.5.2.1 and 6.5.2.2.

This process is referred to as using the empathy analysis to conjecture external feedback to its response path. This is because the machine first builds its own prediction of the information possessed by the analysis object, and builds a decision-making system for the analysis object, and simulates the decision-making process for the analysis object to conjecture possible responses by the analysis object. The above-mentioned processes are all conjectured on the basis of their own relation network, so they are referred to as empathy.

The empathy is the basis of sympathy and the generalization of machine to human emotional relations. This is because the machine conjectures the response (also including cognition, emotion and behavior) of the analysis object with its own response (including cognition, emotion and behavior). Similarly, the response of the analysis object may also include how the analysis object conjectures its own response.

Under the constraint of empathy, the machine can maintain its own interests while maintaining the interests of the collection. This is because if the machine does not maintain the benefits of the collection, it will cause loss. Therefore, the optimal response path of the machine is to maintain the interests of others at the same time.

Therefore, another simple implementation of empathy is: to make some preset settings for the demand system, the award/penalty system and the emotion system of the machine, for example, to make a setting in the award/penalty system that, when damaging interests of others, it also causes loss to itself; when helping others gain benefits, it will also bring certain benefits to themselves. Under the constraints of these award and penalty rules, the machine, driven by maximizing the interests, will balance its own interests and others' interests, showing a certain degree of empathy.

S5.6 includes: (2) the machine adds possible feedback of the analysis object to its own response path to the input information, iterates again the steps S5.1 to S5.6 in FIG. 5, and finally reaches the preset acceptance criteria of the award/penalty value or the convergence of the award/penalty value.

One criterion of award/penalty value acceptance is that an award/penalty threshold Vt_total is used, and when the total calculated award/penalty value reaches the award/penalty threshold Vt_total, the machine considers that the preset criterion is reached and the machine enters the next link. Another criterion is that Vt_total used is a multidimensional spatial region consisting of all types of award/penalty values. When various types of award/penalty values of the machine are in their own dimensions, and the constructed space points are in this multidimensional space, the machine considers that the preset threshold value is reached.

The criterion for the convergence of the award/penalty value is that the machine compares the total award/penalty value of the new response path with the total award/penalty value of the last response path to determine if they converge with a preset standard Vap. Vap is a preset threshold combination, and when the machine further expands the response path, if after two or more expansions, the obtained total award/penalty value difference is less than Vap, it is considered that the established response path has converged, and the machine enters the next link. If the difference between the two total award/penalty values is greater than Vap, the machine considers that the award/penalty information does not converge, and the machine needs to continue to find the optimal response path, and return to step S5.1 to go through all the processes, and re-assess each possible response path. When the award/penalty value of the machine converges, it is possible that the total award/penalty value does not meet the acceptance criteria. In this case, the response path established by the machine does nothing, which is also a response path. This response path also needs to be included in the optimal response path assessment. The machine then chooses the response path with the least penalty to stop the loss.

The step S6 that the machine executes the response and the step S7 that the machine updates the iterative relation network are performed after the optimal response path assessment, and the step S7 includes: activate value maintenance.

In the process that the machine establishes the response path, the activation values in the workspace of the machine may fade over time. The assignment of activation values and the fading of activation values may be implemented using a dedicated activation value management module. The fading of activation values means that the activation value decreases with time. The decreasing rate needs to be selected according to practice. With regard to the fading of activation values, one possible embodiment may be that the activation value fades by a positive variable delta after each clock cycle driven by the clock. This is a linear fading method, and a non-linear fading method, such as an exponential or reciprocal fading method, etc. can also be used.

The fading of the activation values raises the problem of maintaining the activation state of information. In the process that the machine optimizes the response path, if the thinking time is too long, before establishing the optimal response path, it is expected that the activation values of the expectation model will fade, which leads to disappear of high-activation-value features, so that the machine cannot optimize the response path and cannot respond to the input information. Failure to respond to thinking may result in penalty values. Therefore, the optimal response path of the machine also involves avoiding such penalty values. In this case, the response path established by the machine may be to preferentially maintain the current activation values and continue to optimize the response path.

This response path appears as: the high-activation-value expectation model is converted into a virtual output, and this virtual output is used as information input to go through the chain associative activation process to maintain the activation values of the expectation model sequence. This is similar to how humans think, sometimes speak in their own words, or think in mind. This virtual input, like the real input flow, uses the associative activation process to search for memory and update memory values. Therefore, this method can be used to allow the machine to intentionally increase the activation value of certain specific information, or to allow certain specific information to appear repeatedly to increase its memory value, and allow the activation value of non-important information to fade away from decision-making considerations. This is the use of reading or noticing to increase memory. In addition, in this case, if new input information appears, the machine has to interrupt the thinking process to process the new information, resulting in the loss of the activation value. Therefore, in order to avoid such a loss, the machine may establish a response path to actively send out a buffer auxiliary word such as "uh", or to send out a message in some other way, indicating that it is thinking and should not be disturbed. Yet another possibility is to give the machine a limited time of thinking, or if there is too much information, the machine needs to complete the information response as soon as possible, in which case the machine may also take the method of transferring an output to an input. In this way, the machine emphasizes the useful information, suppressing the interference information (the interference information is not re-entered and its activation value fades over time). These methods are commonly used by humans, and in the present application, we also introduce it into machine thinking. Since human communication is most frequently speech and text, a typical high-activation-value node is speech or text. Therefore, in a self-information filtering or emphasizing method of the machine, the virtual output is usually speech or text.

All the contents contained in S6.1 and S6.2 in FIG. 5 belong to the third phase: the machine executes the response path.

The third phase: S6, the machine executes the response path.

The process that the machine executes the response path is essentially a segmented simulation process.

S6.1 includes step 1 that the machine executes a response path: the optimal response path is further segmented to establish more specific response paths.

The machine establishes an optimal response path in S5.6.7. When establishing the optimal response path, the machine only needs to reach the preset criteria or have converged. These response paths typically include only a sequence of expectation models. Because these models typically have a direct connection to the award/penalty information.

In S6.1, the machine does not only need to determine the award/penalty value, but also needs to decompose the response path into a low-level driver command sequence that can be directly executed by the machine. A method of decomposing the response path into an low-level command sequence for execution is the method of segmented simulation.

Segmented simulation is to decompose a process into many small processes and find the related experience of each small process. This is because in life it is difficult to have a single experience that can be used directly to deal with the current problem. However, when the machine faces each problem, the problem can always be decomposed into many small steps, and then simulates by looking for similar experience as the small steps, so as to achieve the purpose of small steps. When a small step has a lot of experience that can be simulated, the choice may be made according to the principle of benefit-seeking and harm-avoiding. When a small step has no experience to be simulated, it is further decomposed into smaller steps until experiences that can be simulated are found and concatenated to solve the problem.

When looking for similar experience, the method used is to the activation information reassembly method. The essence of this method is to remove the details of the input process and the process in memory and only compare the similarity between their main features. This is accomplished by removing the low-activation-value feature and using only the high-activation-value feature to compare the features and their combinations.

If no solution is found, the machine enters a response process that is unable to process the information, which is also a response process simulating past experience.

For example: in S5.1, the machine takes a collection of input information as point A, and a collection of response targets is as point B. By executing the method in S5.6.7, a response path complying with the principle of benefit-seeking and harm-avoiding is established. Assume that the optimal response path established by the machine is a response path from point A to point C and then from point C to point B.

Point C is a sub-target on the response path. The machine needs to expand the path from point A to point C and from point C to point B layer by layer into more specific steps. For example, from point A to C is changed to from point A to point C1, and then point C1 to point C. she expansion method is to use the method in S5.6 to establish the optimal response path, but point C as a new response target. The path from point A to point C is converted to a path from point A to point C1 and a path from point C1 to point C. So we can consider the path from point A to point C as a process framework, and the paths from point A to point C1 and point C1 to point C are extensions of this process framework. This method of segmentation is not random, but according to the response path from point A to point C, to select the intermediate high-activation-value low-level features, and build their own expectation model sequence point C1. So it is not a random path. The implementation method is the same as in 6.2: first search for the low-level feature that has high-activation-value transfer relation with both points A and C. If no low-level features are found that meet the preset activation value threshold, the machine may re-establish a new workspace through the chain associative activation process with all the low-level features contained in points A and C as separate inputs, find in the new space the low-level feature that has high-activation-value transfer relation with both points A and C. If the machine still cannot find, the machine may search for related low-level features by reducing the preset activation value threshold. The machine then uses these high-activation-value features in the middle of the path to compose the expectation model sequence point C1 or more middle points.

The path from point A to point C1 and from point C1 to point C contains more specific details due to the addition of sub-target C1. However, this specific information may not be the low-level driver commands that the machine can directly execute. So the machine also needs to iterate the method in S5.6 to decompose the process that required to be performed, layer by layer, completely into low-level driver command sequence executable by the machine. It is important to note that each time the machine performs the decomposition, it is required to follow the procedures in S5.6, such as assessing award/penalty information, predicting external feedback, and readjusting the response path selection until the optimal response path is found.

In the above process, the path decomposition, path assessment and simulation and execution of the machine are interleaved. During the execution of the machine, the evaluation is performed at the same time, and new information may be continuously input. Each time new information is entered, the machine changes the activation value distribution through the chain associative activation process. This is equivalent to the machine updating its own workspace. All subsequent activities of the machine, including the creation, evaluation and decomposition of new response paths, are based on the current latest workspace.

Thus, each time a machine expands a response path, the response path of the machine may result in a change in the overall award/penalty value. The machine needs to re-calculate the award/penalty value. If the award/penalty value in S5.6.7 fails to meet the preset criteria, the machine needs to return to the process of S5.1, and choose another expanded path until the expanded path meets the requirement on the award/penalty value, and then the machine goes to step S6.

Step S6.1 of S6 that the machine executes the response path: a low-level driver command sequence is established.

The step of executing the response is a process of translating the plan into an actual output. If the machine chooses speech output, this is relatively simple and can be implemented just by performing segmented simulation, organizing into speech output sequences, and invoking pronunciation experience. It should be noted that the machine may, based on experience (of itself or others), choose some dynamic features for expressing the whole sentence (e.g., using different dynamic patterns of tone, voice frequency and pitch or accent changes to express doubts, mockery, distrust, emphasis and other common human ways of expressing. These are usually low-resolution features of a sentence or whole piece of speech). As the machine learns these expressions from human life, any expression of a human can theoretically be learned by a machine.

The problem becomes much more complicated if the response path of the machine is a motion output, or a mixed output of speech and motions. This is equivalent to organizing an activity. In the response path of the machine in S6, there may only be primary sub-targets (for determining the award/penalty information). The specific implementation process needs to be expanded layer-by-layer in S6.1.

In S6.2, the machine also needs to further organize the execution order of executing specific processes. The machine establishes the order according to the overall activation value of each path segment. For path segments that cannot be executed temporarily, as the temporally or spatially related low-level features are mismatched with the temporally or spatially related features of the current input information, the established expectation module sequence may have a relatively low overall activation value. This is because the time and space do not match, and the temporally or spatially related features of the input information cannot propagate activation values. For the processes that can be performed immediately, the temporally or spatially similar low-level features are activated and will propagate activation values, so that the overall activation value on such paths is relatively high and therefore selected by the machine to be performed immediately.

By the above-mentioned method, the machine automatically sorts a sequence of sub-objects to be output, and automatically divides them in time and space according to different times and spaces that the sub-objects involve. The automatic sorting is essentially established by simulating past experiences of sorting. This is because when time and space are matched, the corresponding experience in the past will get higher activation value.

During this process, the machine may encounter new information at any time, so that the machine needs to process various information, and the original targets become inheritance targets. This is equivalent to situation that in a process of organizing an activity, new problems continuously emerge and need to be solved immediately, or the activity may stop. The director then calls to stop other activities and first resolves the immediate problems. Once the problems are resolved, the activity continues. Another situation is that during this process, the director suddenly receives a new task, and the director decides, after weighing the advantages and disadvantages, to suspend the activity and deal with the new task first. These are both performed according to the methods in S6.1 and S6.2 in the decision-making system by simulating the past experience under the principle of benefit-seeking and harm-avoiding.

Step 3 of S6 that the machine executes the response path: parameters of low-level driver commands are established.

The low-level driver command is a series of instructions in the form of op (op_pur, op_obj, op_par). Where op represents the name of an operation command, and op_pur represents a basic operation, such as driving a motor, driving a loudspeaker, receiving information, searching information, etc. op_obj represents one or more objects to receive the command, for example, motor A, motor B, loudspeaker 1, loudspeaker 3, unit X to perform data search, etc. op_par represents one or more parameters to be sent to an operation program, for example, input waveform and sound intensity of a loudspeaker, driving parameters of a motor, input, search, mode, and search range of a data search unit, etc. The op_pur, op_obj, op_par involved in the commands are all stored in the memory, and they all have a adjacency relation. Similarity relations exist between a large number of similar driver commands. They also have strong memory relations because they are repeated frequently. The op_pur, op_obj, op_par of the slow-level commands, as well as their causes and consequences, are all a part of the relation network.

The low-level driver commands established in S6.1 and S6.2 by the machine is directed to the current response path through. Their op_pur, op_obj, and op_par need to be determined according to the current response path. The operation purpose op_pur can be obtained by process decomposition in 6.2 and 6.3.1, since the operation purpose is a part of the response path. Then, the machine needs to determine the parameters op_obj and op_par, which requires an attribute experience generalization process. Past op_obj and op_par with similar op_pur are searched for. As op_pur itself is a relatively detailed process, for example, driving a motor, driving a loudspeaker, receiving information, searching for information, etc. and they are largely present in the memory of the machine. How to find the best matching op_pur and use op_obj and op_par corresponding to op_pur in the memory to complete the current response path is the attribute experience generalization process.

A method for searching for the best matching op_pur: by taking the low-level features contained in the current response path (the sub-link that needs to be executed) to find a process similar to each feature through a chain associative activation process, the more those similar features, the more low-level features with high activation values contained in this experience, which are matching experiences. The matching experience may include many op (op_pur, op_obj, op_par) in the low-level driving command. The op_pur with the highest activation values is the best matching op_pur. Their op_obj, op_par are the experiences that can be referred between each other. The op_pur with the highest activation value, in turn, obtains its high activation value from the upper-level process that calls it (because there is an activation value propagating path from the input to the process that either has similar low-level features or that transfers out activation values through adjacency activation and strong memory activation). The high activation value of the upper-level process that calling it obtains its own high activation value from its upper-level process. So the method of finding the best matching op_pur by the machine does not search randomly through the whole workspace, but only needs to search and compare a certain few paths according to the related experience in the past.

It is important to note that through the chain associative activation process, the best matching op_pur found is for the low-level feature (attribute) matching of things. This is because all activation values are transferred between the low-level features. In the present application, the basis of all processes is calculated by the relation (similarity relation, adjacency relation and strong memory relation) between the low-level features (attributes). So the machine finds the best matching op_pur, and its op_obj, op_par, in memory, and the object it operates on may not be the same as the object it needs to operate on currently, but there must be similar low-level features between them, which is the bridge the machine can find it and use it. This is the attribute experience generalization method.

For example: assume that a kitchen robot has experience cutting meat, but also cucumber, potato and other vegetables, but not sausages. Assume that the current response path is cutting sausage.

The machine uses the method in S6.3 to perform the response path of cutting sausages:

The current response target is to cut sausages (from execution after the last decision process). The machine finds all the experience about cutting things through the input of a number of low-level features, such as all the low-level features about the kitchen, all the low-level features about the knife, all the low-level features activated in the previous process, through the chain associative activation process. In this example, the high-activation-value low-level features activated by the input low-level feature may be: all related experience; the appearance of the knife, the weight feeling on use, the method of grasping the knife, the loss caused by injury to itself, the profile characteristics of the object after being cut, etc.; among the low-level features of sausages, common low-level features existing in similar objects, such as touch, pressure sensation, softness and hardness, appearance, etc.; there may also be penalty symbols that have been activated by the loss of food that was previously soiled, and award symbols that have been activated by the experience of the owner's approval of the task that was previously completed; there are also expectation model sequences that pay out power to activate penalty symbols, etc. However, in these activated experiences, some of the experiences of cutting meat, cucumbers and other vegetables by the machine share common low-level features, some of the specific features about sausages (such as appearance, degree of hardness and so on), and some of other features (including environment, self model and models of other agent).

Among these, the most similar experience to the current whole thing, scene and process is the past experience in cutting meat in kitchens, and experience in cutting cucumbers, potatoes and other vegetables. Through the chain associative activation process, plus the process of combining the high-activation-value low-level features in S6.1 into the expectation model sequence, plus the decision-making process in S6.2, the machine can establish a response path. In this example, the response path established by the machine may be: simulating the past partial process of cutting meat (how to hold a knife), simulating the past process of cutting cucumbers, and vegetables (how to fix the cut object), simulating the past process of cutting food (e.g., to prevent from getting polluted), and combining these experiences in segments to create a process that can be simulated.

In determining the strength of holding the knife, the past process of cutting meat was simulated (because sausages are similar to meat in the tactile, firmness, and other low-level features) because the firmness of the cut object was most closely linked to the related low-level driver commands. The machine therefore propagates an additional activation value to the related experience of cutting meat by the low-level feature firmness in the input. The related experience of cutting meat is therefore a high-activation-value experience. Their related low-level driver command parameters can be generalized to processes of cutting an object with similar firmness with the feature of firmness of the cut object as a bridge. op_pur is an action of cutting, op_obj is a muscle group, and op_par is a command parameter sequence sent to the muscle group. Although the machine has no experience of cutting sausages, but for the firmness of sausages, the low-level driver command parameters that bring award values (for example, the sense of accomplishment after completing a task, which is an extended demand symbol) in the past for a similar firmness can be used for reference.

Similarly, in a response path established by the machine by simulating past experience, a path segment is fixing a cut object. By the similarity of sausages and cucumbers in shape, the best experience found by the machine may be the experience (including sequence actions) of fixing the shape (low-level features) of cucumbers in the past cutting process.

Therefore, in the workspace of the machine not all experience of cutting meat and cucumbers can be used for cutting sausages. Instead, experiences most related to the current situation (high-activation-value experience) would be found, the common low-level features are used as a bridge (such as the firmness, the shape of the cut object), and a command closely related to the common features (the activation value of this command mainly comes from the common feature) are used as a generalization object.

Therefore, it can be seen from the above-mentioned method that the object of experience generalization in the present application is a low-level feature, rather than other information. The experience generalization process disclosed in the present application can be determined directly using mathematical calculations according to the size of transfer of activation values. It is therefore definite and calculable.

The machine, while performing an simulation task, decomposes the whole process into more detailed targets. The machine is thinking while doing. This is due to the fact that the realities are very different and it is not possible for the machine to always know the external situation and make a plan in advance. The response path accomplished by interaction between the environment and the machine. Between the steps of S5.6.7 and S6.1, the machine may encounter new input information. The machine then needs to return to step S5.1. After the machine has executed a low-level driver command, the machine needs to return and continue to execute the next low-level driver command programmed in S6.1.

The following is an example of a specific process from identifying an input to executing a response.

The main steps of an artificial intelligence machine interacting with the outside world are briefly described by way of example. Assume that in an unfamiliar city hotel room, the machine receives a command from the owner to "go out for a bottle of beer and come back". Through the step S5.1 and all activities of the machine prior to the step S5.1, the machine extracts a large number of low-level features from the input information, for example, the master's voice input (tone, intonation, stress distribution, syllable segmentation and dynamic changes in speech features, etc.), for example, environment-related low-level features (such as the contour of the house, external noise, indoor furniture layout, etc.), for example, sensor input data about its own status, for example, the activation status of its own need, award/penalty emotion system. These low-level features are used to establish an expectation model. The establishment of the expectation model is performed by iterating the steps S5, S6, and S7, which are omitted herein. Assume that after iterative identification, the representative features in the expectation model established by the machine may be: "room", "hotel", "go out", "buy", "a bottle of", "beer", "take", "come back", "evening", "out of power", "room charge", etc. (where room charge may be a response path left by the previous activity of the machine). These expectation models are formed by combining the high-activation-value low-level features according to the closeness of activation value propagating distribution, and the low-level feature with the highest activation value among them is the representative feature of a concept, for example, the representative feature of the concept room may be the contour feature of the room; the representative feature of the concept hotel may be the contour feature of the appearance of the hotel or a linguistic symbol of the hotel; the representative feature of the concept "a bottle of" may be a common feature of bottles (such as a partial contour of a bottle, and the specific contour shape is related to the growth process of the machine); "evening" is a typical common feature of evening (such as a dark environment feature, which is related to the growth process of the machine); the representative features of other action concepts are common features in these action memories. The combination of the above-mentioned expectation models with each other is a common combination, and during the chain activation process thereof, they propagate the activation values with each other, for example "go out"+"buy", "buy"+"a bottle of"+"beer", "go out"+"X"+"come back" (X represents any other information), "take"+"come back", etc., are concept blocks, and the elements contained in these concept blocks propagate a relatively large activation value between each other, so that they push up the activation values of the low-level features contained in each other, thereby be "highlighted" and being selected by the machine to constitute the expectation models. An expectation model is a process in which the machine identifies input information using common features of concepts without ambiguities. This is similar to using context to exclude ambiguities in speech recognition, except that in the present application, the machine uses common sense to exclude ambiguities. Common knowledge is the combination of various common low-level features, including spatial and temporal combinations, and the relation of these combinations with demand, award/penalty, and emotion information.

In S5.2, the machine needs to establish a sequence (temporal and spatial orders) of these expectation models. In this example, an actual input spatial order of the low-level features in the environment of the hotel room is the spatial order that the machine combines the low-level features, that is, they themselves carry a spatial order, and the machine does not need to adjust them. On the other hand, the high-activation-value low-distinguishability common environment features activated by the concept hotel constitute the expectation model of the environment, which is the information that establishes the spatial sequence from the common features in the past similar scenes. For example, even if the machine does not already see a "bed", the machine may, based on an expectation model such as the hotel, assign a low-level feature such as "bed" to an expected location in the hotel space environment. The space environment established at present will input more low-level features along with the iterative identification of the machine. As high-activation-value features in the memory are continuously transferred, and as more high-activation-value low-level features are added, the combination is progressively specified, which is the iterative identification process of the machine. In this example, a similar method is used for the expectation model sequence established from the speech information, e.g., one of the basis of the order is the input of information specifying the order of other expectation models, and another basis of the order is the input order of the information itself. Common grammatical structures such as "out"+"X"+"back" are information specifying the temporal and spatial orders of other expectation models. The representative feature of "go out" is an expectation model sequence composed of a combination of features such as an action of "walk", "room door" and "stair", which is a linguistic information stream activated by the linguistic symbol of "go out"+other types of features (information such as "room door" and "elevator") currently input. This information stream is preferentially identified as an information block. In a similar way, the machine then combines the expectation model sequences corresponding to information blocks of "buy beer", "a bottle of", etc., and information blocks of "get back", etc. The machine then organizes these expectation models according to the organization order of common features in the memory of colloquial structures such as "out"+"X"+"come back". Without explicitly specifying the order of the expectation models, the machine organizes the expectation models according to the order of the input information.

In step S5.3, the machine searches for a similar process in the past. The machine again uses high-activation-value features in the expectation model sequence to search for related experience. The method is to remove low-activation-value features in the established expectation model sequence, and the remaining low-level feature combination is the key part (common features in the same process) in this expectation model sequence. In this example, after, for example, the machine initially sets a high-activation-value threshold, the selected high-activation-value low-level feature sequence may be linguistic symbols in the expectation model sequences (since linguistic symbols are common features of concepts, which typically obtain high activation values). In this example, it may be similar expectation model sequences such as "go", "buy", "come back", etc. The machine looks for related experience through these simplified expectation model sequences. Obviously, it is possible to find many related experiences. The machine reduces the activation value threshold, and adds more low-level features, such as high-activation-value features (such as some linguistic symbols, or some high-activation-value image features, or some high-activation-value text, speech features, or some high-activation-value expression features, etc.) in the expectation model such as "hotel", "elevator", "evening", "store", "electricity", "reception", "room charge", etc., and then searches again for similar processes in the memory. This time the machine finds similar processes that more closely matches the current input expectation model sequence. The machine may or may not find one or more similar processes.

When many similar processes are found, the machine can further add the low-level features; in fact, the machine cannot find an experience that exactly matches the current input expectation model sequence, because it is impossible to memorize an experience with the same hotel, the same time, the same location, and the machine in the same external environment and internal state, and getting the same instructions. For example, in this example, the machine is in an unfamiliar city hotel room, and the best matching experience that the machine can find is the common feature (key step) in a process of "go out, buy something, and come back".

In 5.3, the machine may find a process similar to the input expectation model sequence, such as the "go out, buy something, and come back" process in this example. Similar processes may not be found, and then the machine needs to search for multiple experiences by the method of segmented simulation according to the method of information chunking, and then combine these experiences as an experience that can be simulated.

Since the segmented simulation method exists in the process that the machine searching for similar experiences, also exists in the process of establishing and optimizing a response path, and also exists in the process of executing the response path, the method of segmented simulation will be described through following steps.

In S5.4, the machine searches for award/penalty information. Because the machine gets a given task, at low distinguishability, the process of "go out, buy something, and come back" also activates the concept of "task". Therefore, the award/penalty information related to the task may also be activated, for example, the task is completed with awards, while failed with penalties. At the same time, there are related past experience of going out to buy things, for example, the experience of buying wrong things and being punished, the experience of buying more or less things and being punished, the loss value caused by paying out electricity, the self-accomplishment obtained by completing the task (awards obtained after the extended demand is satisfied), etc.

In the first part of S5.5, the machine establishes a response target. The response target of the machine is to achieve awards and avoid penalties. The method is to increase the probability of achieving paths that bring awards, and to reduce the probability of achieving paths that bring the loss (a kind of penalty symbol).

In the second part of S5.5, the machine simulates the most related experience ("go out, buy something, and come back"), and establishes an activation value propagating path between the input information (point A, the currently located external environment and the internal state of the machine itself, as well as its own demand, award/penalty and emotion states) and the target (point B, achieving the activated awards, avoiding the activated penalties). Obviously, there may be a plurality of paths established between them, and intermediate nodes (a high-activation-value expectation model) established in one response path is the key links such as "go out", "go to a store", "buy things" and "come back", and these links are common links in this type of tasks. The representative features of these links may be linguistic symbols or other types of features, all of which are locally closely related high-activation-value low-level feature combinations, the essence of which is the currently activated part of one or more concepts.

The machine then proceeds to step 3 in S5.5 where the award/penalty value for each response path is calculated according to the method provided in S5.5. Assume that the machine finds itself low in power, where the penalty of executing the established path may exceed the award of completing the task (as a severe power outage is expected to result in a loss value), then the optimal response path established by the machine is to reject the task. In the following S5.6, the machine predicts, with empathy, that the master will punish it because it does not execute the instructions of the master, so when optimizing the response path, the machine needs to consider this virtual punished process into calculation of the award/penalty information, and search again to avoid this activated penalty path, thereby informing the mater the reason why it refuses to execute the task. According to the experience of the machine, this reduces the probability of achieving the activated penalty path.

In this example, we assume that the machine finds through calculating the award/penalty information that the response path of "go out, buy something and come back" can propagate the award/penalty value criteria. The machine then proceeds to the phase of S5.6 for the empathy analysis. Based on past experience, the machine builds a virtual process of buying things out and getting back, and analyzes the feedback of other agents to its behavior. According to the method for establishing models of other agents in S5.6, or directly calling models similar to other agents which have been established previously, the machine analyzes the feedback of other agents to its own behavior, adds this virtual feedback to the optimized response path, and re-analyzes the award/penalty value brought by the whole response path+the feedback of other agents.

For example, the machine finds through empathy analysis that when it propagates through the front desk, the front desk waiter may request the room charge. If it is unable to pay the room charge, it has to pay the cost of time and electricity to complete the process of paying the room charge again. This results in a virtual penalty path. In order to avoid entering this path, the machine simulates past experience and creates a new response path, for example, to ask the master whether it is authorized to pay the room charge. Thus, the machine may nest many other tasks in establishing the optimal response path and determine the execution order according to the time and space limits of the tasks. The execution order is completed automatically. For example, in this example, if the machine needs to avoid entering a penalty path related to pay the room charge, then the related experience is activated, and the response path is to be authorized by the master. The usual experience of obtaining the master's authorization is to ask directly, and all the conditions related to direct asking are satisfied (such as face-to-face, privacy, etc.), the implicit environment information (time and spatial information) will also propagate activation values to the expectation models contained in the response path of direct asking, so that the total activation value of the response path of direct asking becomes very high, and the award/penalty information can also propagate, then the machine may execute this the response path of direct asking preferentially. It is to be noted that these branch tasks may go through all phases of S5, S6, S7. The machine usually performs multiple tasks and these task execution phases are interleaved.

With the same process, the machine may further ask the master whether it is safe to go out in the evening (to avoid a potential loss path predicted by empathy), or the machine may further confirm with the master whether it only needs to buy a bottle of beer (e.g., the machine may have an experience of being punished because the master did not express clearly, and in order to avoid this penalty path, the machine may further confirm the real thought of the master).

In this example, assume that the machine is authorized by the master to pay the room charge, the machine eventually establishes a response path capable of propagating the award/penalty value assessment criteria, and begins executing the response path.

The machine goes to the phase of S6. The machine needs to establish a response path between its current state and response path and the first sub-target "go out" in execution order. Obviously, chain associative activation is performed between its state and "go out", and the intermediate node with the highest activation value is a lower-layer sub-target, which may be sub-targets such as "stand up" (for example, the machine is currently sitting), "find the door", "walk over", "open the door" and "walk out".

Obviously, the machine needs to further establish more specific lower-level sub-targets between its own state and "stand up". The machine then expands this sub-path again using the same segmented simulation method. The machine may find that the process to be simulated is "stand up from the sofa". The machine then needs to decompose the concept of "stand up from the sofa". In simulating the process of "stand up from the sofa", the machine may find that the sub-targets that need to be simulated are a series of more detailed targets such as "drive the legs", "lean forward", "keep balance", "stretch out the hands to protect yourself". These targets are achieved by the machine through high-activation-value intermediate bridge nodes in the relation network.

These processes are not yet low-level driver commands, and the machine cannot execute them directly. The machine then needs to decompose each detail target again. The machine then begins to continue to hierarchically expand the sub-paths successively.

In simulating the sub-process of "drive the legs", while taking "drive the legs" as an instruction, the machine changes the target of "drive the legs" to a series of driving commands to individual muscles by searching for related experiences in memory in similar cases and combining these related experiences. These driving commands themselves are also memories obtained from a large number of simulations in similar environments by reinforcement learning and the memory and forgetting mechanism. These memories have become permanent through repeated simulations, and they are the experiences. We are basically unaware of this process when we search and use them.

In the above process, each response path is expanded in segments hierarchically, and the expansion method is completed according to the method in 6.1. The order in which the low-level driver commands are established is achieved as described in 6.2. Assigning appropriate parameters to the low-level driver commands is accomplished through attribute experience generalization in 6.3.

Assume that after the above steps, the machine stands up from the sofa. However, the machine does not complete the simulation of the sub-process of "go out". By simulating the memory, the machine finds that all the "go out" in the memory is to go out through the "door". Assume that the machine goes through the processes of S6.1, S6.2 and S6.3 to complete the sub-targets step by step and finally gets to the "door". The machine continues simulating the process of "go out" in the memory. There may be a process feature of "open the door" in these processes. Then, "open the door" becomes the object to be simulated by the machine. However, the machine has no experience in opening the door from the inside of the room. The machine then takes the "open the door" as a sub-target, and searches the entire memory for a path between the current state and open a door. The obtained response path with the highest activation value may be a simplified dynamic low-level feature of "open the door", and the image inside may be based on an image of opening a at home. In this dynamic low-level feature, the door is opened by holding the door handle, then rotating, and then pulling back. But the machine does not find the same door handle on the door of this hotel room. The machine then has to use the method of segmented simulation again. Low-level features with high-activation-value transfer relations with "door handle" both in current input and the past memory are searched, and the low-level feature found is the common feature in the concept of "door handle". That is, the machine establishes an expectation model by reducing the detailed features of the "door handle" in the memory (removing details, the left high-activation-value low-level features are the common features of the same kind of things) and uses this expectation model to identify the current door handle (this process may also be iterated). This object, which is similar to "door handle" in location and shape on the door, may be the door handle on the room door. The machine then uses the common features the two both have to complete the operation on the current door handle by generalizing the operations related to the common features. The machine finds door handle use methods related to the common features in the past experiences about the door handle, and decomposes the entire process in segments into low-level driver commands, generalizes the parameters related with the common features, and eventually opens the door by simulating the past experience, thereby completing the sub-target of "go out". Similarly, the machine performs all sub-targets on the response path in a similar manner. In this process, if new information is encountered, the machine needs to go through all the processes of S5, S6 and S7 again.

As can be seen from the above examples, the method disclosed in the present application establishes machine intelligence that is humanoid general-purpose machine intelligence. Such humanoid general-purpose artificial intelligence can become super intelligence beyond human through the powerful computing, storage and sharing capabilities of machines, and a large number of artificial intelligence devices can be produced through batch replication, which will have a far-reaching impact on human society.

The step of S7 that machine updates the relation network further includes: new knowledge is created.

Knowledge is the use of symbols to express connections between information. The process that the machine discovers new knowledge includes two steps. First, the machine discovers connection relations between information. Second, the machine simulates the existing experience, and uses symbols to express the connection relations.

The machine can have sensors that far exceed human perception in breadth and depth, such as infrared sensors, magnetic field sensors, infrasound and ultrasonic transceivers, radioscope and other sensors that surpass human perception; the machine can also have sensors that far exceed the accuracy of human perception, such as the fine temperature distribution of the human body, and the microscopic resolution of small objects. In addition, the machine can use the sensors on the network as its own sensors by means of networking, so that the detection range of the sensors possessed by the machine far exceeds that of humans. The data acquired by these sensors, and the data of vision, touch, smell, and hearing sensors similar to human perception, are stored simultaneously through the memory and forgetting mechanism, they together become a part of the relation network. In the chain associative activation process, the memories with connection relations may propagate activation values to each other, thereby reinforcing the memory values for each other and increasing connection relations between each other. These connection relations continue to strengthen through repeated occurrences in life, eventually showing closer connections than others. Of these close connections, those that go beyond what is known to humans are new knowledge.

Secondly, by simulating the way humans use symbols to express certain connection relations, from simple to complex, the machine progressively builds symbol sequences that express connection relations between information. These symbol sequences may not be available to humans yet, and this is the new knowledge created by the machine.

For example, in a simple equation learning process, the machine learns to use abstract symbols to represent a class of unknowns, and the concept of unknowns may include a class of fuzzy object contours, and may also include the concept of indefinite quantities and uncertain emotions, which are low-level features. They all come from the process of learning the unknowns by the machine itself, and they are common low-level features obtained from various experiences (including the virtual experience established with linguistic symbols). The machine expresses the concept of unknowns through these common features.

The machine can simulates these equations, use the unknowns to represent common features in a class of information, and simulates the method of establishing a formula to establish a new formula with unknowns, which is new knowledge. This new knowledge can also be delivered to humans through linguistic symbols. Sharing knowledge among machines is much simpler, and they only need to share the memory. Therefore, the machine intelligence established by the present application is a machine intelligence with the creation of new knowledge, which will lead to a new field and help humans solve problems that are difficult to solve by relying on human wisdom.

Other Technical Notes:

In the present application, when input information is to be identified, the common features in the input information of the same category are identified first, rather than finding unique features of the input information to classify the input information. The result of identification is a hierarchical process of progressively changing from a generalized category to a specific category by means of iterative identification. The result of identification for the input information by the machine is therefore a hierarchical multi-output result rather than an exclusive single result.

In the present application, information is expressed using multi-distinguishability low-level features. The relation between information is expressed using an activation value transfer relation. Therefore, in the present application, there is no need to establish relations between concepts, and there is no need to establish an agent program, and there is no need to calculate relations between information through semantics or a vector space.

In the present application, the machine expands the relation network by constantly accumulating memory based on a preset relation network. In the method disclosed in the present application, training and applications are the same process. It is a set of general algorithms to process various types of input information and respond to all input information. So it is universal and lifelong learning.

In the present application, the calculation steps include: low-level feature extraction, memory value or activation value operations (including establishing or updating memory values, propagating activation values in a chain, analyzing activation value transfer relations, calculating and comparing award/penalty information, establishing expectation model sequences, searching for related experiences to reorganize activation information, implementing segmented simulation, establishing driver command parameters, etc.) and similarity comparison. These steps can all be performed mathematically, so that the general-purpose artificial intelligence can be implemented in accordance with the methods and steps disclosed in the present application with prior art techniques.

In the present application, the machine is driven by a demand to establish a response path. The machine may have its own demands, so in the present application, the machine may actively create tasks and select different response paths according to the principle of benefit-seeking and harm-voiding, and autonomously execute the response paths. On the other hand, in the present application, the machine intelligence has empathy that it balances its own interests with others' interests. The machine can therefore exhibit a human-like self-consciousness.

In the present application, we propose to build a virtual experience in language and use this virtual experience as an accumulated memory from which to derive related experience. This is a new machine learning method.

In the present application, a relation network of the machine is closely related to the order of input information. Even with the same input content, the relation network created by the machine is different for different input orders, so that the responses generated by the machine are different for the same input information. The intelligence generated by the machine is closely related to the input order of the training contents. That is, the general-purpose artificial intelligence achieved through the methods and steps disclosed in the present application is closely related to its growth process.

The embodiments of the detailed description are all used as preferred embodiments to facilitate the understanding and implementation of the technical solution of the present application, and do not limit the scope of protection of the present application; any equivalent changes made according to the structure, shape and principle of the present application should be covered in the scope of protection of the present application.

What is claimed is:

1. A method for establishing a general-purpose artificial intelligence, comprising:
   S1, establishing a built-in demand system, a built-in award/penalty system, and a built-in emotion system;
   S2, establishing preset instinct knowledge;
   S3, identifying, by a machine, input information; and
   S4, establishing an iterative relation network for representing knowledge, and responding to the input information;
   wherein, S3 comprises: S3.1, extracting, by the machine, low-level features from the input information, storing the low-level features into a memory according to a simultaneous storage method, searching for related low-level features in the memory, and establishing an expectation model to identify the input information;
   wherein the S1 comprises:
   S1.1, using different demand symbols, award/penalty symbols and emotion symbols in the built-in demand system, the built-in award/penalty system and the built-in emotion system to represent different demand types, award/penalty types and emotion types, and establishing a proper range for each demand type; and
   wherein the S2 comprises: storing a preset demand, award/penalty and emotion symbols and representative low-level features thereof in a memory according to a simultaneous storage method, and the S2 further comprises:
   S2.1, simulating similarity, adjacency and repeatability relations between information to establish instinct knowledge; wherein the instinct knowledge includes a set of symbols that are preset for the machine, and activation value transfer relations are established between the set of symbols and the award/penalty symbols of the machine; the instinct knowledge further includes a relation network and a memory that are preset for the machine,
   a network composed of all the low-level features and activation value transfer relations between the low-level features is used as the iterative relation network in S4; the low-level features serve as nodes of the iterative relation network in S4, and connection relations between the nodes are the activation value transfer relations; and the activation value transfer relations are determined with a chain associative activation process,
   the S3 comprises:
   S3.1, extracting, by the machine, low-level features from the input information with prioritizing overall features within an attention range according to an attention mechanism;
   S3.2, storing, by the machine, the extracted low-level features;
   S3.3, assigning, by the machine, initial activation values to the low-level features stored in the S3.2; and
   S3.4, selecting, by the machine, low-level features with high activation values, and combining the same into an expectation model;
   wherein, in the S3, the machine propagates the activation values in the iterative relation network according to a chain associative activation method; and the associative activation method employs adjacency activation, similarity activation, and strong memory activation,
   further comprising:
   S5, establishing, by the machine, a response path;
   S6, executing, by the machine, the response path; and
   S7, updating, by the machine, the iterative relation network,
   wherein the S5 comprises:
   S5.1, using, by the machine, a collection of all the activated low-level feature as a workspace, wherein all operations of the machine on information are limited in the workspace; the activation values of the low-level features fades over an existence time; and when a activation value is lower than a preset threshold, a low-level feature corresponding to the activation value exits the workspace of the machine;
   S5.2, establishing expectation model sequences; the machine combines the expectation models in S3.4 into expectation model sequences that include a temporal order and a spatial order;
   S5.3, updating, by the machine, the workspace by using the expectation model sequences with the chain associative activation process, and searching for a memory that is most relevant to the input information;
   S5.4, searching, by the machine, for award/penalty information in the updated workspace;
   S5.5, determining, by the machine, achieving of activated award information and avoiding of activated penalty information as a response target, and establishing a response path to achieve the target by simulating past experience in segments; and further identifying, by the machine, the input information to establish a response path when the machine cannot establish a response path satisfying requirements of the award/penalty information; and
   S5.6, optimizing, by the machine, the response path.

2. The method for establishing a general-purpose artificial intelligence according to claim 1, wherein, after S1.1, the S1 further comprises:
   S1.2, according to actual demand values and a proper range corresponding the demand symbols, assigning activation values to the corresponding demand symbols by a preset program; and according to the activation values of the demand symbols, assigning activation values to corresponding award/penalty symbols and activation values to corresponding emotion symbols by the preset program.

3. The method for establishing a general-purpose artificial intelligence according to claim Mil, wherein in the S3, the machine is restricted to not propagating an activation value reversely within a preset time period in one chain activation process after an activation value is transferred between two low-level features.

4. The method for establishing a general-purpose artificial intelligence according to claim 3, wherein there is any one of adjacency, repeatability, and similarity relation between a low-level feature that transfers out an activation value and a low-level feature that receives the activation value.

5. The method for establishing general-purpose artificial intelligence according to claim 1, wherein the step S4 of establishing an iterative relation network for representing knowledge comprises: updating, by the machine, a memory library; storing, by the machine, the input low-level features into the memory library according to a simultaneous storage method, wherein low-level features with adjacency in storage time have adjacency in storage space; each low-level feature is stored along with a memory value and an activation value; an initial memory value of a low-level feature stored for the first time is positively correlated with an activation value when the low-level feature is stored; the machine updates memory values of activated low-level features in original memory library, and an increment of the memory values is positively correlated with the activation values when the update occurs; the memory values of all the low-level features in the memory library decrease over time; and the activation values of all the low-level features in the memory library decrease over time.

6. The method for establishing a general-purpose artificial intelligence according to claim 1, wherein the optimized response path obtained in S5.6 is taken as a virtual output, and S5.1 is performed again to search in the relation network for experiences related to both of the current input information and the current virtual output.

7. The method for establishing a general-purpose artificial intelligence according to claim 1, wherein the S5.6 comprises:
optimizing, by the machine, each response path of the machine, wherein the optimizing, by the machine, each response path of the machine comprises a part or all of:
S5.6.1, establishing, by the machine, an attention mechanism;
S5.6.2, continuously extracting, by the machine, additional input low-level features by the attention mechanism, and further identifying the input information with open concepts and an iterative identification mechanism;
S5.6.3, establishing, by the machine, a self model;
S5.6.4, establishing, by the machine, other agent models other than the self model;
S5.6.5, predicting, by the machine, feedbacks of other agent models to the response path of the machine;
S5.6.6, optimizing, by the machine, each response path by using the feedbacks as virtual inputs; and
S5.6.7, selecting, by the machine, an optimal path for achieving of each response target according to a benefit-seeking and harm-avoiding method, and establishing an execution order of the optimal paths as an overall response path;
wherein every time when a new information is input, the machine identifies the input information using the attention mechanism, and updates the workspace again; and the machine re-establishes and optimizes the response path again based on a new workspace.

8. The method for establishing general-purpose artificial intelligence according to claim 7, wherein when it is detected that an award/penalty value does not satisfy the preset requirement in S5.6.6 or S5.6.7, the machine further identifies the input information or further subdivides the response path to optimize the response path, until it is detected that the award/penalty value satisfies the preset requirement, or until the award/penalty value is converged and impossible to increase any further.

9. The method for establishing a general-purpose artificial intelligence according to claim 1, wherein the S6 comprises:
S6.1, iteratively expanding, by the machine, each segment of the response path into a low-level driver command sequence according to an order of execution;
S6.2, establishing, by the machine, appropriate low-level driver command parameters through attribute experience generalization; and
S6.3, executing, by the machine, the response path;
wherein, during the execution of the response path by the machine, when there is a new input information, the machine identifies the input information again, and establishes a response path, optimizes the response path and executes the response path in an updated workspace.

10. The method for establishing a general-purpose artificial intelligence according to claim 1, wherein low-level features extracted from input of sensors of the machine are stored together with internally activated demand, award/penalty and emotion symbols in the machine; the internally activated demand, award/penalty and emotion symbols also serve as input low-level features; each low-level feature has a memory value for representing a time for existence of the corresponding low-level feature in the memory library; and each low-level feature has an activation value for representing a relation between the corresponding low-level feature and other activated information.

11. The method for establishing a general-purpose artificial intelligence according to claim 1, wherein the low-level features include overall topology, contour, main lines and main texture within the attention range;
the iterative relation network is used for expressing experiences, and is progressively established by using the simultaneous storage method and a chain associative activation method; the low-level features include low-level features extracted from external input information obtained by a sensor group or self state information of the machine, and further include demand symbols, award/penalty symbols, and emotion symbols of the machine.

* * * * *